(12) United States Patent
Chiattello et al.

(10) Patent No.: US 11,332,373 B2
(45) Date of Patent: May 17, 2022

(54) IN SITU PRODUCTION AND FUNCTIONALIZATION OF CARBON MATERIALS VIA GAS-LIQUID MASS TRANSFER AND USES THEREOF

(71) Applicant: Performance Nanocarbon, Inc., West Des Moines, IA (US)

(72) Inventors: Marion L. Chiattello, Cedar Falls, IA (US); Mark Oman, West Des Moines, IA (US)

(73) Assignee: Performance Nanocarbon, Inc., West Des Moines, IA (US)

( * ) Notice: Subject to any disclaimer, the term of this patent is extended or adjusted under 35 U.S.C. 154(b) by 0 days.

(21) Appl. No.: 17/415,801

(22) PCT Filed: Dec. 20, 2019

(86) PCT No.: PCT/US2019/068005
§ 371 (c)(1),
(2) Date: Jun. 18, 2021

(87) PCT Pub. No.: WO2020/132539
PCT Pub. Date: Jun. 25, 2020

(65) Prior Publication Data
US 2022/0064004 A1    Mar. 3, 2022

Related U.S. Application Data

(60) Provisional application No. 62/926,283, filed on Oct. 25, 2019, provisional application No. 62/783,713, filed on Dec. 21, 2018.

(51) Int. Cl.
*C01B 32/182* (2017.01)
*B01J 19/00* (2006.01)
(Continued)

(52) U.S. Cl.
CPC .......... *C01B 32/182* (2017.08); *B01J 10/002* (2013.01); *B01J 19/008* (2013.01); *C01B 32/186* (2017.08); *B01J 4/001* (2013.01); *B01J 19/10* (2013.01)

(58) Field of Classification Search
CPC ... C01B 32/182; C01B 32/186; C01B 32/198; C01B 2204/00; C01B 2204/02;
(Continued)

(56) References Cited

U.S. PATENT DOCUMENTS 7,776,445 B2    8/2010  Lee et al.
8,486,363 B2    7/2013  Hung et al.
(Continued)

FOREIGN PATENT DOCUMENTS

CN    1678523 A      10/2005
CN    104043382 A     9/2014
(Continued)

OTHER PUBLICATIONS

"Homogeneous reaction," accessed online at https://www.britannica.com/print/article/270507 (Dec. 21, 2016) (Year: 2016).*
(Continued)

*Primary Examiner* — Daniel C. McCracken
(74) *Attorney, Agent, or Firm* — Leydig, Voit & Mayer, Ltd.

(57) ABSTRACT

A method for making a solid carbon material comprises: delivering a liquid comprising at least one liquid organic compound into a reaction region of a reactor; delivering a gas comprising at least one gaseous organic compound into the reaction region of the reactor; and inducing a chemical reaction between the at least one liquid organic compound and the at least one gaseous organic compound, wherein: the chemical reaction occurs in the reaction region of the reactor; the solid carbon material is made via the reaction;
(Continued)

the solid carbon material is made during the reaction in the form of a dispersion comprising the solid carbon material dispersed in the liquid; and the chemical reaction is a homogeneous reaction comprising homogeneous nucleation of the solid carbon material in the reaction region of the reactor.

23 Claims, 41 Drawing Sheets

(51) Int. Cl.
*B01J 10/00* (2006.01)
*C01B 32/186* (2017.01)
*B01J 4/00* (2006.01)
*B01J 19/10* (2006.01)

(58) Field of Classification Search
CPC ............ C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; B01J 10/002; B01J 19/008; B01J 4/001; B01J 19/10
See application file for complete search history.

(56) References Cited

U.S. PATENT DOCUMENTS

| | | | |
|---|---|---|---|
| 8,507,797 | B2 | 8/2013 | Veerasamy |
| 8,795,434 | B2 | 8/2014 | Lin |
| 9,260,309 | B2 | 2/2016 | Song et al. |
| 9,371,234 | B2 | 6/2016 | Hong et al. |
| 9,440,857 | B2 | 9/2016 | Sorensen et al. |
| 9,764,956 | B2 | 9/2017 | Moon et al. |
| 9,767,992 | B1 | 9/2017 | Stowell et al. |
| 9,834,445 | B2 | 12/2017 | Kim et al. |
| 9,862,602 | B1 | 1/2018 | Riso et al. |
| 9,987,611 | B1 | 6/2018 | Strohm et al. |
| 10,023,469 | B2 | 7/2018 | Cho et al. |
| 10,112,836 | B2 | 10/2018 | Hart et al. |
| 10,196,272 | B2 | 2/2019 | Kim et al. |
| 10,308,512 | B2 | 6/2019 | Tanner et al. |
| 2012/0228555 | A1 | 9/2012 | Cheng et al. |
| 2013/0011574 | A1 | 1/2013 | Kobayashi et al. |
| 2013/0122220 | A1 | 5/2013 | Won et al. |
| 2013/0126793 | A1 | 5/2013 | Hitoe et al. |
| 2014/0072506 | A1 | 3/2014 | Pech et al. |
| 2014/0170057 | A1 | 6/2014 | Huang et al. |
| 2014/0287155 | A1 | 9/2014 | Matsumoto |
| 2015/0239741 | A1* | 8/2015 | Burton ............... C08G 65/48 525/327.3 |
| 2015/0307358 | A1 | 10/2015 | Yoon |
| 2016/0054031 | A1 | 2/2016 | Echart |
| 2017/0050855 | A1* | 2/2017 | Shankman ............. C22C 33/00 |
| 2017/0113935 | A1 | 4/2017 | Pennington et al. |
| 2017/0166449 | A1* | 6/2017 | Yoo ....................... C01B 32/19 |
| 2018/0009667 | A1* | 1/2018 | Yan ....................... B02C 19/06 |
| 2018/0187298 | A1 | 7/2018 | Matsumoto |
| 2019/0070578 | A1 | 3/2019 | Won |
| 2019/0077669 | A1 | 3/2019 | Zhamu et al. |
| 2019/0144283 | A1 | 5/2019 | Jakobsen et al. |
| 2019/0161352 | A1 | 5/2019 | Price |
| 2019/0336958 | A1 | 11/2019 | Hara et al. |

FOREIGN PATENT DOCUMENTS

| | | |
|---|---|---|
| CN | 107140606 A | 9/2017 |
| CN | 108793133 A | 11/2018 |
| EA | 011588 B1 | 4/2009 |
| EA | 028873 B1 | 1/2018 |
| RU | 2573035 C2 | 1/2016 |
| SU | 998492 A1 | 2/1983 |
| WO | WO 2007/057501 A1 | 5/2007 |
| WO | WO 2017/012281 A1 | 1/2017 |
| WO | WO 2017/196198 A2 | 11/2017 |
| WO | WO 2018/031455 A1 | 2/2018 |
| WO | WO 2019/150124 A1 | 8/2019 |

OTHER PUBLICATIONS

Suslick, et al., Chemistry Induced by Hydrodynamic Cavitation, J. Am. Chem. Soc. 1997; 119: 9303-9304 (Year: 1997).*
Shen, et al., Preparation of graphene by jet cavitation, Nanotechnology 2011; 22: 365306: pp. 1-7 (Year: 2011).*
Kumar, et al., Conceptual design of a novel hydrodynamic cavitation reactor, Chemical Engineering Science 2007; 62: 2698-2711 (Year: 2007).*
Ozonek, et al., Effect of different design features of the reactor on hydrodynamic cavitation process, Archives of Materials Science and Engineering 2011; 52(2): 112-117 (Year: 2011).*
United States Patent and Trademark Offfice, International Search Report in International Application No. PCT/US2019/068005 (dated Apr. 24, 2020).
China National Intellectual Property Administration, The First Office Action and Search Report in Chinese Patent Application No. 201980092694.7 (dated Jan. 19, 2022).
Russian Patent Office, Official Action in Russian Patent Application No. 2021121513 (dated Feb. 22, 2022).
Russian Patent Office, Search Report in Russian Patent Application No. 2021121513 (dated Feb. 22, 2022).

* cited by examiner

Distribution Results (Contin)

| Peak | Diameter (nm) | Std. Dev. |
|---|---|---|
| 1 | 4.4 | 2.0 |
| 2 | 184.3 | 193.0 |
| 3 | 0.0 | 0.0 |
| 4 | 0.0 | 0.0 |
| 5 | 0.0 | 0.0 |
| Average | 166.4 | 190.9 |
| Residual: | 3.015e-003 | (O.K) |

Cumulants Results
Diameter                (d)    : 35.2              (nm)
Polydispersity Index    (P.I.) : 1.239
Diffusion Const.        (D)    : 7.292e-010        ($cm^2$/sec)

Measurement Condition
Temperature          : 24.5         (°C)
Diluent Name         : 10W-30
Refractive Index     : 1.4700
Viscosity            : 170.0000     (cP)
Scattering Intensity : 8867         (cps)

FIG. 9B

Distribution Results (Contin)

| Peak | Diameter (nm) | Std. Dev. |
|---|---|---|
| 1 | 4.4 | 2.0 |
| 2 | 184.3 | 193.0 |
| 3 | 0.0 | 0.0 |
| 4 | 0.0 | 0.0 |
| 5 | 0.0 | 0.0 |
| Average | 166.4 | 190.9 |
| Residual: | 3.015e-003 | (O.K) |

Cumulants Results
Diameter           (d)   : 35.2            (nm)
Polydispersity Index (P.I.) : 1.239
Diffusion Const.   (D)   : 7.292e-010     ($cm^2$/sec)

Measurement Condition
Temperature          : 24.5             (°C)
Diluent Name         : 10W-30
Refractive Index     : 1.4700
Viscosity            : 170.0000         (cP)
Scattering Intensity : 8867             (cps)

FIG. 10B

Measurement Results

| Zeta Potential | :63.93 | (mV) | Doppler shift | : 0.03 | (Hz) |
|---|---|---|---|---|---|
| Mobility | :6.982e-008 | (cm$^2$/Vs) | Base Frequency | : 125.2 | (Hz) |
| Conductivity | :0.0083 | (mS/cm) | | | |

Zeta Potential of Cell

Upper Surface      : -174.03      (mV)
    Lower Surface      : 453.30      (mV)

Cell Condition

Cell Type      : Flow Cell
    Avg. Electric Field      : 81.46      (V/cm)
    Avg. Current      : 0.03      (mA)

FIG. 11B

Measurement Results

| | | | | | |
|---|---|---|---|---|---|
| Zeta Potential | : -50.68 | (mV) | Doppler shift | : -0.19 | (Hz) |
| Mobility | : -4.92e-007 | (cm$^2$/Vs) | Base Frequency | : 125.7 | (Hz) |
| Conductivity | : 0.0091 | (mS/cm) | | | |

Zeta Potential of Cell

Upper Surface    : -64.15    (mV)
    Lower Surface    : -32.81    (mV)

Cell Condition

Cell Type    : Flow Cell
    Avg. Electric Field    : 80.59    (V/cm)
    Avg. Current    : 0.03    (mA)

Diluent Properties

Diluent Name    : mineral oil, light
    Temperature    : 25.0    (°C)
    Refractive Index    : 1.4670
    Viscosity    : 19.1092    (cP)
    Dielectric Constant    : 2.1

FIG. 17B

| Measurements | Mean | Maximum | Std. Dev. |
|---|---|---|---|
| Ø_STF-NON-TREATED | 3.785 Nm | 5.320 Nm | 1.632 Nm |
| Ø_STF-KNOX 2G-L | 2.801 Nm | 3.882 Nm | 1.107 Nm |

IN SITU PRODUCTION AND FUNCTIONALIZATION OF CARBON MATERIALS VIA GAS-LIQUID MASS TRANSFER AND USES THEREOF

CROSS-REFERENCE TO RELATED APPLICATIONS

This application is a U.S. national phase of International Patent Application No. PCT/US2019/068005, filed Dec. 20, 2019, which claims the benefit of and priority to U.S. Provisional Application No. 62/783,713, filed Dec. 21, 2018, and U.S. Provisional Application No. 62/926,283, filed Oct. 25, 2019, each of which is hereby incorporated herein by reference in its entirety.

BACKGROUND OF THE INVENTION

Graphene is used in a wide range of applications, including anti-corrosion coating and paints, electronics, solar panels, drug delivery, batteries, and water filters. However, a significant challenge to commercializing graphene is the lack of reliable mass production methods for producing, low cost, high quality graphene. The various methods of graphene production can be classified into top-down and bottom-up approaches. For example, conventional top-down methods include: (i) chemically converted graphene (reduction of graphene oxide), (ii) electrochemical exfoliation, and (iii) liquid phase exfoliation (LPE) in the presence or absence of surfactants. Bottom-up approaches include: (i) graphene structures synthesized from small molecule organic precursors by catalytic chemical vapor deposition (CVD), (ii) organic synthesis, and (iii) epitaxial growth on SiC or other substrates.

Among these processes, the top-down chemical reduction of exfoliated graphene oxide (GO) is perhaps the most common strategy for bulk graphene production. This method corresponds to a chemical conversion of graphite. The process is very time consuming (e.g., around 5 hours), typically requires the use of expensive harmful chemicals, such as sulfuric acid, nitric acid, and potassium permanganate, and energy intensive (e.g., requiring high temperatures ranging from 800° C. to 1050° C.). Moreover, the process is not efficient. Strong acids consume as much as 20-50% of the seed graphite. The process requires a tedious washing and purification step that produces huge quantities of wastewater that need to be suitably treated. GO platelets require further chemical reduction treatments to reduce the oxygen content. This reduction yields reduced graphene oxide (rGO). The reduction procedure usually involves further use of toxic chemicals, such as hydrazine. Even after reduction, the graphene is far from being pristine. Post-production methods for reducing GO to rGO do not completely remove oxygen introduced by the strong oxidation process. The remaining oxygen groups can be considered a form of chemical defects. Furthermore, removing oxygen typically results in the formation of physical defects in the form of vacancies and edge damage.

Most of the afore-mentioned processes do not create pristine (i.e., pure) graphene. Pristine graphene is mono-layer or few-layer graphene platelets that are free of chemical and physical defects. Both of these defects deteriorate the unique thermal properties required for heat transfer applications as well as the electrical properties needed in microelectronics and energy storage applications. Typical chemical defects are oxygen functional groups residing on the surface or edges of the graphene platelets, which significantly diminish the thermal conductivity of graphene. For example, even a 5% oxygen content will reduce the thermal conductivity of graphene by 95% (e.g., see, Xin Mu et al., *Sci. Reports,* 4: 3909; DOI: 10.1038/srep03909). Chemical defects also reduce the electrical conductivity of graphene. GO with as much as 35% oxygen acts as an insulator and not a conductor. Physical defects include holes and vacancies at the plane and edges of graphene platelets. These holes and vacancies impede the free flow of heat and electrons across the graphene plane. Physical defects are often created in the production process or in the process of removing oxygen.

Another major problem associated with working with graphene is that it is very difficult to create stable graphene dispersions. Graphene is a solid that is not soluble in a solvent, so that the graphene must be used in powder form or as a dispersion. There are many challenges associated with trying to create dispersions comprising graphene, including multistep processes with increased waste and cost. See, for example, Liang et al., *Coatings,* 2018, 8, 33; Dong et al., Nature Communications, Jan. 8, 2018, 9, article number 76; and Johnson, *Current Opinion in Colloid & Interface Science,* 2015, 20(5-6), 367-382.

Thus, there is a need for methods that address these and other challenges associated with making graphene and other carbon materials. Provided herein are such methods for making carbon materials, as well as methods for functionalizing materials, that can produce graphene, including pristine graphene, and can be scalable, fast, and have reduced production costs compared to conventional approaches.

BRIEF SUMMARY OF THE INVENTION

The invention relates to methods for making solid carbon materials and for functionalizing materials, such as solid carbon materials, particularly graphene. These methods include making the solid carbon materials in a liquid in situ, resulting in dispersions of the solid carbon material, which in some embodiments are considered stable dispersions. The invention also relates to uses and applications for the carbon material(s).

Disclosed herein are methods for making a solid carbon material, the method comprising delivering a liquid comprising at least one liquid organic compound into a reaction region of a reactor; delivering a gas comprising at least one gaseous organic compound into the reaction region of the reactor; and inducing a chemical reaction between the at least one liquid organic compound and the at least one gaseous organic compound, wherein: the chemical reaction occurs in the reaction region of the reactor; the solid carbon material is made via the reaction; the solid carbon material is made during the reaction in the form of a dispersion comprising the solid carbon material dispersed in the liquid; and the chemical reaction is a homogeneous reaction comprising homogeneous nucleation of the solid carbon material in the reaction region of the reactor. Preferably, the chemical reaction comprises gas-liquid mass transfer. Preferably, but not necessarily, a composition of the gas is different from a composition of the liquid. Preferably, but not necessarily, a composition of the at least one gaseous compound is different from a composition of the at least one liquid organic compound. Optionally, the chemical reaction does not occur on or at a catalyst. Preferably, but not necessarily, the method does not include a heterogeneous nucleation of the solid carbon material on a solid substrate. Optionally, the step of delivering the liquid is performed via a first input stream into the reaction region and the step of delivering the gas is performed via a second input stream into the reaction region; wherein the first stream path and the second input stream are different and physically separate. Optionally, the step of delivering the liquid and the step of delivering the gas are performed concurrently. Optionally, the step of delivering the gas is performed after the liquid is delivered to the reaction region. Preferably, the solid carbon material remains dispersed in the liquid while present in the reaction region. Preferably, but not necessarily, the liquid is substantially free of a solid carbon material during the step of delivering the liquid and prior to the steps of delivering the gas and inducing the chemical reaction. Preferably, but not necessarily, the liquid is substantially free of solid particles and is substantially not a colloid, suspension, or sol material during the step of delivering the liquid and prior to the steps of delivering the gas and inducing the chemical reaction. Preferably, but not necessarily, the solid carbon material is formed only in the reaction region of the reactor. Optionally, the solid carbon material is not made when the method is performed without the step of delivering the gas with otherwise equivalent steps and conditions. Preferably, but not necessarily, delivering the gas comprises entraining the gas, injecting the gas, or a combination of these. Optionally, the gas is entrained in the liquid under pressure, the gas is injected into the liquid, or the gas is bubbled into the liquid, or a combination of these techniques. Preferably, the gas is delivered directly into the reaction region during the step of delivering the gas. Preferably, but not necessarily, the steps of delivering the gas and inducing the chemical reaction are performed simultaneously or near simultaneously (e.g., within 5 minutes, within 4 minutes, within 2 minutes, within 1 minute, within 30 seconds, within 15 seconds, within 10 seconds, within 5 seconds, or within 1 second). Preferably, the at least one liquid organic compound and the at least one gaseous organic compound are simultaneously (e.g., within 5 minutes, within 4 minutes, within 2 minutes, within 1 minute, within 30 seconds, within 15 seconds, within 10 seconds, within 5 seconds, or within 1 second) present in the reaction region. Optionally, the step of inducing the chemical reaction comprises cavitation in the liquid and/or inducing a shear force. The reactor will be one that can induce cavitation, shear, high pressure, high temperatures, and/or mixing, such as a cavitation reactor, shear reactor, or stir tank reactor. In some embodiments, the reactor is a stir tank reactor comprising an agitator, wherein the agitator induces the shear force in the liquid.

Disclosed herein are methods for making a solid carbon material, the method comprising: delivering a liquid comprising at least one liquid organic compound into a cavitation reactor; forming cavitation bubbles in the liquid within a cavitation region of the cavitation reactor; and delivering a gas comprising at least one gaseous organic compound into the cavitation region of the cavitation reactor; thereby making the carbon material in the form of a dispersion comprising the carbon material dispersed in the liquid. Optionally, the reactor is a hydrodynamic cavitation reactor, a shear reactor, an ultrasonic cavitation reactor, or a multifunctional reactor. Optionally, the cavitation reactor comprises hydrodynamic cavitation or ultrasonic cavitation. Optionally, the reactor comprises a rotor stator reactor, a bench shear reactor, a high speed shear reactor (e.g., Charles Ross HSM-700), a hydrodynamic cavitation reactor, an orifice reactor, a rotating packed bed reactor, a spinning disc reactor, an impinging streams reactor, a supersonic gas-solid reactor, an ultrasonication reactor, a probe sonication reactor, a shear mixer reactor, microwave irradiation reactor, a shockwave reactor (e.g., SHOCKWAVE POWER™ Reactor (SPR); Hydro Dynamics, Inc., Rome, Ga.), or a combination of these. In an embodiment, sonication is used to cause or induce cavitation in the liquid. Optionally, delivering the gas comprises entraining the gas, injecting the gas, or a combination of these. Optionally, the gas is entrained in the liquid. Gas can be entrained in the liquid using any suitable pressure that enables gas-liquid mass transfer within the operating conditions of the reactor (e.g., 2 to 150 psi, 10 to 100 psi). Optionally, the gas is injected into the liquid. Optionally, the gas is bubbled into the liquid. Optionally, the gas is delivered directly into the cavitation region during the step of delivering the gas. For example, the gas can be delivered directly into the cavitation region at a location of an inception of cavitation bubbles. Optionally, the steps of forming cavitation bubbles and delivering the gas are performed simultaneously or near simultaneously (e.g., within 5 minutes, within 4 minutes, within 2 minutes, within 1 minute, within 30 seconds, within 15 seconds, within 10 seconds, within 5 seconds, or within 1 second). Optionally, during the step of delivering the gas, the gas is delivered directly into or within 1 mm of a cavitation bubble-nucleation region, the cavitation bubble-nucleation region corresponding to nucleation of the cavitation bubbles in the hydrodynamic cavitation reaction during the step of forming. Optionally, the forming step comprising forming a cavitation cloud comprising the cavitation bubbles in the cavitation region of the reactor, wherein the gas is delivered directly inside or within 1 mm of the cavitation cloud. Optionally, the dispersion is formed in the cavitation region of the reactor. Optionally, the forming step comprising forming a cavitation cloud comprising the cavitation bubbles; wherein the carbon material is formed within the cavitation cloud. Optionally, the liquid is substantially free of the carbon material during the step of delivering the liquid and prior to formation of cavitation bubbles therein. Optionally, the liquid is substantially free of solid particles and is substantially not a colloid, suspension, or sol material during the step of delivering the liquid and prior to formation of cavitation bubbles therein. Preferably, making the carbon material comprises nucleating the carbon material in the liquid. Preferably, making the carbon material comprises nucleating the carbon material in the liquid and growing the carbon material in the liquid.

In an aspect, provided herein is a method for functionalizing a material dispersed in a liquid, the material dispersed in the liquid being a first dispersion, the method comprising steps of: delivering the first dispersion into a cavitation reactor; wherein the liquid comprises at least one liquid organic compound; forming cavitation bubbles in the liquid within a cavitation region of the hydrodynamic cavitation reactor; and delivering a gas comprising at least one gaseous organic compound directly into the cavitation region of the cavitation reactor; thereby functionalizing the material to form a second dispersion, the second dispersion comprising the functionalized material dispersed in the liquid. In some embodiments, functionalizing the material comprises chemically, physically, or both chemically and physically functionalizing the material. In some embodiments, the material is a carbon material comprising graphite, expanded graphite, a graphite-like material, graphene, a graphene-like material, carbon nanotubes, carbon onions, or other carbon allotrope, hexagonal boron nitride, or any combination thereof. In some embodiments, the functionalized material comprises graphene oxide. In some embodiments, functionalizing comprises adding oxygen atoms to the material, removing oxygen atoms from the material, adding nitrogen atoms to the material, adding sulfur atoms to the material, or a combination thereof. In some embodiments, the gas comprises oxygen, water vapor, hydrogen, nitrogen, sulfur dioxide, $CO_2$, ozone, or any combination thereof. In some embodiments, the gas is delivered directly into the cavitation region during the step of delivering the gas. In some embodiments, the steps of forming cavitation bubbles and delivering the gas are performed simultaneously or near simultaneously (e.g., within 5 minutes, within 4 minutes, within 2 minutes, within 1 minute, within 30 seconds, within 15 seconds, within 10 seconds, within 5 seconds, or within 1 second). In some embodiments, the step of forming cavitation bubbles comprises nucleating cavitation bubbles. In some embodiments, during the step of delivering the gas, the gas is delivered directly to or within 1 mm of a cavitation bubble-nucleation region, the cavitation bubble-nucleation region corresponding to nucleation of the cavitation bubbles in the hydrodynamic cavitation reaction during the step of forming. In some embodiments, the forming step comprises forming a cavitation cloud comprising the cavitation bubbles in the cavitation region of the reactor, wherein the gas is delivered directly inside or within 1 mm of the cavitation cloud. In some embodiments, the method of functionalizing a material comprises terminating delivery of the gas and retaining the dispersion in the cavitation region while the gas is not delivered into the cavitation region. In some embodiments, during the step of retaining the dispersion in the cavitation region and after the step of terminating and while the gas is not delivered into the cavitation region, the method of functionalizing further comprises a step of degassing the dispersion to decrease a concentration of the gas entrained therein.

BRIEF DESCRIPTION OF THE DRAWINGS

FIG. 6A shows a SEM image of micron-sized graphene-like platelets, with squares (labeled as "1" and "2") identifying regions corresponding to the EDS spectra shown in FIG. 6B (square 1 corresponds to "Spectrum 1" and square 2 corresponds to "Spectrum 2"). FIG. 6B shows EDS spectra of the atomic concentrations of elements, calculated from the EDS spectra, in the carbon material in the regions identified in FIG. 6A.

FIG. 7A shows a SEM image of the micron-sized graphene-like platelets, with squares (labeled as "5" and "6") identifying regions corresponding to the EDS spectra shown in FIG. 7B (square 5 corresponds to "Spectrum 5" and square 6 corresponds to "Spectrum 6"). FIG. 7B shows EDS spectra and a table summarizing the atomic concentrations of elements, calculated from the EDS spectra, in the carbon material in the regions identified in FIG. 7A.

FIGS. 9A-9B are scattered light intensity data for carbon material according to Example 5A.

FIGS. 10A-10B are particle size number distribution for the carbon material according to Example 5A.

FIGS. 11A-11B are mobility data, for determining Zeta potential, for the carbon material dispersion according to Example 5A.

FIGS. 17A-17B are mobility data, for determining Zeta potential, for the carbon material dispersion according to Example 11A.

STATEMENTS REGARDING CHEMICAL COMPOUNDS AND NOMENCLATURE

Figure 1:
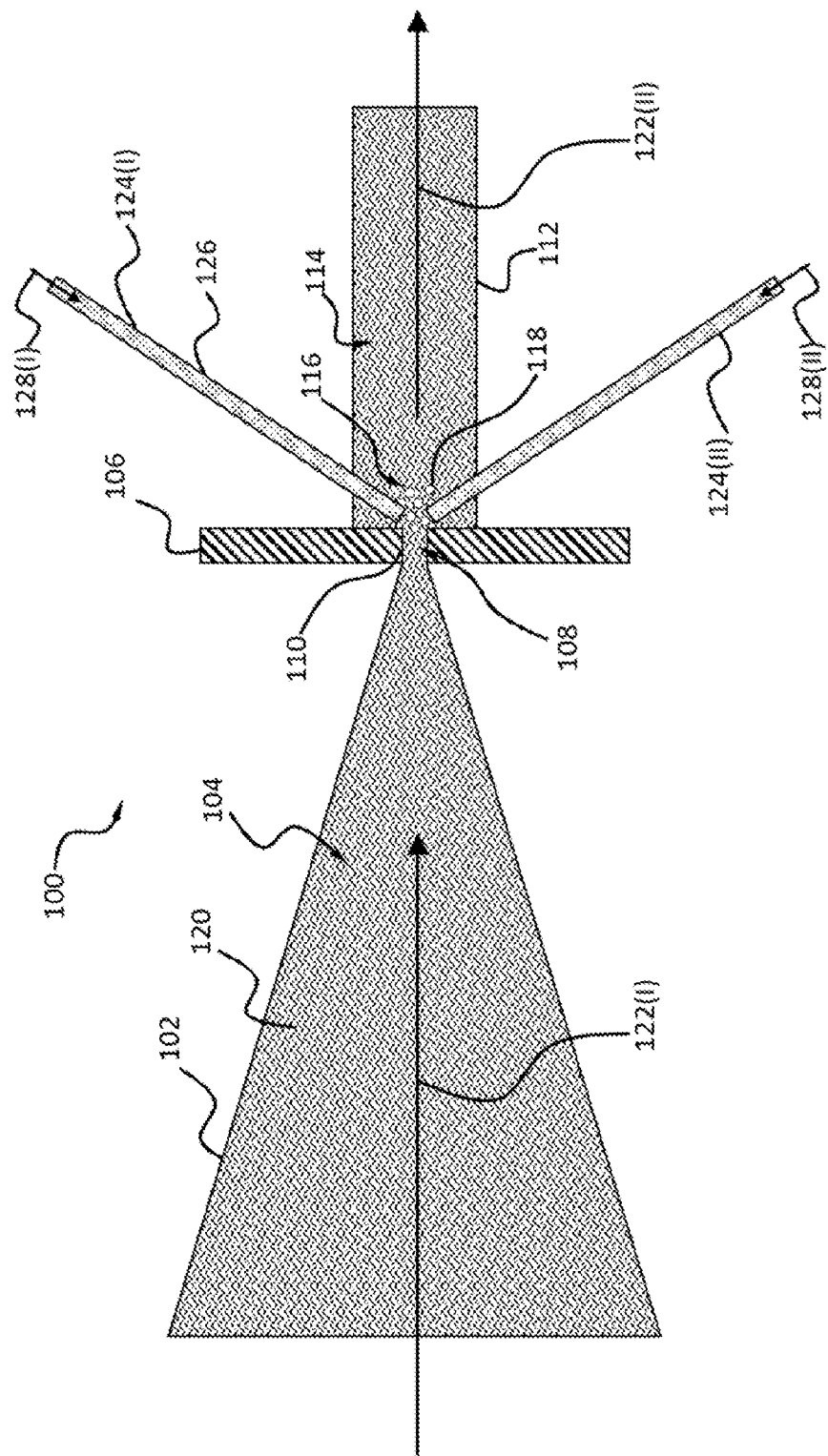
FIG. 1 illustrates an exemplary hydrodynamic cavitation reactor, or portion thereof, according to certain embodiments of the invention.

In general, the terms and phrases used herein have their art-recognized meaning, which can be found by reference to standard texts, journal references, and contexts known to those skilled in the art. The following definitions are provided to clarify their specific use in the context of the invention.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

As used herein, the term "organic compound" refers to a chemical species characterized by a chemical formula having at least one carbon (C) atom therein. For example, methane ($CH_4$) is a gaseous organic compound. For example, ethanol is a liquid organic compound. The term "liquid organic compound" refers to an organic compound that is substantially liquid under the conditions of the method in which it is being used (e.g., the boiling point thereof is greater than the bulk temperature of the liquid during the method being performed). The term "gaseous organic compound" refers to an organic compound that is substantially gaseous under the conditions of the method in which it is being used (e.g., the boiling point thereof is less than the bulk temperature of the gas during the method being performed).

The term "cavitation" refers to the formation of vapor cavities, or "cavitation bubbles," in a liquid as a result of pressure change (typically rapid pressure change) exhibited by or imparted upon the liquid. For example, a liquid undergoing sudden expansion, such as a liquid exiting a small orifice and entering a larger volume, may experience a sudden pressure drop sufficient to result in the formation of cavitation bubbles. Cavitation can be caused by one or a combination of forces or energy sources, including, but not limited to, pressure change due to volume expansion, ultrasonication (also referred to herein as sonication). Even though cavitation can occur in a high shear reactor, especially with the injection of a gas, the main reaction likely comes from shear. Hydrodynamic cavitation includes cavitation induced or caused by pressure change imparted or on experienced by a fluid, such as due to volume change, such as due to fluid passing in, through, and out of an orifice. Ultrasonication cavitation (also referred to herein as sonication cavitation or ultrasonic cavitation) refers to cavitation induced or caused by ultrasonication imparted on or experienced by a fluid. Formation of a cavitation bubble includes first nucleation of a cavitation bubble. Cavitation can be associated with the formation of a plurality of cavitation bubbles, such that the sum of cavitation bubbles existing at any moment forms a "cavitation cloud." The cavitation cloud corresponds to a region of the liquid comprising cavitation bubbles, which in some embodiments includes any region or location where a cavitation bubble is nucleating.

As used herein, the term "cavitation reactor" refers to a reactor that induces or causes cavitation in a fluid. Preferably, but not necessarily, a cavitation reactor is a hydrodynamic cavitation reactor, an ultrasonic cavitation reactor, or a multifunctional cavitation reactor.

A "hydrodynamic cavitation reactor" is a reactor configured to induce or cause a hydrodynamic cavitation in a fluid. Preferably, a hydrodynamic cavitation reactor is a system comprising one or more regions for inducing cavitation (forming cavitation bubbles) in a liquid. A hydrodynamic cavitation reactor typically comprises a pre-cavitation region and a cavitation region. In some embodiments, a hydrodynamic cavitation reactor comprises at least one orifice (e.g., aperture, opening, hole, notch, perforation) such that a fluid flows from a pre-cavitation region, through an orifice, to a cavitation region. Hydrodynamic cavitation reactors useful for the methods disclosed herein can include a variety of configurations and regions/equipment for forming cavitation bubbles, including, but not limited to, orifices, nozzles, venturi tubes, rotors, and any combinations of these or other features known in the art.

Figure 18:
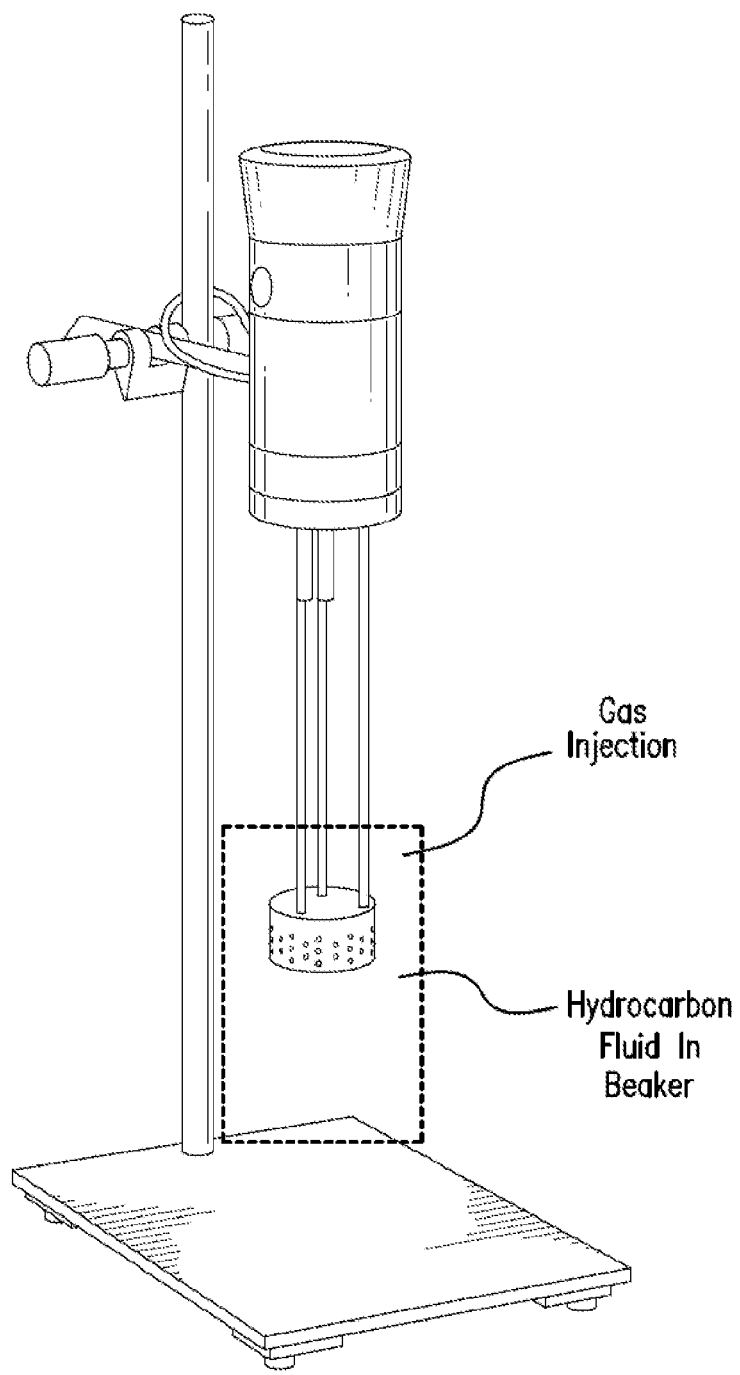
FIG. 18 is a schematic of an exemplary bench shear reactor.
Figure 19:
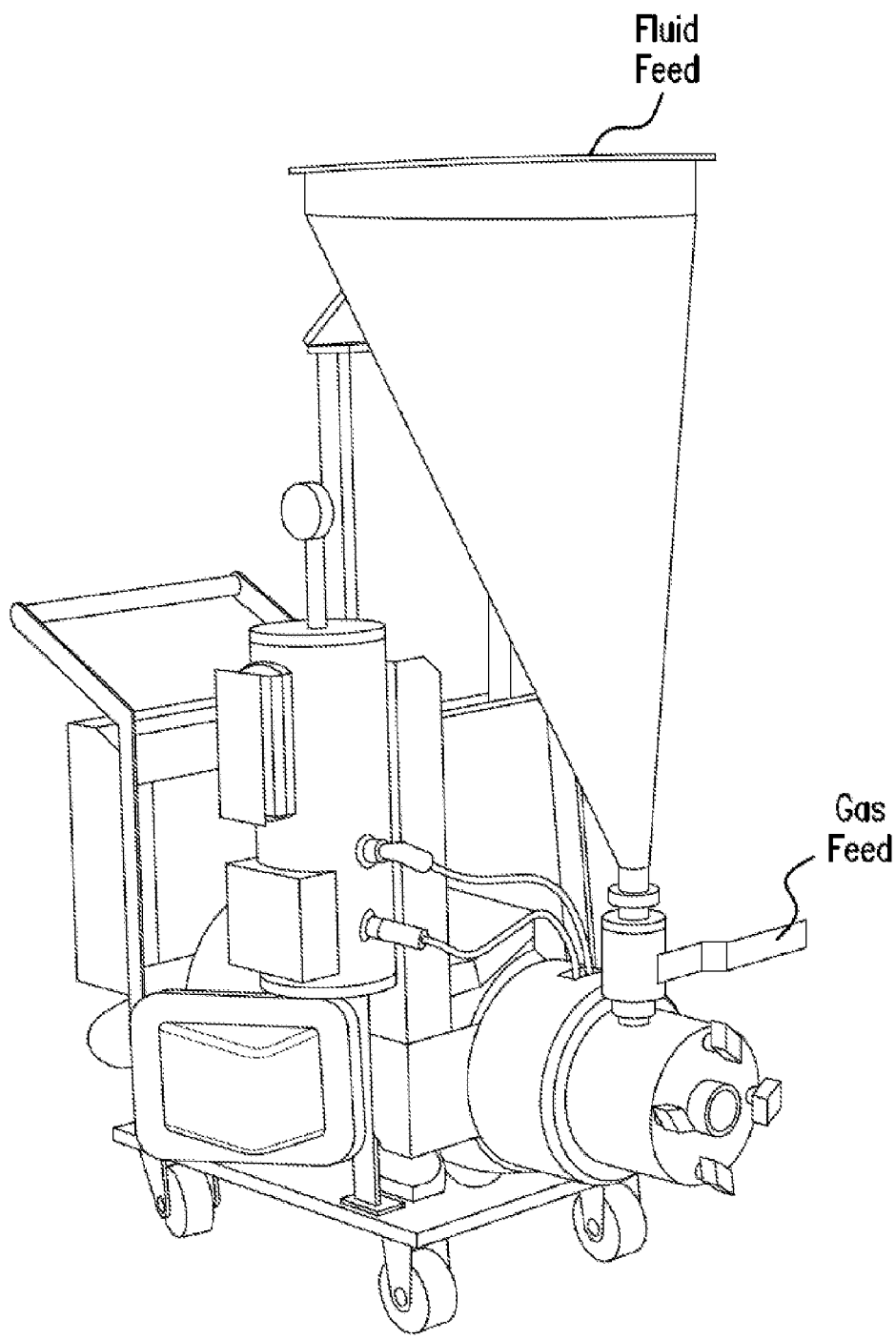
FIG. 19 is a schematic of an exemplary high speed shear reactor.

A "shear reactor" is a reactor configured to induce or cause shear in a fluid. FIG. 18 shows an exemplary bench shear mixer (a shear reactor), such as a FM Fuko Bench high shear unit. FIG. 19 shows a shear mixer, such as a Charles Ross HSM-700 roto stator inline high speed shear mixer that is capable of inducing cavitation as well when gas is injected.

An "ultrasonic cavitation reactor" is a reactor configured to induce or cause ultrasonic cavitation in a fluid.

Figure 20:
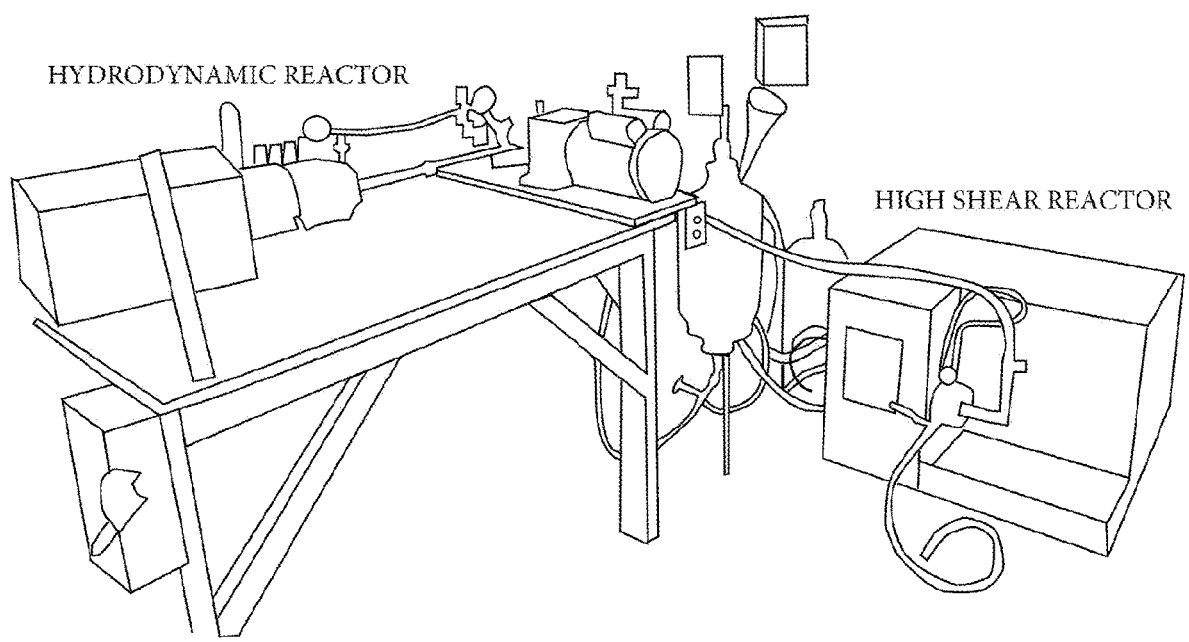
FIG. 20 is a schematic of an exemplary multifunctional reactor.
Figure 21:
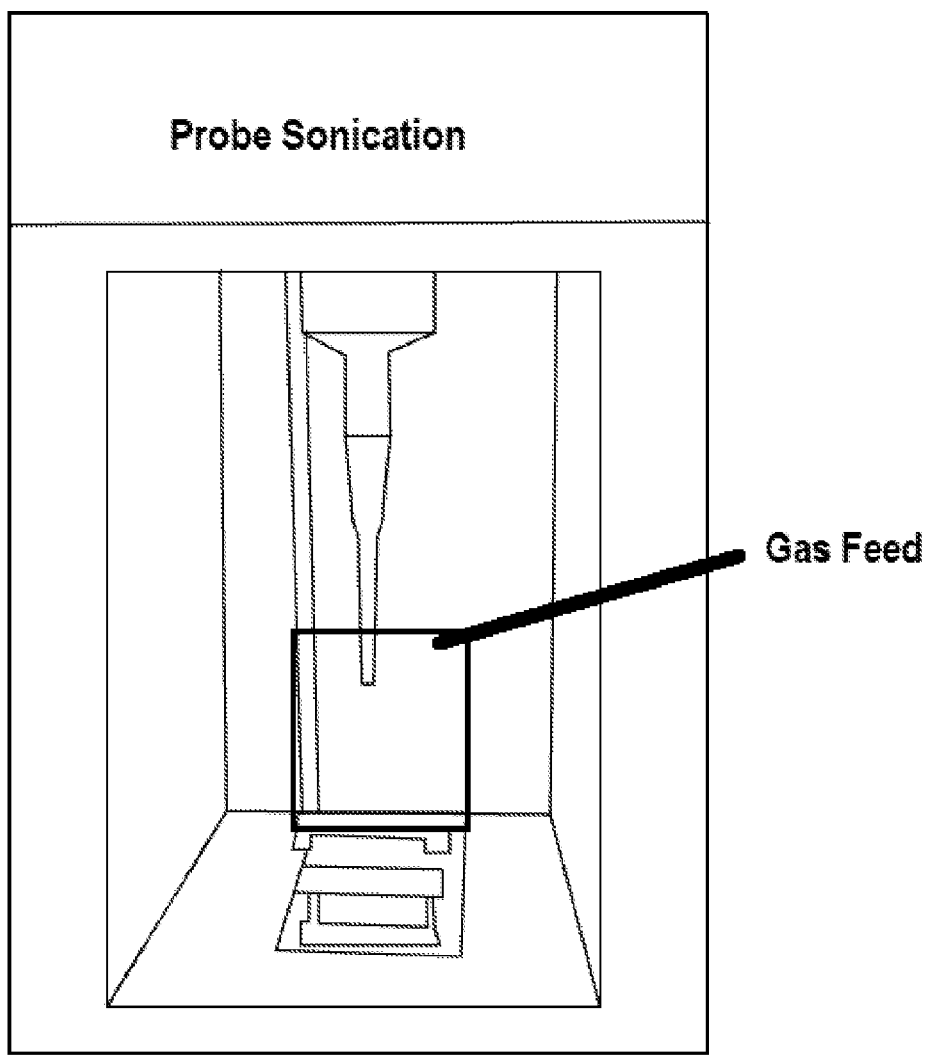
FIG. 21 is a schematic of an exemplary sonication cavitation reactor (e.g., a probe sonication reactor).

A "multifunctional reactor" is a reactor that comprises a plurality of reactors or plurality of different mechanisms/processes for inducing the chemical reaction via which a solid carbon material is formed. A multifunctional reactor can be a multifunctional cavitation reactor, which comprises a plurality of cavitation reactors or a cavitation reactor that induces or causes cavitation in a fluid via a plurality of types of cavitation (or, energies or forces that induce or cause cavitation). For example, a multifunctional reactor can include a plurality of mechanisms for inducing or causing cavitation in a fluid. For example, a multifunctional reactor can be configured to induce or cause at least two of hydrodynamic cavitation, ultrasonic cavitation, and shear in a fluid. FIG. 20 is a schematic of a multifunctional cavitation reactor, including a hydrodynamic cavitation reactor and a shear reactor. According to certain embodiments, a multifunctional cavitation reactor includes two reactors connected in series, such as shown in FIG. 20. A first reactor, such as a gas fed hydrodynamic cavitation reactor, can make a solid carbon material, such as graphene-like materials, for example as the fluid experiences a pressure drop as it passes through one or more orifices, and gas is injected near the nucleation point(s) of the cavitation bubble(s). According to certain embodiments, the fluid (now imbued with carbon material) can then pass through a second reactor, such as high shear reactor where the graphene-like material, for example, can be sheared into crystalline particles. According to certain embodiments, no gas is injected in the second reactor, such as the high shear reactor.

As used herein, the term "in situ" (or, "in-situ"), in reference to a solid carbon material or the process for making the solid carbon material, such as an in situ formed carbon material or an in-situ carbon material or an in situ process for making a solid carbon material, refers to the carbon material or the process for making the solid carbon material wherein the carbon material is made by said process and is not otherwise an input to the process. The process for making the carbon material can be a method according to any embodiment(s) disclosed herein and the carbon material can be carbon material(s) according to any embodiment(s) disclosed herein. For example, a liquid provided as an input into an in situ process is free of a carbon material and the solid carbon material is made in the liquid during the in situ process, in which case the made carbon material can be referred to as an in situ carbon material. For example, in an in situ process for making a solid carbon material, a liquid is substantially free of the carbon material during the step of delivering the liquid and prior to formation of cavitation bubbles in said liquid during the in situ process. For example, a liquid is substantially free of solid particles and is substantially not a colloid, suspension, or sol material during the step of delivering the liquid to the process and prior to formation of cavitation bubbles therein. As described elsewhere herein, the in situ carbon material can be made in the reaction region of the reactor, such as a cavitation region, or the cavitation cloud, of a cavitation reactor during the method for making the carbon material.

As used herein, the term "well-dispersed" can refer to particulate(s) in a liquid that are stably dispersed with minimal or no agglomeration and/or precipitation out of the liquid. Preferably, but not necessarily, well-dispersed particles are characterized by a Zeta potential of greater than +40 mV or less than −40 mV.

The term "dispersion" refers to a mixture of particles, such as particles of one or more solid carbon materials, dispersed and/or suspended in a liquid, which can be referred to as a solvent. A colloidal mixture is an exemplary dispersion. Preferably, but not necessarily, a dispersion is a homogeneous mixture. In the context of a dispersion, the term "homogeneous" refers to a liquid mixture that appears uniform to the naked eye. In contrast, a heterogeneous liquid mixture includes particles that are precipitated from or suspended in the liquid mixture and are large enough to be distinctly identifiable by the naked eye in the liquid mixture. A heterogeneous liquid mixture includes, for example, sedimented and/or sedimenting particles. Preferably, but not necessarily, the term "dispersion" is broadly intended to include solutions and dispersions, such as colloids, which are not heterogeneous liquid mixtures. Preferably, but not necessarily, a dispersion is a microscopically homogenous, or uniform, mixture of particles in a liquid, such as a solvent. Preferably, but not necessarily, a dispersion is thermodynamically favored to remain stably dispersed or is thermodynamically favored to segregate by sedimentation but wherein sedimentation is kinetically slowed or prevented. Particles, of a dispersion, that are characterized as stably dispersed remain dispersed in the dispersion and do not sediment or precipitate out of the liquid, of the dispersion, for at least 5 hours, preferably at least 12 hours, preferably at least 24 hours, and more preferably at least 1 week, under normal temperature and pressure (NTP) and exposure to air.

As used herein, the term "carbon material" refers to a solid carbon material. The term "carbon material" or "solid carbon material," as used herein, does not refer to a liquid organic compound (such a liquid organic compound of a liquid delivered to a reactor) and does not refer to a gaseous organic compound (such as a gaseous organic compound of a gas delivered to a reactor). Exemplary carbon materials include, but are not limited to, graphite, expanded graphite, a graphite-like material, graphene, a graphene-like material, carbon nanotubes, carbon onions, other carbon allotropes, a composite comprising graphene, cationic graphene, and any combinations thereof.

The term "simultaneous" refers to at the same time within the limits of detection. The term "near simultaneously" refers to within 5 minutes, within 4 minutes, within 2 minutes, preferably within 1 minute, more preferably within 30 seconds, preferably in some embodiments within 15 seconds, preferably in some embodiments within 10 seconds, preferably in some embodiments within 5 seconds, or more preferably in some embodiments within 1 second.

A gas entrained in a liquid is, for example, a gas dissolved in the liquid. An injected gas is, for example, a gas injected, such as via a pressure difference, into the liquid such that the gas is introduced into or otherwise present in the liquid (e.g., at the inception of the bubble formation). Bubbling a gas into a liquid is an example of injecting a gas into a liquid.

The term "bulk temperature" refers to an average temperature of a substantial portion of a fluid or material. For example, a bulk temperature of a liquid can be approximately room temperature, even though the liquid can comprise local variations in temperature, such as at the site of a cavitation bubble formation and collapse where local temperature may exceed the bulk temperature. For example, local temperature of a fluid can correspond to the fluid temperature on a scale of 1 $nm^3$ or less, 10 $\mu m^3$ or less, 100 $\mu m^3$ or less, or 1 $mm^3$ or less. For example, local temperature of a fluid may correspond to the fluid temperature on a scale of greater than 1 $mm^3$.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater than or equal to 30 repeating units) and a high number average molecular weight (e.g., greater than 1,000 Da, greater than or equal to 10,000 Da, in some embodiments greater than or equal to 50,000 Da or greater than or equal to 100,000 Da). Polymers are commonly the polymerization product of one or more monomer precursors. The term polymer includes homopolymers, i.e., polymers consisting essentially of a single repeating monomer subunit. The term polymer also includes copolymers, which are formed when two or more different types of monomers are bonded in the same polymer. Copolymers can comprise two or more monomer subunits, and include random, block, brush, brush block, alternating, segmented, grafted, tapered, and other architectures. Useful polymers include organic polymers or inorganic polymers that can be in amorphous, semi-amorphous, crystalline or semi-crystalline states. Polymer side chains capable of cross linking polymers (e.g., physical cross linking) can be useful for some applications. Useful copolymers include block copolymers and/or graft copolymers. Exemplary polymers include, but are not limited to, those with repeating units having one or more unsubstituted or substituted polyisocyanate groups, polymethacrylate groups, polyacrylate groups, polymethacrylamide groups, polyacrylamide groups, polyquinoxaline groups, polyguanidine groups, polysilane groups, polyacetylene groups, polyamino acid groups, polypeptide groups, polychloral groups, polylactide groups, polystyrene groups, polyacrylate groups, poly tert-butyl acrylate groups, polymethyl methacrylate groups, polysiloxane groups, polydimethylsiloxane groups, poly n-butyl acrylate groups, polyethylene glycol groups, polyethylene oxide groups, polyethylene groups, polypropylene groups, polytetrafluoroethylene groups, polyvinyl chloride groups, and any combination thereof.

As used herein, the term "group" refers to a functional group of a chemical compound. Groups of the present compounds refer to an atom or a collection of atoms that are a part of the compound. Groups of the present invention can be attached to other atoms of the compound via one or more covalent bonds. Groups can also be characterized with respect to their valence state. The present invention includes groups characterized as monovalent, divalent, trivalent, etc. valence states.

An "oligomer" refers to a molecule composed of repeating structural units connected by covalent chemical bonds often characterized by a number of repeating units less than that of a polymer (e.g., equal to or less than 3 repeating units) and a lower number average molecular weight (e.g., less than or equal to 1,000 Da) than polymers. Oligomers may be the polymerization product of one or more monomer precursors.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer are used interchangeably.

Unless otherwise specified, the term "molecular weight" refers to an average molecular weight. Unless otherwise specified, the term "average molecular weight," refers to number average molecular weight. Number average molecular weight is defined as the total weight of a sample volume divided by the number of molecules within the sample. As is customary and well known in the art, peak average molecular weight and weight average molecular weight may also be used to characterize the molecular weight of the distribution of polymers within a sample.

The term "weight average molecular weight" ($M_w$) refers to the average molecular weight defined as the sum of the products of the molecular weight of each polymer molecule ($M_i$) multiplied by its weight fraction ($w_i$): $M_w = \Sigma w_i M_i$. As is customary and well known in the art, peak average molecular weight and number average molecular weight may also be used to characterize the molecular weight of the distribution of polymers within a sample.

The term "substantially" refers to a property or condition that is within 20%, within 10%, within 5%, within 1%, or is equivalent to a reference property or condition. The term "substantially equal," "substantially equivalent," or "substantially unchanged," when used in conjunction with a reference value describing a property or condition, refers to a value or condition that is within 20%, within 10%, within 5%, within 1%, within 0.1%, or optionally is equivalent to the provided reference value or condition. For example, a concentration is substantially equal to 1 mass % if the value of the concentration is within 20%, within 10%, within 5%, within 1%, or equal to 1 mass %. For example, substantially all of a material or fluid is within a particular region if at least 80% (e.g., volume, moles, or by mass), at least 90%, at least 95%, at least 95%, or 100% of the material or fluid is within the particular region. The term "substantially greater," when used in conjunction with a reference value or condition describing a property or condition, refers to a value that is at least 2%, at least 5%, at least 10%, or at least 20% greater than the provided reference value or condition. The term "substantially less," when used in conjunction with a reference value or condition describing a property or condition, refers to a value or condition that is at least 2%, at least 5%, at least 10%, or at least 20% less than the provided reference value. For example, a concentration is substantially less than 1 mass % if the value of the concentration is at least 20% less than, at least 10% less than, at least 5% less than, or at least 1% less than 1 mass %.

The term "graphene-like material" refers to a solid carbon-based material produced by the inventive method that can be processed to be physically akin to pristine graphene. Pristine graphene comprises less than 1% oxygen and has few layers (e.g., 1 to 2 layers). The platelet size of pristine graphene typically ranges from 1 to 5 micron. The in situ made carbon material, as described herein and made in a hydrocarbon solvent under hydrodynamic conditions, consists of multilayer platelets (more than 2 layers, e.g., 5 to 15 layer, 6 to 13 layers, 7 to 12 layers, 8 to 11 layers) with platelet sizes ranging from about 1 to 50 microns (e.g., 2 to 25 µm, 3 to 15 µm, or 5 to 10 µm). When made with an anhydrous hydrocarbon solvent (e.g., toluene), the graphene-like material produced will have less than 1% oxygen. Moreover, the graphene-like material created by the inventive method is easily liquid exfoliated into few layer graphene. It is more easily liquid exfoliated than graphite, because, without being held to any theory, it is believed that because the bulk graphene-like material develops in situ, the bulk graphene sheets may be held together with weaker Van der Waals bonding than would be found in graphite.

The terms "stir tank reactor" and "stirred tank reactor" are intended to be interchangeable and have equivalent meaning.

As used herein, the term "in situ friction reduction" refers to a process in which the lubricity of a fluid is changed or improved. In an in situ friction reduction process, the fluid can be used as a lubricant and have its lubrication properties improved simultaneously or near simultaneously (e.g., within 5 minutes, within 4 minutes, within 2 minutes, within 1 minute, within 30 seconds, within 15 seconds, within 10 seconds, within 5 seconds, or within 1 second).

In an embodiment, a composition or compound of the invention, such as a liquid organic compound or a gaseous organic compound, is isolated or substantially purified. In an embodiment, an isolated or purified compound is at least partially isolated or substantially purified as would be understood in the art. In an embodiment, a substantially purified composition, compound or formulation of the invention has a chemical purity of at least 95%, optionally for some applications at least 97%, optionally for some applications at least 98%, optionally for some applications at least 99%, optionally for some applications at least 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Disclosed herein is a method for making a solid carbon material comprising: delivering a liquid comprising at least one liquid organic compound into a reaction region of a reactor; delivering a gas comprising at least one gaseous organic compound into the reaction region of the reactor; and inducing a chemical reaction between the at least one liquid organic compound and the at least one gaseous organic compound, wherein: the chemical reaction occurs in the reaction region of the reactor; the solid carbon material is made via the reaction; the solid carbon material is made during the reaction in the form of a dispersion comprising the solid carbon material dispersed in the liquid; and the chemical reaction is a homogeneous reaction comprising homogeneous nucleation of the solid carbon material in the reaction region of the reactor. Preferably, the chemical reaction comprises gas-liquid mass transfer. Preferably, but not necessarily, a composition of the gas is different from a composition of the liquid. Preferably, but not necessarily, a composition of the at least one gaseous compound is different from a composition of the at least one liquid organic compound. For example, having the gas (or the at least one gaseous organic compound thereof) and the liquid (or the at least one liquid organic compound thereof) be of different chemical composition (e.g., propane and ethanol) may provide for a wider degree of flexibility in the type, composition, and properties of the resulting made solid carbon material(s), compared to an equivalent process where the gas and the liquid are of equivalent chemical composition. Optionally, the chemical reaction does not occur on or at a catalyst. Preferably, but not necessarily, the method does not include a heterogeneous nucleation of the solid carbon material on a solid substrate. Optionally, the step of delivering the liquid is performed via a first input stream into the reaction region and the step of delivering the gas is performed via a second input stream into the reaction region; wherein the first stream path and the second input stream are different and physically separate. Optionally, the step of delivering the liquid and the step of delivering the gas are performed concurrently. Optionally, the step of delivering the gas is performed after the liquid is delivered to the reaction region (e.g., such as, but not necessarily, in a batch process where liquid is first delivered to a batch reactor and then the gas is delivered during the period when the reaction is desired to take occur). Preferably, the solid carbon material remains dispersed in the liquid while present in the reaction region. Preferably, but not necessarily, the liquid is substantially free of a solid carbon material during the step of delivering the liquid and prior to the steps of delivering the gas and inducing the chemical reaction. Preferably, but not necessarily, the liquid is substantially free of solid particles and is substantially not a colloid, suspension, or sol material during the step of delivering the liquid and prior to the steps of delivering the gas and inducing the chemical reaction. Preferably, but not necessarily, the solid carbon material is formed only in the reaction region of the reactor. Optionally, the solid carbon material is not made when the method is performed without the step of delivering the gas with otherwise equivalent steps and conditions. Preferably, but not necessarily, delivering the gas comprises entraining the gas, injecting the gas, or a combination of these. Optionally, the gas is entrained in the liquid under pressure, the gas is injected into the liquid, or the gas is bubbled into the liquid, or a combination of these. Preferably, the gas is delivered directly into the reaction region during the step of delivering the gas. The pressure in the reaction region is any suitable pressure that enables gas-liquid mass transfer (e.g., 10 to 5,000 psi, 50 to 3,000 psi, etc.). Preferably, but not necessarily, the steps of delivering the gas and inducing the chemical reaction are performed simultaneously or near simultaneously (e.g., within 5 minutes, within 4 minutes, within 2 minutes, within 1 minute, within 30 seconds, within 15 seconds, within 10 seconds, within 5 seconds, or within 1 second). Preferably, the at least one liquid organic compound and the at least one gaseous organic compound are simultaneously (e.g., within 5 minutes, within 4 minutes, within 2 minutes, within 1 minute, within 30 seconds, within 15 seconds, within 10 seconds, within 5 seconds, or within 1 second) present in the reaction region. Preferably, making the carbon material comprises nucleating the carbon material in the liquid. Preferably, making the carbon material comprises nucleating the carbon material in the liquid and growing the carbon material in the liquid. Optionally, the solid carbon material is a plurality of carbon materials. Optionally, the reactor is a cavitation reactor, a shear reactor, a stir tank reactor, or a multifunctional reactor. In some embodiments, the reactor is a cavitation reactor; the reaction zone is a cavitation zone of the cavitation reactor; and the method comprises forming cavitation bubbles in the liquid within the cavitation region of the cavitation reactor.

Compared to conventional processes, the inventive methods disclosed herein can take minutes, or even seconds, rather than hours, are low cost, use minimal undesirable chemicals, use less energy, and/or are highly scalable. It was surprisingly discovered that with the inventive methods, a solid carbon material, such as graphene or a graphene-like material, can be produced directly (i.e., a single step) in a fluid in the form of a dispersion, including a stable dispersion. A dispersed solid carbon material (e.g., graphene or graphene-like material) has one or more advantages compared to a solid powder. These advantages include that liquids can be diluted much easier than powder, liquids are easier to work with from a material handling viewpoint, and/or producing a solid carbon material directly, in a single step, in a fluid is less costly than making a powder and then dispersing the powder.

In the inventive method, the reactor is any suitable reactor that facilitates a gas-liquid mass transfer to form a solid carbon material from the at least one gaseous organic compound and the at least one liquid organic compound. In general, the reactor will be one that can induce cavitation, shear, high pressure, high temperatures, and/or mixing or any combination of these conditions. In embodiments, the reactor is selected from the group consisting of a cavitation reactor, a shear reactor, a stir tank reactor, or a combination of these. Specific examples of a suitable reactor that can induce cavitation, shear, high pressure, high temperatures, and/or mixing include a stir tank reactor, a turbine reactor, a monolith reactor, a foam reactor, a rotor stator reactor, a bench shear reactor, a high speed shear reactor (e.g., Charles Ross HSM-700), a hydrodynamic cavitation reactor, an orifice reactor, a tube rotating reactor, a rotating packed bed reactor, a zig-zag rotating reactor, a fluidized bed reactor, a Taylor-Couette reactor, a tube-in-tube reactor, a spinning disc reactor, an impinging streams reactor, a supersonic gas-solid reactor, an ultrasonication reactor, a probe sonication reactor, microwave irradiation reactor, a shockwave reactor (e.g., SHOCKWAVE POWER™ Reactor (SPR); Hydro Dynamics, Inc., Rome, Ga.), a continuous flow reactor (e.g., a RAPTOR™ reactor; La Mesta Chimie Fine, Gilette, France), a shear mixer reactor, and any combination of these. For example, a hydrodynamic cavitation reactor can be integrated with a stir tank reactor or a stir tank reactor can be integrated with a shear reactor. It will be appreciated that a reactor can be classified under one or more categories for inducing a gas-liquid mass transfer (e.g., cavitation, shear, high pressure, and/or high temperatures).

Optionally, the step of inducing the chemical reaction comprises inducing a shear force in the liquid. Optionally, the reactor is a stir tank reactor comprising an agitator; and wherein the agitator induces the shear force in the liquid. Optionally, the agitator is selected from the group consisting of a gas-inducing stirrer, a Rushton stirrer/turbine, a monolithic stirrer, a spiral stirrer, a plates or radial flat blade impeller, an axion propeller, a pitched blade, a turbine vortex agitator, multiple stirrers on one shaft, and any combination of these. Optionally, the agitator is a gas-inducing stirrer. Optionally, the agitator is characterized by a rotational speed selected from the range of 200 rpm to 14,000 rpm (e.g., 250 to 12,000 rpm, 500 to 10,000 rpm, 1,000 to 5,000 rpm, 1,000 to 3,000 rpm, 1,000 to 1,200 rpm). The shear created by the impeller in a stir tank reactor is largely determined by the ratio of the impeller diameter (D) to the tank diameter (T). The D/T ratio is typically in the range of 0.1 to 0.6, preferably 0.2 to 0.5. Low D/T ratios produces high shear, and typically run at higher rpm's, while high D/T ratios produce low shear and are run at lower rpm. Optionally, the step of inducing the chemical reaction comprises agitating or stirring the liquid and the gas in the reaction region, which can include reducing an average size of bubbles of the gas in the liquid in the reaction region. Optionally, a pressure in the reactor region is selected from the range of 6 bar (about 87 psi) to 150 bar (about 2175 psi). Optionally, a temperature in the reaction region is selected from the range of 20° C. to 250° C. (e.g., 20° C. to 200° C., 20° C. to 150° C., 20° C. to 100° C., 30° C. to 250° C., 30° C. to 200° C., 30° C. to 150° C., 30° C. to 100° C., 40° C. to 250° C., 40° C. to 200° C., 40° C. to 150° C., 40° C. to 100° C., 50° C. to 250° C., 50° C. to 200° C., 50° C. to 150° C., 50° C. to 100° C., 50° C. to 90° C., or 60° C. to 100° C.).

In an aspect, provided herein is a method for making a solid carbon material, the method comprising: delivering a liquid comprising at least one liquid organic compound into a cavitation reactor; forming cavitation bubbles in the liquid within a cavitation region of the cavitation reactor; and delivering a gas comprising at least one gaseous organic compound into the cavitation region of the cavitation reactor; thereby making the carbon material in the form of a dispersion comprising the carbon material dispersed in the liquid. In some embodiments, the cavitation reactor is a hydrodynamic cavitation reactor, a shear reactor, an ultrasonic cavitation reactor, or a multifunctional reactor. In some embodiments, the cavitation reactor comprises hydrodynamic cavitation; or wherein the cavitation reactor comprises ultrasonic cavitation. In some embodiments, the cavitation reactor comprises hydrodynamic cavitation and a rotor stator reactor; or wherein the cavitation reactor comprises ultrasonic cavitation and a rotor stator reactor. In some embodiments, the cavitation reactor comprises a rotor stator reactor, a bench shear reactor, a high speed shear reactor, a hydrodynamic cavitation reactor, an orifice reactor, a rotating packed bed reactor, a spinning disc reactor, an impinging streams reactor, a supersonic gas-solid reactor, an ultrasonication reactor, a probe sonication reactor, a shear mixer reactor, or a combination of these. In some embodiments, delivering the gas comprises entraining the gas, injecting the gas, or a combination of these. In some embodiments, the gas is entrained in the liquid. In some embodiments, the gas is injected into the liquid. In some embodiments, the gas is bubbled into the liquid. In some embodiments, the gas is delivered directly into the cavitation region during the step of delivering the gas. In some embodiments, the steps of forming cavitation bubbles and delivering the gas are performed simultaneously or near simultaneously (e.g., within 5 minutes, within 4 minutes, within 2 minutes, within 1 minute, within 30 seconds, within 15 seconds, within 10 seconds, within 5 seconds, or within 1 second). In some embodiments, the step of forming cavitation bubbles comprises nucleating cavitation bubbles. In some embodiments, during the step of delivering the gas, the gas is delivered directly to or within 1 mm of a cavitation bubble-nucleation region, the cavitation bubble-nucleation region corresponding to nucleation of the cavitation bubbles in the cavitation reaction during the step of forming. In some embodiments, the forming step comprises forming a cavitation cloud comprising the cavitation bubbles in the cavitation region of the reactor, wherein the gas is delivered directly inside or within 1 mm of the cavitation cloud. In some embodiments, the dispersion is formed in the cavitation region of the reactor. In some embodiments, the forming step comprises forming a cavitation cloud comprising the cavitation bubbles; wherein the carbon material is formed within the cavitation cloud. In some embodiments, the liquid is substantially free of the carbon material during the step of delivering the liquid and prior to formation of cavitation bubbles therein. In some embodiments, the liquid is substantially free of solid particles and is substantially not a colloid, suspension, or sol material during the step of delivering the liquid and prior to formation of cavitation bubbles therein. In some embodiments, making the carbon material comprises nucleating the carbon material in the liquid. In some embodiments, making the carbon material comprises nucleating the carbon material in the liquid and growing the carbon material in the liquid. In some embodiments, the carbon material is a plurality of carbon materials.

In some embodiments, the cavitation reactor is or comprises a hydrodynamic cavitation reactor having a pre-cavitation region and an orifice region, wherein the orifice region is between the pre-cavitation region and the cavitation region. The orifice region comprises at least one orifice, such that the liquid flows from the pre-cavitation region to the cavitation region through at least one orifice. In other words, during the step of delivering the liquid, the liquid can be delivered to the pre-cavitation region such that the liquid subsequently flows from the pre-cavitation region, through at least one orifice, to the cavitation region. Each of the at least one orifice is characterized by an internal diameter that is less than an internal diameter of the pre-cavitation region. In some embodiments, an internal diameter of the cavitation region immediately outside of at least one orifice is greater than an orifice internal diameter of the orifice. In some embodiments, the gas is delivered directly to a cavitation end of the at least one orifice or within 1 mm of an end of the at least one orifice; the cavitation end of the at least one orifice being an end of the at least one orifice nearest to the cavitation region of the cavitation reactor. In some embodiments, the gas is delivered to within 1 mm (e.g., within 0.8 mm, within 0.6 mm, within 0.5 mm, within 0.3 mm, within 0.2 mm) of or directly into an outlet side of at least one orifice (e.g., one or more gas delivery tubes end and deliver gas thereto).

In some embodiments, during the step of delivering the gas, the gas is delivered directly to within 1 mm, within 0.8 mm, within 0.6 mm, within 0.5 mm, within 0.3 mm, within 0.2 mm, or within 0.1 mm, or preferably for some applications directly in a cavitation bubble-nucleation region. The cavitation bubble-nucleation region corresponds to the site of nucleation of the cavitation bubbles in the cavitation reaction during the step of forming. In some embodiments, during the step of delivering the gas, the gas is delivered directly to within 1 mm, within 0.8 mm, within 0.6 mm, within 0.5 mm, within 0.3 mm, within 0.2 mm, or within 0.1 mm, or preferably for some applications directly in the reaction region (e.g., the cavitation region) of the reactor.

In some embodiments, the forming step comprises forming a cavitation cloud comprising the cavitation bubbles in the cavitation region of the reactor, wherein the gas is delivered directly to within 1 mm, within 0.8 mm, within 0.6 mm, within 0.5 mm, within 0.3 mm, or 0.2 mm, or preferably for some applications directly inside of the cavitation cloud.

In some embodiments, the dispersion is at least partially formed in the reaction region (e.g., the cavitation region) of the reactor. In some embodiments, the dispersion is substantially formed in the reaction region (e.g., the cavitation region) of the reactor. In some embodiments, the dispersion is at least partially formed in the cavitation cloud of the reactor (when the reactor is a cavitation reactor). In some embodiments, the dispersion is substantially formed in the cavitation cloud of the reactor (when the reactor is a cavitation reactor). In some embodiments, the dispersion is at least partially formed in a cavitation bubble-nucleation region of the reactor (when the reactor is a cavitation reactor).

In some embodiments, the forming step comprises forming a cavitation cloud comprising the cavitation bubbles; wherein the carbon material is formed within the cavitation cloud. In some embodiments, the liquid is substantially free of the carbon material or nuclei thereof during the step of delivering the liquid and prior to formation of cavitation bubbles therein. For example, the liquid is substantially free of the carbon material or nuclei thereof before the liquid is delivered. In some embodiments, the liquid is substantially free of the carbon material or nuclei thereof before the liquid enters the cavitation region of the cavitation reactor. For example, the liquid is substantially free of the carbon material or nuclei thereof before the liquid enters an orifice of the orifice region of the hydrodynamic cavitation reactor. For example, the liquid is substantially free of the carbon material or nuclei thereof before the liquid exits an orifice of the orifice region of the hydrodynamic cavitation reactor. For example, the liquid is substantially free of the carbon material or nuclei thereof before the liquid is inside, within 1 mm, or within 1 cm of a cavitation bubble-nucleation region. In some embodiments, the liquid is substantially free of solid particles and is substantially not a colloid, suspension, or sol material during the step of delivering the liquid and prior to formation of cavitation bubbles therein. For example, the liquid is substantially free of solid particles and is substantially not a colloid, suspension, or sol material before the liquid enters an orifice of the orifice region of the hydrodynamic cavitation reactor. In some aspects, the liquid is substantially free of solid particles and is substantially not a colloid, suspension, or sol material before the liquid exits an orifice of the orifice region of the hydrodynamic cavitation reactor. For example, the liquid is substantially free of solid particles and is substantially not a colloid, suspension, or sol material before the liquid is inside, within 1 mm, or within 1 cm of a cavitation bubble-nucleation region.

In some embodiments, formation or nucleation of the carbon material occurs within 1 minute (e.g., within 30 seconds, 20 seconds, 5 seconds, or 1 second) after formation of the cavitation bubbles in the liquid. In some embodiments, nucleation of the carbon material occurs within 1 minute (e.g., within 30 seconds, 20 seconds, 5 seconds, or 1 second) after nucleation of the cavitation bubbles within 1 mm (e.g., within 0.8 mm, 0.6 mm, 0.5 mm, 0.3 mm, or 0.2 mm) of a cavitation bubble-nucleation region while the gas is delivered to the cavitation region.

In some embodiments, the method of making a solid carbon material comprises a step of terminating delivery of the gas into the reaction region (e.g., the cavitation region). A size characteristic of the carbon material may change, decrease, or preferably for some applications increase after the step of terminating. For example, carbon material particles, such as graphene particles, or nuclei thereof may increase in: number of graphene layers therein, particle or layer length, particle or layer width, particle or layer diameter, particle or layer thickness, or any combination thereof. For example, carbon material particles, such as graphene particles, or nuclei thereof may decrease in: number of graphene layers therein, particle or layer length, particle or layer width, particle or layer diameter, particle or layer thickness, or any combination thereof. For example, back pressure (e.g., via closing a valve downstream from the cavitation region and retaining fluid therein while continuation to delivery fluid) and/or edge shear (e.g., for liquid flowing through an orifice) can lead to reduction in a size characteristic of the carbon material such as reducing size of graphene platelets or number of layers in graphene platelets.

In some embodiments, the method of making a solid carbon material comprises retaining the dispersion in the reaction region (e.g., the cavitation region) for a time that is less than or equal to 60 minutes (e.g., less than or equal to 30 minutes, less than or equal to 20 minutes, less than or equal to 10 minutes, less than or equal to 5 minutes, less than or equal to 1 minute) or selected from the range of 1 to 60 minutes, 2 to 60 minutes, 1 to 30 minutes, 1 to 20 minutes, 1 to 10 minutes, or preferably for some applications 1 to 5 minutes after the step of terminating and while the gas is not delivered into the reaction region (e.g., the cavitation region). For example, the dispersion (or, liquid having carbon material dispersed therein) can be made to circulate or otherwise remain at least partially or substantially within the reaction region (e.g., the cavitation region) after the gas delivery is terminated or otherwise shut off. For example, a valve can be at least partially closed downstream from the reaction region (e.g., the cavitation region) during the step of retaining in order to at least partially retain the dispersion in the reaction region (e.g., the cavitation region). For example, during retaining of the dispersion in the cavitation region, the dispersion is at least partially or substantially within the cavitation cloud during at least 1%, at least 10%, at least 20%, at least 50%, or at least 75% of the duration of the retaining step. For example, during retaining of the dispersion in the cavitation region, the dispersion can be at least partially or substantially within a cavitation bubble-nucleation region during at least 1%, at least 10%, at least 20%, at least 50%, or at least 75% of the duration of the retaining step. In some embodiments, during the retaining step, a size characteristic of the carbon material can change, decrease, or preferably for some applications, increase. In some embodiments, concentration of the carbon material in the dispersion remains substantially constant during the step of retaining after delivery of the gas is terminated and while the gas is not delivered into the reaction region (e.g., the cavitation region). In some embodiments, concentration of the carbon material in the dispersion decreases during the step of retaining after delivery of the gas is terminated. For example, carbon material can nucleate in the liquid during the step of delivery the gas, but the carbon material can substantially cease to nucleate after gas delivery is turned off, though one or more size characteristics of the carbon material can continue to change. For example, due to the ceasing of nucleation of the carbon material, the concentration of the carbon material can be constant or can decrease if, for example, carbon material particles coalesce (e.g., aggregate and/or agglomerate) and/or the volume of liquid corresponding to the dispersion increases. In some embodiments, during the step of retaining the dispersion in the reaction region (e.g., the cavitation region) and after the step of terminating and while the gas is not delivered into the reaction region (e.g., the cavitation region), the method of making a solid carbon material further comprises a step of degassing the liquid or the dispersion to decrease a concentration of the gas entrained therein.

In some embodiments, the method of making a solid carbon material comprises recovering the carbon material, from the dispersion, in a solid or powder form. The step of recovering can include, e.g., filtration, vacuum filtration, solvent evaporation, centrifugation, or any combination thereof.

In some embodiments, a concentration of the at least one liquid organic compound in the liquid (e.g., water) is selected from the range of 1 mass % to 100 mass %. In an embodiment, a concentration of the at least one liquid organic compound in the liquid is selected from the range of 25 mass % to 100 mass %.

In some embodiments, a concentration of the produced solid carbon material in in the liquid is selected from the range of 0.0025 mass % to 7 mass % (e.g., 0.0075 mass % to 7 mass %, 0.01 mass % to 5 mass %, 0.1 mass % to 5 mass %, 0.5 mass % to 4 mass %, 1 mass % to 3 mass %, 1 mass % to 2 mass %). The desired concentration can depend on the final application of the carbon material dispersion. For example, for a lubrication fluid, the desired concentration can have substantially about 0.01 mass % of carbon material. For example, for making graphene powder, the concentration can have substantially about 5 mass % of carbon material.

In some embodiments, the at least one liquid organic compound comprises or is selected from the group consisting of a monomer, an oligomer, a prepolymer, a polymer, an organic solvent, and any combination thereof. In some embodiments, the at least one liquid organic compound comprises thermos polyurethane TPU and/or epoxy. In some embodiments, the at least one liquid organic compound comprises or is selected from the group consisting of methanol, ethanol, isopropyl alcohol, methylpyrrolidone, d-cyclopentadiene, hexane, benzene, toluene, heptane, xylene, dimethyl sulfoxide, mineral oil, motor oil, MOBILE 1™ motor oil, Syn 530 motor oil, AMSOIL™, NonSyn, QUAKER STATE™ 530, base oil, hydrogenated castor oil, transmission oil, gear oil, vegetable oil, hydrocarbon base oil, additized oil, non-additized oil (e.g., high carbon oil), kerosene, diesel fuel, ethylene glycol, propylene glycol, diethylene glycol, triethylamine, trimethylamine, pentane, cyclopentane, cyclohexane, 1,4-dioxane, chloroform, diethyl ether, dichloromethane, tetrahydrofuran, ethyl acetate, acetone, dimethylformamide, acetonitrile, nitromethane, propylene carbonate, formic acid, butanol, propanol, acetic acid, octadecene, oleic acid, oleylamine, octane, diethylene glycol ether, 1,2-dicholorobenzene, methyl acetate, tetrachloroethylene, diphenylthiourea, hexafluro-2-propanol, cinnamic acid, trimethylamine, benzenthiol, ethanethiol, ethanedithiol, 4-aminobenzenethiol, acrylic acid, carbon disulfide, 1,2-dichlorobenzene, N-methyl-2-pyrrolidone, and any combination thereof.

In some embodiments, the gaseous organic compound comprises or is selected from the group consisting of alkane, alkene, alkyne, cycloalkane, heterocycyloalkane, arene, heteroarene, and a combination thereof. The alkane can be, for example, $C_{1-20}$ alkanes, $C_{1-12}$ alkanes, $C_{1-8}$ alkanes, $C_{1-6}$ alkanes, $C_{1-4}$ alkanes. The alkene can be, for example, $C_{1-20}$ alkenes, $C_{1-12}$ alkenes, $C_{1-8}$ alkenes, $C_{1-6}$ alkenes, $C_{1-4}$ alkenes. The alkyne can be, for example, $C_{1-20}$ alkynes, $C_{1-12}$ alkynes, $C_{1-8}$ alkynes, $C_{1-6}$ alkynes, $C_{1-4}$ alkynes. The cycloalkane can be, for example, $C_{3-10}$ cycloalkane, $C_{3-6}$ cycloalkane. The heterocycyloalkane can be, for example, a stable, saturated, or partially unsaturated monocyclic, bicyclic, and spiro ring system containing 3 to 7 ring members of carbon atoms and other heteroatoms selected from N, S, and/or O. Examples of such heterocycloalkanes include isoxazole, thiazoline, imidazolidine, piperazine, homopiperazine, pyrrole, pyrroline, pyrazole, pyran, piperidine, oxazole, and morpholine. The arene can be, for example, $C_{6-30}$ arene, $C_{6-18}$ arene, $C_{6-10}$ arene, such as benzene and naphthalene. The heteroarene can be, for example, an aromatic 5 or 6 membered monocyclic group, 9 or 10 membered bicyclic group, or 11 to 14 membered tricyclic group, each with at least one heteroatom (O, S, or N) in at least one of the rings and each ring has at least one carbon atom. Illustrative examples of heteroarene include pyridine, pyridazine, pyrimidine, pyrazine, benzimidazole, triazine, imidazole, (1,2,3)- and (1,2,4)-triazole, pyrazine, tetrazole, furan, benzofuran, pyrrole, thiene, isothiazole, thiazole, isoxazole, and oxadiazole.). The alkane, alkene, alkyne, cycloalkane, heterocycloalkane, arene, and heteroarene can be optionally substituted with one or more substituents (e.g., 1 to 5, 1 to 4, 1 to 3, or 1 or 2), such as alkyl, aryl, halo (F, Cl, Br, I), nitro (—$NO_2$), cyano (—CN), hydroxy (—OH), thiol (—SH), alkoxy (—OR), formyl (—C(O)H), carboxy (—COOH), carboxyalkyl (—RCOOH), alkylcarboxy (—C(O)OR), amido (—C(O)NH or —NHC(O)H), mono- or dialkylamido (—C(O)NRR' or —NRC(O)H), amino, or mono- or dialkylamino, in which R is alkyl and R' is hydrogen or alkyl, as described herein.

Examples of the gaseous organic compound include methane, acetylene, ethylene, propane, 1,3-butadiene, butane, and any combination thereof.

The gaseous organic compound is delivered at a flow rate that is suitable for the type of reactor and conditions used. In some embodiments, the gaseous organic compound is characterized by a flow rate selected from the range of 6 mL/min to 15 mL/min (e.g., 6 mL/min to 12 mL/min, 7 mL/min to 10 mL/min) in the reaction region of a reactor, particularly when the reactor is a hydrodynamic cavitation reactor, a bench shear reactor, or a high speed shear reactor (e.g., Charles Ross HSM-700).

In some embodiments, the gas comprises a reducing compound (e.g., hydrogen), an oxidizing compound (e.g., oxygen, ozone, peroxide, or water), an inert compound (e.g., argon, nitrogen), or any combination of these.

In some embodiments, the liquid is characterized by a bulk temperature of less than 400° C., less than 300° C., less than 200° C., less than or equal to 100° C., less than or equal to 80° C., less than or equal to 50° C., less than or equal to 40° C., less than or equal to 35° C., and/or 20° C. or more in the reaction region (e.g., cavitation region). In some embodiments, the gas is characterized by a bulk temperature of less than 400° C., less than 300° C., less than 200° C., less than or equal to 100° C., less than or equal to 80° C., less than or equal to 50° C., less than or equal to 40° C., less than or equal to 35° C., and/or 20° C. or more in the reactor, optionally in or near the reaction region (e.g., cavitation region). Any two of the foregoing endpoints can be used to define a close-ended range, or a single endpoint can be used to define an open-ended range.

In some embodiments, the liquid is characterized by a flow rate selected from the range of 5 L/min to 200 L/min (e.g., 5 L/min to 100 L/min, 5 L/min to 50 L/min, 10 L/min to 200 L/min, or 10 L/min to 100 L/min) in the reaction region of a reactor, such as a cavitation region of a hydrodynamic cavitation reactor or a sonication cavitation reactor, a shear reactor, or a stir tank reactor. In some embodiments, the gas is delivered (e.g., injected) at a pressure selected from the range of 2 psi to 150 psi (e.g., 2 to 100 psi, 5 to 100 psi, 10 to 90 psi, 20 to 70 psi) in the reaction region (e.g., cavitation region). In some embodiments, the pressure in the reaction region (e.g., cavitation region) is selected from the range of 10 psi to 5,000 psi (e.g., 200 psi to 4,000 psi, 1,000 to 3,000 psi). In some embodiments, the reactor comprises a rotor stator and wherein the rotor stator is operated at a using rotational speed selected from the range of 200 rpm to 14,000 rpm (e.g., 250 to 12,000 rpm, 500 to 10,000 rpm, 1,000 to 5,000 rpm, 1,000 to 1,200 rpm) in the reaction region (e.g., cavitation region) of the reactor. In some embodiments, the liquid residence time in the reactor (e.g., cavitation reactor) is selected from the range of 0.05 to 20 seconds. In some embodiments, the method is performed for a process time of at least 1 minute, and preferably up to 60 minutes (e.g., at least 2 min, at least 5 min, at least 10 min and/or up to 15 min, up to 20 min, up to 30 min, up to 40 min, up to 50). Any two of the foregoing endpoints can be used to define a close-ended range, or a single endpoint can be used to define an open-ended range. In some embodiments, the reactor (e.g., cavitation reactor) comprises an ultrasonication reactor, in which the ultrasonication reactor is operated at an ultrasonication frequency of 20 kHz to 300 kHz and an amplitude range of 10 to 100%.

In general, the solid carbon material is not produced when the method is performed in the absence of the step of delivering the gas with otherwise equivalent steps and conditions.

In some embodiments, the method of making a solid carbon material comprises functionalizing the solid carbon material to provide a functionalized solid carbon material. In some embodiments of the method of making a solid carbon material, the dispersion is a first dispersion, the carbon material is a precursor material, and the cavitation reactor is a first cavitation reactor; the method further comprising: delivering the first dispersion into a second cavitation reactor; forming cavitation bubbles in the first dispersion within a cavitation region of the second cavitation reactor; and delivering a gas comprising at least one gaseous organic compound directly into the cavitation region of the second cavitation reactor; thereby converting the precursor material into a second carbon material, the second carbon material being in the form of a second dispersion comprising the second carbon material dispersed in the liquid; wherein the precursor material and the second carbon material are different. In some embodiments, the first cavitation reactor and the second cavitation reactor are the same.

In some embodiments, the dispersion is a first dispersion, the chemical reaction is a first chemical reaction, the gas is a first gas, the reactor is a first reactor, and the solid carbon material is a precursor material. In such embodiments, the method further comprises: delivering the first dispersion into a second reactor; delivering a second gas comprising at least one gaseous organic compound directly into a reaction region of the second reactor; and inducing a second chemical reaction in the reaction region of the second reactor; wherein: the second chemical reaction converts the precursor material into a second solid carbon material; the second carbon material is dispersed in the liquid; and the precursor material and the second carbon material are different. Optionally, the second reactor is a cavitation reactor and the step of inducing comprises forming cavitation bubbles in the first dispersion within the reaction region of the second reactor, as described herein. Optionally, the first reactor and the second reactor are the same.

In some embodiments, the dispersion is a colloid, a suspension, or a combination thereof. In some embodiments, the carbon material comprises graphite, expanded graphite, a graphite-like material, graphene, a graphene-like material, carbon platelets, carbon nanotubes, carbon onions, other carbon allotrope, a composite comprising graphene, cationic graphene, or any combination thereof. In some embodiments, the carbon material comprises sulfur and graphene or comprises hexagonal boron nitride and graphene. In some embodiments, the carbon material comprises graphene or a graphene-like material. In some embodiments, the carbon material is graphene or a graphene-like material. In some embodiments, the carbon material comprises a graphene-polymer nanocomposite. In some embodiments, the graphene is rippled graphene, crumpled graphene, graphene with holes, or any combination thereof.

In some embodiments, the solid carbon material is characterized by an oxygen content of less than or equal to 10 at. % (e.g., less than or equal to 7 at. %, less than or equal to 5 at. %, less than or equal to 1 at. %, less than or equal to 0.5 at. %, or less than or equal to 0.1 at. %) ("at. %" is atomic percent). In some embodiments, the carbon material is characterized by a ratio of carbon:oxygen atomic concentrations, such as at least 150:1, at least 175:1, at least 200:1, at least 225:1, or at least 249:1. In some embodiments, the carbon material is substantially free of oxygen. In some embodiments, the carbon material is crystalline (e.g., crystalline graphene). In some embodiments, hydrodynamic cavitation creates micron graphene-like platelets. In some embodiments, high shear yields crystalline graphene material. In some embodiments, the dispersion or the carbon material in the dispersion is characterized by a Zeta potential greater than +40 mV or less than −160 mV. In some embodiments, the dispersion or the carbon material in the dispersion is characterized by a Zeta potential greater than +20 mV or less than −20 mV. In some embodiments, the dispersion or the carbon material in the dispersion is characterized by a Zeta potential greater than +30 mV or less than −30 mV. In some embodiments, the dispersion or the carbon material in the dispersion is characterized by a Zeta potential greater than +40 mV or less than −40 mV. In some embodiments, the dispersion or the carbon material in the dispersion is characterized by a Zeta potential greater than +50 mV or less than −50 mV. In some embodiments, the dispersion or the carbon material in the dispersion is characterized by a Zeta potential greater than +60 mV or less than −60 mV. In some embodiments, the dispersion or the carbon material in the dispersion is characterized by an absolute value of the Zeta potential selected from the range of 20 mV to 100 mV. In some embodiments, the dispersion or the carbon material in the dispersion is characterized by an absolute value of the Zeta potential selected from the range of 20 mV to 80 mV. In some embodiments, the dispersion or the carbon material in the dispersion is characterized by an absolute value of the Zeta potential selected from the range of 20 mV to 70 mV. In some embodiments, the dispersion or the carbon material in the dispersion is characterized by an absolute value of the Zeta potential selected from the range of 20 mV to 60 mV. In some embodiments, the dispersion or the carbon material in the dispersion is characterized by an absolute value of the Zeta potential selected from the range of 20 mV to 50 mV. In some embodiments, the dispersion is characterized by a coefficient of friction that is reduced by at least 5%, preferably at least 10%, more preferably at least 20%, still more preferably at least 30%, and further more preferably at least 50% with respect to the same liquid without the solid carbon material.

It has been discovered that the in situ formation of a solid carbon material in a dispersion enhances the lubrication of a fluid. The enhancement can be measured in terms of a reduction in wear scar and/or coefficient of friction to the same liquid without the solid carbon material. In some embodiments, the dispersion is characterized by a wear scar that is reduced by at least 3%, optionally at least 5%, preferably at least 10%, more preferably at least 20%, still more preferably at least 30%, and further more preferably at least 50% with respect to the same liquid without the solid carbon material. The wear scar value can be measured by any suitable technique, including ASTM D 4172, Four Ball Wear of oil with coefficient of friction graph. In some embodiments, the method further comprises using the solid carbon material or the dispersion for friction reduction. In some embodiments, the dispersion reduces a coefficient of friction by at least 5% (e.g., at least 10%, at least 20%, at least 30%, at least 40%, at least 50%, and/or up to 80%, up to 70%, up to 60%, or up to 50%). Any two of the foregoing endpoints can be used to define a close-ended range, or a single endpoint can be used to define an open-ended range. In some embodiments, the dispersion is used for friction reduction without cleaning or isolating the carbon material from the dispersion. In some embodiments, the carbon material or the dispersion is part of a battery (e.g., a battery anode and/or battery cathode), an electrically-conductive material, a thermally-conductive material, a lubricating fluid, and/or a heat transfer fluid. Optionally, the method comprises in situ friction reduction.

In some embodiments, the reactor (e.g., cavitation reactor, stir tank reactor) comprises a cooling system. In some embodiments, the reactor (e.g., cavitation reactor, stir tank reactor) comprises a heat exchanger and/or chiller. In some embodiments, the reactor (e.g., cavitation reactor, stir tank reactor) comprises a plurality of reaction regions (e.g., cavitation regions). In some embodiments, the hydrodynamic cavitation reactor comprises a plurality of orifices.

Also disclosed herein is a method for functionalizing a first solid carbon material dispersed in a liquid, the first solid carbon precursor material dispersed in the liquid being a first dispersion, wherein the method comprises steps of: delivering the first dispersion into a reaction region of a reactor; wherein the liquid comprises at least one liquid organic compound; delivering a gas into the reaction region of the reactor; and inducing a functionalization chemical reaction, wherein: the functionalization chemical reaction forms a second carbon material from the first carbon material; the functionalization chemical reaction occurs in the reaction region of the reactor; and the second solid carbon material is made during the reaction in the form of a second dispersion, the second dispersion comprising the second solid carbon material dispersed in the liquid. Optionally, the functionalization chemical reaction comprises chemically, physically, or both chemically and physically functionalizing the first solid carbon material. Optionally, the first solid carbon material comprises graphene oxide, graphite, expanded graphite, a graphite-like material, graphene, a graphene-like material, carbon platelets, carbon nanotubes, carbon onions, other carbon allotrope, a composite comprising graphene, cationic graphene, or any combination thereof. Optionally, the second solid carbon material comprises, reduced graphene oxide, graphene oxide, edge-oxidized graphene, graphite, expanded graphite, a graphite-like material, graphene, a graphene-like material, carbon platelets, carbon nanotubes, carbon onions, other carbon allotrope, a composite comprising graphene, cationic graphene, or any combination thereof. Optionally, the first solid carbon material comprises graphene oxide and the second solid carbon material comprises reduced graphene oxide. Optionally, an atomic percent of oxygen in the second carbon material is at least 50% less than an atomic percent of oxygen in the first carbon material. Optionally, the functionalization chemical reaction comprises oxidizing the first solid carbon material such that the second solid carbon material is soluble in water. Optionally, the liquid comprises water and the second dispersion is an aqueous dispersion of the second carbon material in the water. Optionally, the functionalization chemical reaction comprises adding oxygen atoms to the first solid carbon material, removing oxygen atoms from the first solid carbon material, adding carbon atoms to the first solid carbon material, adding nitrogen atoms to the first solid carbon material, adding sulfur atoms to the first solid carbon material, or a combination thereof. Optionally, the gas comprises oxygen, water vapor, hydrogen, nitrogen, sulfur dioxide, $CO_2$, ozone, or any combination thereof. Optionally, the reactor is a cavitation reactor and the reaction region is a cavitation region; the method comprises forming cavitation bubbles in the liquid within the cavitation region of the cavitation reactor; and the gas is injected directly into the cavitation region. Optionally, the first solid carbon material is not chemically associated with a solid substrate during the functionalization chemical reaction. Optionally, the gas comprises at least one gaseous organic compound (e.g., methane, acetylene, ethylene, propane, 1,3-butadiene, butane, and combinations thereof).

In an aspect, provided herein is a method for functionalizing a material dispersed in a liquid, the material dispersed in the liquid being a first dispersion, the method comprises steps of: delivering the first dispersion into a cavitation reactor; wherein the liquid comprises at least one liquid organic compound; forming cavitation bubbles in the liquid within a cavitation region of the hydrodynamic cavitation reactor; and delivering a gas comprising at least one gaseous organic compound directly into the cavitation region of the cavitation reactor; thereby functionalizing the material to form a second dispersion, the second dispersion comprising the functionalized material dispersed in the liquid. In some embodiments, functionalizing the material comprises chemically, physically, or both chemically and physically functionalizing the material. In some embodiments, the material comprises graphene, carbon nanotubes, carbon onions, other carbon allotrope, hexagonal boron nitride, or any combination thereof. In some embodiments, the functionalized material comprises graphene oxide. In some embodiments, functionalizing comprises adding oxygen atoms to the material, removing oxygen atoms from the material, adding nitrogen atoms to the material, adding sulfur atoms to the material, or a combination thereof. In some embodiments, the gas comprises oxygen, water vapor, hydrogen, nitrogen, sulfur dioxide, or any combination thereof. In some embodiments, the gas is delivered directly into the cavitation region during the step of delivering the gas. In some embodiments, the steps of forming cavitation bubbles and delivering the gas are performed simultaneously or near simultaneously (e.g., within 5 minutes, within 4 minutes, within 2 minutes, within 1 minute, within 30 seconds). In some embodiments, the step of forming cavitation bubbles comprises nucleating cavitation bubbles. In some embodiments, during the step of delivering the gas, the gas is delivered directly to or within 1 mm of a cavitation bubble-nucleation region, the cavitation bubble-nucleation region corresponding to nucleation of the cavitation bubbles in the cavitation reaction during the step of forming. In some embodiments, the forming step comprises forming a cavitation cloud comprising the cavitation bubbles in the cavitation region of the reactor, wherein the gas is delivered directly inside or within 1 mm of the cavitation cloud. In some embodiments, the method of functionalizing a material comprises terminating delivery of the gas and retaining the dispersion in the cavitation region while the gas is not delivered into the cavitation region. In some embodiments, during the step of retaining the dispersion in the cavitation region and after the step of terminating and while the gas is not delivered into the cavitation region, the method of functionalizing further comprises a step of degassing the dispersion to decrease a concentration of the gas entrained therein.

In some embodiments, the hydrodynamic cavitation reactor comprises a pre-cavitation region and an orifice region, wherein the orifice region is between the pre-cavitation region and the cavitation region. The orifice region comprises at least one orifice, such that the liquid flows from the pre-cavitation region to the cavitation region through at least one orifice. In other words, during the step of delivery the liquid, the liquid can be delivered to the pre-cavitation region such that the liquid subsequently flows from the pre-cavitation region, through at least one orifice, to the cavitation region. Each of the at least one orifice is characterized by an orifice internal diameter that is less than an internal diameter of the pre-cavitation region. In some embodiments, an internal diameter of the cavitation region immediately outside of at least one orifice is greater than an orifice internal diameter of the orifice. In some embodiments, the gas is delivered to within 1 mm (e.g., within 0.8 mm, within 0.6 mm, within 0.5 mm, within 0.3 mm, within 0.2 mm) or directly into an end (e.g., exit) of at least one orifice (e.g., one or more gas delivery tubes end and deliver gas thereto).

Also disclosed herein is a method for making a solid carbon material or dispersion thereof comprising any one or any combination of embodiments of the methods disclosed herein, including methods for making a solid carbon material and methods for functionalizing a material. Also disclosed herein is a method for functionalizing a solid carbon material comprising any one or any combination of embodiments of the methods disclosed herein, including methods for making a solid carbon material and methods for functionalizing a material.

Included herein are methods for making solid carbon materials, which are compatible with a variety of reactor technologies. Generally, and without wishing to be bound to any particular theory, the reactors useable for the methods disclosed herein facilitate a chemical reaction that includes gas-liquid mass transfer in order to make the solid carbon material(s). Reactors that facilitate a chemical reaction that includes gas-liquid mass transfer in order to make the solid carbon material(s) will be referred to herein as "gas-liquid mass transfer reactors." Cavitation reactors, such as those described herein, can be exemplary gas-liquid mass transfer reactors that facilitate a chemical reaction that include gas-liquid mass transfer in order to make the solid carbon material(s). Shear reactors, such as those described herein, can be exemplary gas-liquid mass transfer reactors that facilitate a chemical reaction that includes gas-liquid mass transfer in order to make the solid carbon material(s). In certain embodiments, stir tank reactors, such as described herein, including an agitator, such as a gas-inducing stirrer, can produce shear to facilitate a chemical reaction that includes gas-liquid mass transfer in order to make the solid carbon material(s). Relevant reactors that can be used as gas-liquid mass transfer reactors according to embodiments described herein include, but are not limited to: stirred or rotating tank reactors (including turbine, monolith, and foam reactors), tube rotating reactors (including packed bed, zig-zag bed, fluidized bed, Taylor-Couette, and tube-in-tube reactors), rotating disk reactors (including rotor stator, thin-film, and spinning disk reactors), shockwave reactors, and continuous flow reactors.

It should be noted however, that the reactors described herein, such as cavitation reactors and stir tank reactors, for example, are not necessarily gas-liquid mass transfer reactors or are not necessarily (inherently) used in a way that facilitate a chemical reaction that includes gas-liquid mass transfer in order to make the solid carbon material(s). Methods disclosed herein describe how to facilitate gas-liquid mass transfer to make solid carbon materials in reactors that can be configured to be compatible with the methods described herein.

Without wishing to be bound by any particular theory, a gas-liquid mass transfer processes or mechanism, as used herein, can involve three steps: (1) gas-liquid mass transfer, (2) which gives rise to chemical reactions that (3) make solid carbon material(s), such as graphene-like material(s) or onion-like carbon (OLC). Gas-liquid mass transfer is a physical phenomenon that under certain conditions gives rise to chemical reactions. These reactions take place as diffused gas molecules are exchanged at a gas-liquid interface. To facilitate making the solid carbon materials, according to embodiments herein, gas is preferably dispersed in a liquid with small gas bubbles. Smaller bubbles create greater surface area at the interface, and thus produce greater gas transfer into the liquid (see, for example, Sideman et al., *Ind. Eng. Chem.* 1966, 58, 7, 32-47). Without wishing to be bound by any particular theory, the phenomenon of "mass transfer with chemical reaction" takes place whenever one phase is brought into contact with one or more other phases not in chemical equilibrium with it. This phenomenon has industrial, biological, and physiological importance. In chemical process engineering, it is encountered in both separation processes and reaction engineering. In some cases, a chemical reaction may deliberately be employed for speeding up the rate of mass transfer and/or for increasing the capacity of the solvent; in other cases the multiphase reaction system is a part of the process with the specific aim of product formation.

Without wishing to be bound by any particular theory, gas-liquid mass transfer reactors accelerate transfer of gas to liquid by adding conditions of high pressure, heat or extreme mixing, shear, or a combination of each. Numerous gas-liquid transfer reactor technologies have been developed, some of which are pilot scale systems (Visscher et al., *Chemical Engineering Research And Design*, 2013, 91, 1923-1940) others are industrial scale systems, such as industrial water treatment, liquid catalytic hydrogenation, and removal of $CO_2$ by reacting $CO_2$ gas with reactive solvents (Numerical Gas-Liquid Mass Transfer: Application In Water Treatment Process And Experimental Validation, October 1999, Conference: Second European Congress Of Chemical Engineering (Ecce2), At: Montpellier, France; Yuea et al., Chinese Academy Of Sciences, Beijing 100039, 21 Dec. 2006 Available Online 17 Jan. 2007, and *Introduction To Modeling Of Mass Transfer Processes*, P. A. Ramachandran, Mar. 14, 2018).

When a gas is reacted with a liquid, mass transfer occurs simultaneously with chemical reaction. In such a situation, chemical kinetics are coupled with mass transport, which means there is no longer simple a chemical reaction, but rather, a complex chemical-physical process. Depending on the reactor and various operating parameters, the process may tend toward being diffusion rate limited or reaction rate limited. For example, the process can be viewed as first requiring infusing gas in the fluid as a bubble, which is limited by diffusion, followed by a reaction at the interface of the fluid and gas in the bubble.

Figure 22:
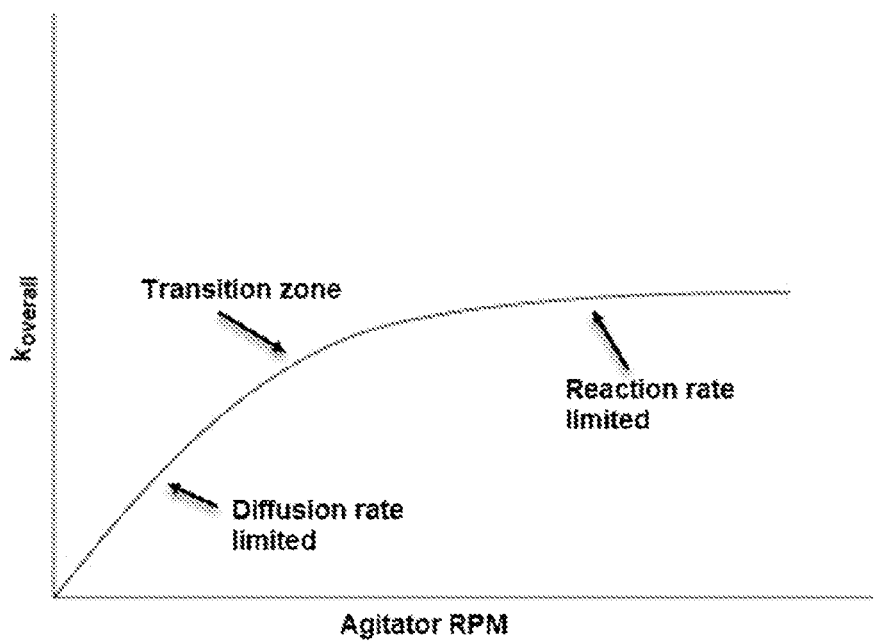
FIG. 22 is a diagram of K overall vs agitator rpm from the book "Scaling Chemical Processes, Practical Guides in Chemical Engineering" by Jonathan Wostell, 2016.

Basic chemical engineering theory postulates a linear relationship between the degree of agitation, shear, or mixing and an overall outcome ($K_{overall}$), such as in stir tank reactor systems. At lower rates of agitation, the process is "diffusion" rate limited, but at a certain level of agitation, there is a transition zone where the outcome plateaus and becomes "reaction" rate limited. This is illustrated in FIG. 22, for example, a diagram of $K_{overall}$ vs agitator rpm from the book "Scaling Chemical Processes, Practical Guides in Chemical Engineering" by Jonathan Wostell, 2016.

It is also important to account for the degree to which the gas is soluble in the liquid. If the gas is sparingly soluble in the liquid, the process will tend toward being diffusion rate limited.

As will be appreciated from the foregoing and the following discussions, a notable improvement of the methods and system described herein over conventional technologies for making solid carbon materials, including particularly graphene and graphene-like materials, for example, is that the solid carbon materials are made in the form of in situ dispersions. In others words, as made and upon being made, the solid carbon materials are dispersed in the host liquid. By contrast, certain conventional technologies for making graphene, such as those utilizing chemical vapor deposition, form graphene on or otherwise physically and/or chemically associated with a solid substrate. According to such conventional technologies, obtaining a dispersion of graphene requires subsequently removing graphene from said substrate and then dispersing the graphene in a liquid, thereby not making an in situ dispersion. Dispersions of graphene, or other solid carbon materials, are useful for various applications, including, but not limited to, lubrication. Additionally, dispersions can be easier and safer to work with than dry solid powders, even in cases where the ultimate use requires a solid carbon material in powder form. Furthermore, drying or filtering a dispersion can be easier and less expensive than the chemistry required to disperse a solid powder into a solvent. Thus, the methods disclosed herein are advantageous by providing in situ dispersions comprising solid carbon material(s) that are produced in a single step rather than multiple steps. In an embodiment, the present invention provides a dispersion comprising at least one solid carbon material in a liquid, wherein the at least one solid carbon material is produced in accordance with any of the methods described herein. The solid carbon material and liquid are as described throughout. In some embodiments, the dispersion can be described as stable, such that solid carbon material particles remain dispersed in the dispersion and do not sediment or precipitate out of the liquid of the dispersion for a prescribed time period (e.g., at least 1 hour, at least 2 hours, at least 3 hours, at least 5 hours, at least 12 hours, at least 24 hours, at least 36 hours, at least 48 hours, or at least 1 week) under normal temperature and pressure (NTP) and exposure to air.

Throughout the following description, hydrodynamic cavitation reactors and methods employing hydrodynamic cavitation reactors are described. As evident from the foregoing, hydrodynamic cavitation reactors, as used and described herein, are a subset of gas-liquid mass transfer reactors that are compatible with the methods disclosed herein for making and for functionalizing solid carbon materials.

A portion of an exemplary hydrodynamic cavitation reactor 100 useful for the methods disclosed herein is illustrated in FIG. 1. Hydrodynamic cavitation reaction 100 is an exemplary reactor for making a solid carbon material, according to certain embodiments herein. The hydrodynamic cavitation reactor 100 includes a pre-cavitation chamber 102, an internal volume of which corresponds to a pre-cavitation region 104. Pre-cavitation chamber 102 is operably connected to an orifice plate 106. Orifice plate 106 comprises an orifice 110 having an orifice region 108. Orifice plate 106 is operably connected to cavitation chamber 112. An internal volume of cavitation chamber 112 corresponds to a cavitation region 114. The operable connection between pre-cavitation chamber 102, orifice plate 106, and cavitation chamber 112 allows for a liquid 120, which is delivered to pre-cavitation region 104 of pre-cavitation chamber 102, to flow from pre-cavitation region 104, through orifice region 108 of orifice 110, and into cavitation region 114 of cavitation chamber 112, as illustrated by liquid flow direction arrows 122(I) and 122(II). A sudden pressure change associated with liquid 120 transitioning from orifice region 108 to cavitation region 114 causes formation of cavitation bubbles 118 at a cavitation bubble-nucleation region 116. Cavitation region 114, including the cavitation bubble-nucleation region 116, corresponds to a "reaction region" of the reactor. Cavitation region 114 comprises cavitation bubble-nucleation region 116. For example, cavitation bubbles nucleate immediately at the interface between orifice 110 and cavitation chamber 112. Hydrodynamic cavitation reactor 100 further comprises gas delivery tubes 124(I) and 124(II) for delivering a gas 126 to cavitation region 114, such as directly to cavitation bubble-nucleation region 116. Gas flow direction arrows 128(I) and 128(II) show the direction of gas delivery. Optionally, reactor 100 includes one gas delivery tube or more than two gas delivery tubes. Optionally, reactor 100 includes more than one orifice 110. Hydrodynamic cavitation reactors useful for the methods disclosed herein can have other configurations, including features and configurations of art-known hydrodynamic cavitation reactors.

Included herein is a method of creating in situ carbon materials in the cavitation cloud of a hydrodynamic cavitation reactor, without starting carbon material (e.g., graphitic material). This is achieved by injecting gas on the back side (e.g., exit) of a cavitation orifice where cavitation bubbles are formed. This is essentially an additive manufacturing process where there is a formation and buildup of new carbon material. The type, volume, size, and volume of carbon material is co-determined by the selection of solvents, gas, run time, gas pressure, fluid flow, and/or orifice configuration. The gas-fed reactor can also be implemented with starting graphitic material to form additional materials or to remove physical defects from existing graphene. The process can also be implemented with various gases to functionalize graphene, hexagonal boron, or other carbon-like materials. Compared to conventional processes, the methods disclosed herein can take minutes, or even seconds, rather than hours, are low cost, use minimal undesirable chemicals, use less energy, and/or are highly scalable.

Hydrodynamic cavitation reactors create a cavitation cloud that is a special environment for creating various chemical and physical reactions. Cavitation clouds are produced when there is a sudden drop in pressure as a liquid under high pressure passes through a restriction, such as an orifice. Cavitation clouds consist of millions of micro bubbles that are formed at the exit of the orifice. Cavitation bubbles go through 3 stages: 1) bubble formation, 2) very rapid bubble compression which generates a short-lived localized hot-spot, and 3) bubble collapse that produces an enormous amount of energy. Experimental results have shown that as cavitation bubbles collapse, they produce internal temperatures around 5000 K, pressures of roughly 14,700 psi, and heating and cooling rates above 1010 K/s. These temperature and pressure changes last for less than a few nanoseconds and happen at millions of locations in the cavitation cloud (see, e.g., Understanding Hydrodynamic Cavitation Report. Available from: top-level domain name www.researchgate.net (at subdomain publication/ 314034417 Understanding Hydrodynamic Cavitation Report); last accessed Jun. 28 2018). These intense micro reactor conditions are carried out under ambient conditions (corresponding to bulk temperatures). In comparison, generating such a high temperature and high pressure environment in a traditional reactor could be very costly.

It was discovered that when a carbon fluid, by itself or in combination with an entrained carbon gas, is subject to hydrodynamic cavitation or shear or a combination of hydrodynamic cavitation and shear, carbon materials (e.g., graphene-like materials) are formed in situ. The method includes, inter alia, injecting high carbon gas into a high carbon fluid exceedingly close to where the cavitation bubbles are formed, that is at the backside of the orifice. As used herein, "backside" of an orifice corresponds to an exit point of an orifice with respect to a liquid flowing therethrough, or, in other words, corresponds to a side of the orifice facing the cavitation chamber, or the interface therebetween.

It is also possible, but with much less carbon formation, to inject gas prior to the orifice (e.g., in the pre-cavitation chamber, at/near the interface between an orifice and the pre-cavitation chamber, and/or at the entrance of an orifice into the cavitation chamber). Without wishing to be bound to any particular theory, it is believed that concentrating gas where cavitation bubbles are formed maximizes the dispersion of gas in the cavitation cloud, which in turn heightens the formation of carbon material.

The conventional method of introducing gas into a hydrodynamic cavitation reactor is to bubble or inject the gas prior to the cavitation orifice, which creates entrained (absorbed or dissolved) gas. It was discovered that the traditional method of introducing gas prior to the orifice does not sustain the adsorbed gas. Passing the fluid through the orifice actually removes gas from the fluid. This is substantiated by conventional hydrodynamic cavitation reactors being used to de-gas fluids.

When the traditional method of bubbling acetylene into ethanol (i.e., before the cavitation orifice) is used, very little graphene-like material is formed. In contrast, when gas is injected directly into the cavitation cloud, behind the orifice, an abundance of graphene is formed.

Moreover, since carbon materials are created in situ, it is possible to eliminate the two-step process of creating graphene powder and then re-dispersing the powder into a liquid. For example, carbon platelets can be formed and retained in a liquid (e.g., mineral oil or propylene glycol).

A problem related to re-dispersing graphene powder is that it is difficult to create a colloidal dispersion conventionally. This is because the very act of powdering graphene creates Van der Waals bonding between the graphene plates, which cause the graphene platelets to restack. Re-dispersing the powder in another fluid generally requires a form of shear, sonication or hydrodynamic cavitation. Even then, it is difficult to achieve nano-like colloidal dispersions. In applications where the graphene cannot be left in the carbon containing fluid, the graphene material can be recovered through either filtration or centrifugation.

The invention is further illustrated by the following embodiments.

(Embodiment 1) A method for making a solid carbon material comprising: delivering a liquid comprising at least one liquid organic compound into a cavitation reactor; forming cavitation bubbles in the liquid within a cavitation region of the cavitation reactor; and delivering a gas comprising at least one gaseous organic compound into the cavitation region of the cavitation reactor; thereby making the carbon material in the form of a dispersion comprising the carbon material dispersed in the liquid.

(Embodiment 2) The method of embodiment 1, wherein the cavitation reactor is a hydrodynamic cavitation reactor, a shear reactor, an ultrasonic cavitation reactor, or a multifunctional reactor.

(Embodiment 3) The method of embodiment 2, wherein the cavitation reactor comprises hydrodynamic cavitation and shear; or wherein the cavitation reactor comprises ultrasonic cavitation and shear.

(Embodiment 4) The method of embodiment 2, wherein the cavitation reactor comprises hydrodynamic cavitation and a rotor stator reactor; or wherein the cavitation reactor comprises ultrasonic cavitation and a rotor stator reactor.

(Embodiment 5) The method of embodiment 2, wherein the cavitation reactor comprises a rotor stator reactor, a bench shear reactor, a high speed shear reactor, a hydrodynamic cavitation reactor, an orifice reactor, a rotating packed bed reactor, a spinning disc reactor, an impinging streams reactor, a supersonic gas-solid reactor, an ultrasonication reactor, a probe sonication reactor, a shear mixer reactor, or a combination of these.

(Embodiment 6) The method of any one of embodiments 1-5, wherein delivering the gas comprises entraining the gas, injecting the gas, or a combination of these.

(Embodiment 7) The method of embodiment 6, wherein the gas is entrained in the liquid.

(Embodiment 8) The method of embodiment 6, wherein the gas is injected into the liquid.

(Embodiment 9) The method of embodiment 8, wherein the gas is bubbled into the liquid.

(Embodiment 10) The method of any one of embodiments 1-9, wherein the gas is delivered directly into the cavitation region during the step of delivering the gas.

(Embodiment 11) The method of any one of embodiments 1-10, wherein the steps of forming cavitation bubbles and delivering the gas are performed simultaneously or near simultaneously.

(Embodiment 12) The method of any one of embodiments 1-11, wherein during the step of delivering the gas, the gas is delivered directly into or within 1 mm of a cavitation bubble-nucleation region, the cavitation bubble-nucleation region corresponding to nucleation of the cavitation bubbles in the hydrodynamic cavitation reaction during the step of forming.

(Embodiment 13) The method of any one of embodiments 1-12, the forming step comprising forming a cavitation cloud comprising the cavitation bubbles in the cavitation region of the reactor, wherein the gas is delivered directly inside or within 1 mm of the cavitation cloud.

(Embodiment 14) The method of any one of embodiments 1-13, wherein the dispersion is formed in the cavitation region of the reactor.

(Embodiment 15) The method of any one of embodiments 1-14, the forming step comprising forming a cavitation cloud comprising the cavitation bubbles; wherein the carbon material is formed within the cavitation cloud.

(Embodiment 16) The method of any one of embodiments 1-15, wherein the liquid is substantially free of the carbon material during the step of delivering the liquid and prior to formation of cavitation bubbles therein.

(Embodiment 17) The method of any one of embodiments 1-16, wherein the liquid is substantially free of solid particles and is substantially not a colloid, suspension, or sol material during the step of delivering the liquid and prior to formation of cavitation bubbles therein.

(Embodiment 18) The method of any one of embodiments 1-17, wherein formation of the carbon material occurs within 1 minute after formation of the cavitation bubbles in the liquid.

(Embodiment 19) The method of any one of embodiments 1-18, wherein nucleation of the carbon material occurs within 1 minute after nucleation of the cavitation bubbles within 0.3 mm of a cavitation bubble-nucleation region while the gas is delivered to the cavitation region.

(Embodiment 20) The method of any one of embodiments 1-19, wherein the cavitation reactor comprises a hydrodynamic cavitation reactor having a pre-cavitation region and an orifice region, wherein the orifice region is between the pre-cavitation region and the cavitation region; the orifice region comprising at least one orifice, such that the liquid flows from the pre-cavitation region to the cavitation region through the at least one orifice; wherein each of the at least one orifice is characterized by an orifice diameter that is less than a diameter of the pre-cavitation region.

(Embodiment 21) The method of embodiment 20, wherein the gas is delivered directly to a cavitation end of the at least one orifice or within 1 mm of an end of the at least one orifice; the cavitation end of the at least one orifice being an end of the at least one orifice nearest to the cavitation region of the cavitation reactor.

(Embodiment 22) The method of any one of embodiments 1-21, further comprising a step of terminating delivery of the gas into the cavitation region; wherein a size characteristic of the carbon material increases after the step of terminating.

(Embodiment 23) The method of embodiment 22, further comprising retaining the dispersion in the cavitation region for a time less than or equal to 60 minutes after the step of terminating and while the gas is not delivered into the cavitation region; wherein a size characteristic of the carbon material increases during the step of retaining.

(Embodiment 24) The method of embodiment 23, wherein, during the step of retaining the dispersion in the cavitation region and after the step of terminating and while the gas is not delivered into the cavitation region, the method further comprises a step of degassing the dispersion to decrease a concentration of the gas entrained therein.

(Embodiment 25) The method of any one of embodiments 22-24, wherein a concentration of the carbon material in the dispersion is substantially constant after the step of terminating and while the gas is not delivered into the cavitation region.

(Embodiment 26) The method of any one of embodiments 1-25, further comprising recovering the solid carbon material from the dispersion in a solid or powder form, the step of recovering comprising filtration, vacuum filtration, solvent evaporation, centrifugation, or any combination thereof.

(Embodiment 27) The method of any one of embodiments 1-26, a concentration of the at least one liquid organic compound in the liquid is selected from the range of 1 mass % to 100 mass %.

(Embodiment 28) The method of embodiment 27, a concentration of the solid carbon material in the dispersion is from 0.0025 mass % to 7 mass %.

(Embodiment 29) The method of any one of embodiments 1-28, the at least one liquid organic compound being selected from the group consisting of a monomer, an oligomer, a prepolymer, a polymer, an organic solvent, and any combination thereof.

(Embodiment 30) The method of any one of embodiments 1-29, the at least one liquid organic compound being selected from the group consisting of methanol, ethanol, isopropyl alcohol, methylpyrrolidone, d-cyclopentadiene, hexane, benzene, toluene, heptane, xylene, dimethyl sulfoxide, mineral oil, motor oil, MOBILE 1™ motor oil, Syn 530 motor oil, AMSOIL™, NonSyn, QUAKER STATE™ 530, base oil, hydrogenated castor oil, transmission oil, gear oil, vegetable oil, hydrocarbon base oil, additized oil, non-additized oil (e.g., high carbon oil (HCO), kerosene, diesel fuel, ethylene glycol, propylene glycol, diethylene glycol, triethylamine, trimethylamine, pentane, cyclopentane, cyclohexane, 1,4-dioxane, chloroform, diethyl ether, dichloromethane, tetrahydrofuran, ethyl acetate, acetone, dimethylformamide, acetonitrile, nitromethane, propylene carbonate, formic acid, butanol, propanol, acetic acid, octadecene, oleic acid, oleylamine, octane, diethylene Fglycol ether, 1,2-dicholorobenze, methyl acetate, tetrachloroethylene, diphenylthiourea, hexafluro-2-propanol, cinnamic acid, trimethylamine, benzenthiol, ethanethiol, ethanedithiol, 4-aminobenzenethiol, acrylic acid, carbon disulfide, 1,2-dichlorobenzene, N-methyl-2-pyrrolidone, and any combination thereof.

(Embodiment 31) The method of any one of embodiments 1-30, the gaseous organic compound being selected from the group consisting of methane, acetylene, ethylene, propane, 1,3-butadiene, butane, and any combination thereof.

(Embodiment 32) The method of any one of embodiments 1-31, wherein the liquid is characterized by a bulk temperature of less than 400° C.

(Embodiment 33) The method of any one of embodiments 1-32, wherein the gas is characterized by a bulk temperature of less than 400° C.

(Embodiment 34) The method of any one of embodiments 1-33, wherein the liquid is characterized by a flow rate selected from the range of 5 L/min to 200 L/min in the cavitation region of the cavitation reactor.

(Embodiment 35) The method of any one of embodiments 1-34, wherein the gas is injected at a pressure characterized by a pressure selected from the range of 2 psi to 150 psi in the cavitation region of the cavitation reactor.

(Embodiment 36) The method of any one of embodiments 1-35, wherein the pressure in the cavitation region is selected from the range of 10 psi to 5,000 psi.

(Embodiment 37) The method of any one of embodiments 1-36, wherein the cavitation reactor comprises a rotor stator and wherein the rotor stator is operated at a using rotational speed selected from the range of 200 rpm to 14,000 rpm in the cavitation region of the cavitation reactor.

(Embodiment 38) The method of any one of embodiments 1-37, wherein the liquid residence time in the cavitation reactor is selected from the range of 0.05 to 20 seconds.

(Embodiment 40) The method of any one of embodiments 1-38, wherein the method is performed for a process time selected from the range of 1 to 60 minutes.

(Embodiment 41) The method of any one of embodiments 1-39, wherein the cavitation reactor comprises an ultrasonication reactor and wherein the ultrasonication reactor is operated at an ultrasonication frequency of 20 to 300 kHz and an amplitude range of 10 to 100%.

(Embodiment 42) The method of any one of embodiments 1-40, wherein the carbon material is not made when the method is performed without the step of delivering the gas with otherwise equivalent steps and conditions.

(Embodiment 43) The method of any one of embodiments 1-41, wherein the dispersion or the carbon material in the dispersion is characterized by a Zeta potential greater than +40 mV or less than −160 mV (Embodiment 44) The method of any one of embodiments 1-42, wherein the dispersion or the carbon material in the dispersion is characterized by a Zeta potential greater than +40 mV or less than −40 mV.

(Embodiment 45) The method of any one of embodiments 1-43, wherein a concentration of carbon (atomic concentration) in the solid carbon material in the dispersion is selected from the range of 92 to 99 mass %.

(Embodiment 45) The method of any one of embodiments 1-44, wherein the dispersion is a colloid, a suspension, or a combination thereof.

(Embodiment 46) The method of any one of embodiments 1-45, the carbon material comprising graphene, carbon nanotubes, carbon onions, other carbon allotrope, a composite comprising graphene, or any combination thereof.

(Embodiment 47) The method of embodiment 46, wherein the composite comprises sulfur and graphene or comprises hexagonal boron nitride and graphene.

(Embodiment 48) The method of any one of embodiments 1-47, the carbon material comprising graphene.

(Embodiment 49) The method of embodiment 48, the carbon material being graphene.

(Embodiment 50) The method of any one of embodiments 1-49, the carbon material comprising a graphene-polymer nanocomposite.

(Embodiment 51) The method of any one of embodiments 46-50, the graphene being rippled graphene, crumpled graphene, graphene with holes, or any combination thereof.

(Embodiment 52) The method of any one of embodiments 1-51, wherein the carbon material is characterized by an oxygen content of 7 at. % or less.

(Embodiment 53) The method of any one of embodiments 1-52, further comprising using the carbon material or the dispersion for friction reduction.

(Embodiment 54) The method of embodiment 53, wherein the dispersion reduces a coefficient of friction by at least 5%.

(Embodiment 55) The method of embodiment 53 or 54, wherein the dispersion is used for friction reduction without cleaning or isolating the carbon material from the dispersion.

(Embodiment 56) The method of any one of embodiments 1-55, further comprising using the solid carbon material or the dispersion to enhance a battery anode and/or battery cathode.

(Embodiment 57) The method of any one of embodiments 1-56, further comprising functionalizing the carbon material to provide a functionalized carbon material.

(Embodiment 58) The method of any one of embodiments 1-57, wherein the dispersion is a first dispersion, the carbon material is a precursor material, and the cavitation reactor is a first cavitation reactor; the method further comprising: delivering the first dispersion into a second cavitation reactor; forming cavitation bubbles in the first dispersion within a cavitation region of the second cavitation reactor; and delivering a gas comprising at least one gaseous organic compound directly into the cavitation region of the second cavitation reactor; thereby converting the precursor material into a second carbon material, the second carbon material being in the form of a second dispersion comprising the second carbon material dispersed in the liquid; wherein the precursor material and the second carbon material are different.

(Embodiment 59) The method of embodiment 58, wherein the first hydrodynamic cavitation reactor and the second hydrodynamic cavitation reactor are the same.

(Embodiment 60) A method for functionalizing a material dispersed in a liquid, the material dispersed in the liquid being a first dispersion, wherein the method comprises steps of: delivering the first dispersion into a cavitation reactor; wherein the liquid comprises at least one liquid organic compound; forming cavitation bubbles in the liquid within a cavitation region of the cavitation reactor; and delivering a gas comprising at least one gaseous organic compound directly into the cavitation region of the cavitation reactor; thereby functionalizing the material to form a second dispersion, the second dispersion comprising the functionalized material dispersed in the liquid.

(Embodiment 61) The method of embodiment 60, wherein functionalizing the material comprises chemically, physically, or both chemically and physically functionalizing the material.

(Embodiment 62) The method of embodiment 60 or embodiment 61, the material comprising graphite, expanded graphite, a graphite-like material, graphene, a graphene-like material, carbon nanotubes, carbon onions, other carbon allotrope, a composite comprising graphene, cationic graphene, or any combination thereof.

(Embodiment 63) The method of any one of embodiments 60-62, the functionalized material comprising graphene oxide.

(Embodiment 64) The method of any one of embodiments 60-63 wherein functionalizing comprises adding oxygen atoms to the material, removing oxygen atoms from the material, adding nitrogen atoms to the material, adding sulfur atoms to the material, or a combination thereof.

(Embodiment 65) The method of any one of embodiments 60-64, wherein the gas comprises oxygen, water vapor, hydrogen, nitrogen, sulfur dioxide, $CO_2$, or any combination thereof.

(Embodiment 66) A functionalized material prepared by the method of any one of embodiments 60-65.

The invention is further illustrated by the following additional embodiments:

(Embodiment 101) A method for making a solid carbon material comprising: delivering a liquid comprising at least one liquid organic compound into a reaction region of a reactor; delivering a gas comprising at least one gaseous organic compound into the reaction region of the reactor; and inducing a chemical reaction between the at least one liquid organic compound and the at least one gaseous organic compound, wherein: the chemical reaction occurs in the reaction region of the reactor; the solid carbon material is made via the reaction; the solid carbon material is made during the reaction in the form of a dispersion comprising the solid carbon material dispersed in the liquid; and the chemical reaction is a homogeneous reaction comprising homogeneous nucleation of the solid carbon material in the reaction region of the reactor.

(Embodiment 102) The method of embodiment 101, wherein the chemical reaction comprises gas-liquid mass transfer.

(Embodiment 103) The method of any one of embodiments 101-102, wherein a composition of the gas is different from a composition of the liquid.

(Embodiment 104) The method of any one of embodiments 101-103, wherein a composition of the at least one gaseous compound is different from a composition of the at least one liquid organic compound.

(Embodiment 105) The method of any one of embodiments 101-104, wherein the chemical reaction does not occur on or at a catalyst.

(Embodiment 106) The method of any one of embodiments 101-105, wherein the method does not include a heterogeneous nucleation of the solid carbon material on a solid substrate.

(Embodiment 107) The method of any one of embodiments 101-106, wherein the step of delivering the liquid is performed via a first input stream into the reaction region and the step of delivering the gas is performed via a second input stream into the reaction region; wherein the first stream path and the second input stream are different and physically separate.

(Embodiment 108) The method of any one of embodiments 101-107, wherein the step of delivering the liquid and the step of delivering the gas are performed concurrently.

(Embodiment 109) The method of any one of embodiments 101-107, wherein the step of delivering the gas is performed after the liquid is delivered to the reaction region.

(Embodiment 110) The method of any one of embodiments 101-109, wherein the solid carbon material remains dispersed in the liquid while present in the reaction region.

(Embodiment 111) The method of any one of embodiments 101-110, wherein the liquid is substantially free of a solid carbon material during the step of delivering the liquid and prior to the steps of delivering the gas and inducing the chemical reaction.

(Embodiment 112) The method of any one of embodiments 101-111, wherein the liquid is substantially free of solid particles and is substantially not a colloid, suspension, or sol material during the step of delivering the liquid and prior to the steps of delivering the gas and inducing the chemical reaction.

(Embodiment 113) The method of any one of embodiments 101-112 wherein the solid carbon material is formed only in the reaction region of the reactor.

(Embodiment 114) The method of any one of embodiments 101-113, wherein the solid carbon material is not made when the method is performed without the step of delivering the gas with otherwise equivalent steps and conditions.

(Embodiment 115) The method of any one of embodiments 101-114, wherein delivering the gas comprises entraining the gas, injecting the gas, or a combination of these.

(Embodiment 116) The method of embodiment 115, wherein the gas is entrained in the liquid under pressure.

(Embodiment 117) The method of embodiment 115, wherein the gas is injected into the liquid.

(Embodiment 118) The method of embodiment 115, wherein the gas is bubbled into the liquid.

(Embodiment 119) The method of any one of embodiments 101-18, wherein the gas is delivered directly into the reaction region during the step of delivering the gas.

(Embodiment 120) The method of any one of embodiments 101-119, wherein the steps of delivering the gas and inducing the chemical reaction are performed simultaneously or near simultaneously.

(Embodiment 121) The method of any one of embodiments 101-120, wherein the at least one liquid organic compound and the at least one gaseous organic compound are simultaneously present in the reaction region.

(Embodiment 122) The method of any one of embodiments 101-121, wherein the reactor comprises a stir tank reactor, a turbine reactor, a monolith reactor, a foam reactor, a rotor stator reactor, a bench shear reactor, a high speed shear reactor (e.g., Charles Ross HSM-700), a hydrodynamic cavitation reactor, an orifice reactor, a tube rotating reactor, a rotating packed bed reactor, a zig-zag rotating reactor, a fluidized bed reactor, a Taylor-Couette reactor, a tube-in-tube reactor, a spinning disc reactor, an impinging streams reactor, a supersonic gas-solid reactor, an ultrasonication reactor, a probe sonication reactor, microwave irradiation reactor, a shockwave reactor (e.g., SHOCKWAVE POWER™ Reactor (SPR)), a continuous flow reactor (e.g., a RAPTOR™ reactor), a shear mixer reactor, or a combination of these.

(Embodiment 123) The method of any one of embodiments 101-122, wherein the step of inducing the chemical reaction comprises inducing a shear force in the liquid.

(Embodiment 124) The method of embodiment 123, wherein the reactor is a stir tank reactor comprising an agitator; and wherein the agitator induces the shear force in the liquid.

(Embodiment 125) The method of embodiment 124, wherein the agitator is selected from the group consisting of a gas-inducing stirrer, a Rushton stirrer/turbine, a monolithic stirrer, a spiral stirrer, a plates or radial flat blade impeller, an axion propeller, a pitched blade, a turbine vortex agitator, multiple stirrers on one shaft, and any combination of these.

(Embodiment 126) The method of embodiment 125, wherein the agitator is a gas-inducing stirrer.

(Embodiment 127) The method of any one of embodiments 124-126, wherein the agitator is characterized by a rotational speed selected from the range of 200 to 14,000 rpm.

(Embodiment 128) The method of any one of embodiments 124-127, wherein the step of inducing the chemical reaction comprises agitating or stirring the liquid and the gas in the reaction region.

(Embodiment 129) The method of any one of embodiments 123-128, wherein a pressure in the reactor region is selected from the range of 6 bar (about 87 psi) to 150 bar (about 2175 psi).

(Embodiment 130) The method of any one of embodiments 123-129, wherein a temperature in the reaction region is selected from the range of 20° C. to 250° C.

(Embodiment 131) The method of any one of embodiments 101-122, wherein: the reactor is a cavitation reactor; the reaction zone is a cavitation zone of the cavitation reactor; and the method comprises forming cavitation bubbles in the liquid within the cavitation region of the cavitation reactor.

(Embodiment 132) The method of embodiment 131, wherein the cavitation reactor is a hydrodynamic cavitation reactor, a shear reactor, an ultrasonic cavitation reactor, or a multifunctional reactor.

(Embodiment 133) The method of embodiment 132, wherein the cavitation reactor comprises hydrodynamic cavitation and shear; or wherein the cavitation reactor comprises ultrasonic cavitation and shear.

(Embodiment 134) The method of embodiment 132, wherein the cavitation reactor comprises hydrodynamic cavitation and a rotor stator reactor; or wherein the cavitation reactor comprises ultrasonic cavitation and a rotor stator reactor.

(Embodiment 135) The method of embodiment 132, wherein the cavitation reactor comprises a rotor stator reactor, a bench shear reactor, a high speed shear reactor, a hydrodynamic cavitation reactor, an orifice reactor, a rotating packed bed reactor, a spinning disc reactor, an impinging streams reactor, a supersonic gas-solid reactor, an ultrasonication reactor, a probe sonication reactor, microwave irradiation reactor, a shockwave reactor, a shear mixer reactor, or a combination of these.

(Embodiment 136) The method of any one of embodiments 131-135, wherein the gas is delivered directly into the cavitation region during the step of delivering the gas.

(Embodiment 137) The method of any one of embodiments 131-136, wherein the steps of forming cavitation bubbles and delivering the gas are performed simultaneously or near simultaneously.

(Embodiment 138) The method of any one of embodiments 131-137, wherein during the step of delivering the gas, the gas is delivered directly into or within 1 mm of a cavitation bubble-nucleation region, the cavitation bubble-nucleation region corresponding to nucleation of the cavitation bubbles in the hydrodynamic cavitation reaction during the step of forming.

(Embodiment 139) The method of any one of embodiments 131-138, the forming step comprising forming a cavitation cloud comprising the cavitation bubbles in the cavitation region of the reactor, wherein the gas is delivered directly inside or within 1 mm of the cavitation cloud.

(Embodiment 140) The method of any one of embodiments 131-139, the forming step comprising forming a cavitation cloud comprising the cavitation bubbles; wherein the carbon material is formed within the cavitation cloud.

(Embodiment 141) The method of any one of embodiments 131-140, wherein the liquid is substantially free of the carbon material during the step of delivering the liquid and prior to formation of cavitation bubbles therein.

(Embodiment 142) The method of any one of embodiments 131-141, wherein the liquid is substantially free of solid particles and is substantially not a colloid, suspension, or sol material during the step of delivering the liquid and prior to formation of cavitation bubbles therein.

(Embodiment 143) The method of any one of embodiments 131-142 wherein formation of the carbon material occurs within 1 minute after formation of the cavitation bubbles in the liquid.

(Embodiment 145) The method of any one of embodiments 131-143, wherein nucleation of the carbon material occurs within 1 minute after nucleation of the cavitation bubbles within 0.3 mm of a cavitation bubble-nucleation region while the gas is delivered to the cavitation region.

(Embodiment 146) The method of any one of embodiments 131-144, wherein the cavitation reactor comprises a hydrodynamic cavitation reactor having a pre-cavitation region and an orifice region, wherein the orifice region is between the pre-cavitation region and the cavitation region; the orifice region comprising at least one orifice, such that the liquid flows from the pre-cavitation region to the cavitation region through the at least one orifice; wherein each of the at least one orifice is characterized by an orifice diameter that is less than a diameter of the pre-cavitation region.

(Embodiment 146) The method of embodiment 145, wherein the gas is delivered directly to a cavitation end of the at least one orifice or within 1 mm of an end of the at least one orifice; the cavitation end of the at least one orifice being an end of the at least one orifice nearest to the cavitation region of the cavitation reactor.

(Embodiment 147) The method of any one of embodiments 131-146, further comprising a step of terminating delivery of the gas into the cavitation region; wherein a size characteristic of the carbon material increases after the step of terminating.

(Embodiment 148) The method of embodiment 147, further comprising retaining the dispersion in the cavitation region for a time less than or equal to 60 minutes after the step of terminating and while the gas is not delivered into the cavitation region; wherein a size characteristic of the carbon material increases during the step of retaining.

(Embodiment 149) The method of embodiment 148, wherein, during the step of retaining the dispersion in the cavitation region and after the step of terminating and while the gas is not delivered into the cavitation region, the method further comprises a step of degassing the dispersion to decrease a concentration of the gas entrained therein.

(Embodiment 150) The method of any one of embodiments 147-149, wherein a concentration of the carbon material in the dispersion is substantially constant after the step of terminating and while the gas is not delivered into the cavitation region.

(Embodiment 151) The method of any one of embodiments 101-50, further comprising recovering the solid carbon material from the dispersion in a solid or powder form, the step of recovering comprising filtration, vacuum filtration, solvent evaporation, centrifugation, or any combination thereof.

(Embodiment 152) The method of any one of embodiments 101-121, wherein a concentration of the at least one liquid organic compound in the liquid is selected from the range of 0.01 mass % to 100 mass %.

(Embodiment 153) The method of any one of embodiments 101-152, the at least one liquid organic compound being selected from the group consisting of a monomer, an oligomer, a prepolymer, a polymer, an organic solvent, and any combination thereof.

(Embodiment 154) The method of any one of embodiments 101-153, the at least one liquid organic compound being selected from the group consisting of methanol, ethanol, isopropyl alcohol, methylpyrrolidone, d-cyclopentadiene, hexane, benzene, toluene, heptane, xylene, dimethyl sulfoxide, mineral oil, motor oil, MOBILE 1™ motor oil, Syn 530 motor oil, AMSOIL™, NonSyn, QUAKER STATE™ 530, base oil, hydrogenated castor oil, transmission oil, gear oil, vegetable oil, hydrocarbon base oil, additized oil, non-additized oil (e.g., high carbon oil), kerosene, diesel fuel, ethylene glycol, propylene glycol, diethylene glycol, triethylamine, trimethylamine, pentane, cyclopentane, cyclohexane, 1,4-dioxane, chloroform, diethyl ether, dichloromethane, tetrahydrofuran, ethyl acetate, acetone, dimethylformamide, acetonitrile, nitromethane, propylene carbonate, formic acid, butanol, propanol, acetic acid, octadecene, oleic acid, oleylamine, octane, diethylene glycol ether, 1,2-dicholorobenze, methyl acetate, tetrachloroethylene, diphenylthiourea, hexafluro-2-propanol, cinnamic acid, trimethylamine, benzenthiol, ethanethiol, ethanedithiol, 4-aminobenzenethiol, acrylic acid, carbon disulfide, 1,2-dichlorobenzene, N-methyl-2-pyrrolidone, and any combination thereof.

(Embodiment 155) The method of any one of embodiments 101-154, wherein the liquid comprises water.

(Embodiment 156) The method of any one of embodiments 101-155 the gaseous organic compound being selected from the group consisting of methane, acetylene, ethylene, propane, 1,3-butadiene, butane, and any combination thereof.

(Embodiment 157) The method of any one of embodiments 101-156, wherein the liquid is characterized by a bulk temperature of less than 400° C.

(Embodiment 158) The method of any one of embodiments 101-157, wherein the liquid is characterized by a bulk temperature of 20° C. or more.

(Embodiment 159) The method of any one of embodiments 101-158, wherein the gas is characterized by a bulk temperature of less than 400° C.

(Embodiment 160) The method of any one of embodiments 101-159, wherein the gas is characterized by a bulk temperature of 20° C. or more.

(Embodiment 161) The method of any one of embodiments 101-160, wherein the liquid is characterized by a flow rate selected from the range of 5 L/min to 200 L/min in the cavitation region of the cavitation reactor.

(Embodiment 162) The method of any one of embodiments 101-161, wherein the gas is injected at a pressure characterized by a pressure selected from the range of 2 psi to 150 psi in the reaction region of the reactor.

(Embodiment 163) The method of any one of embodiments 101-162 wherein the pressure in the reaction region is selected from the range of 10 psi to 5,000 psi.

(Embodiment 164) The method of any one of embodiments 101-163, wherein the reactor comprises a rotor stator and wherein the rotor stator is operated at a using rotational speed selected from the range of 200 rpm to 14,000 rpm in the reaction region of the reactor.

(Embodiment 165) The method of any one of embodiments 101-064, wherein the liquid residence time in the reaction region is selected from the range of 1 to 60 minutes.

(Embodiment 166) The method of any one of embodiments 101-165, wherein the method is performed for a process time selected from the range of 1 to 60 minutes.

(Embodiment 167) The method of any one of embodiments 101-166, wherein the reactor comprises an ultrasonication reactor and wherein the ultrasonication reactor is operated at an ultrasonication frequency of 20 to 300 kHz and an amplitude range of 10 to 100%.

(Embodiment 168) The method of any one of embodiments 101-167, wherein the dispersion or the carbon material in the dispersion is characterized by a Zeta potential greater than +40 mV or less than −160 mV.

(Embodiment 169) The method of any one of embodiments 101-168, wherein the dispersion or the carbon material in the dispersion is characterized by a Zeta potential greater than +40 mV or less than −40 mV.

(Embodiment 170) The method of any one of embodiments 101-169, a concentration of the solid carbon material in the dispersion is from 0.0025 mass % to 7 mass %.

(Embodiment 171) The method of any one of embodiments 101-170, wherein the dispersion is a colloid, a suspension, a sol, or a combination thereof.

(Embodiment 172) The method of any one of embodiments 101-171, wherein the solid carbon material comprises graphite, expanded graphite, a graphite-like material, graphene, a graphene-like material, carbon platelets, carbon nanotubes, carbon onions, other carbon allotrope, a composite comprising graphene, cationic graphene, or any combination thereof.

(Embodiment 173) The method of embodiment 172, wherein the composite comprises sulfur and graphene or comprises hexagonal boron nitride and graphene.

(Embodiment 174) The method of any one of embodiments 101-172, the carbon material comprising graphene or a graphene-like material.

(Embodiment 175) The method of embodiment 172, the carbon material being graphene or a graphene-like material.

(Embodiment 176) The method of any one of embodiments 101-172, the carbon material comprising a graphene-polymer nanocomposite.

(Embodiment 177) The method of any one of embodiments 172-176, the graphene being rippled graphene, crumpled graphene, graphene with holes, or any combination thereof.

(Embodiment 178) The method of any one of embodiments 101-177, wherein the carbon material is characterized by an oxygen content of less than 7 at. %.

(Embodiment 179) The method of any one of embodiments 101-178, wherein the dispersion is characterized by a coefficient of friction that is reduced by at least 5% with respect to the same liquid without the solid carbon material.

(Embodiment 180) The method of any one of embodiments 101-179, wherein the dispersion is characterized by a wear scar that is reduced by at least 3% with respect to the same liquid without the solid carbon material.

(Embodiment 181) The method of any one of embodiments 101-180, further comprising using the solid carbon material or the dispersion for friction reduction.

(Embodiment 182) The method of any one of embodiments 101-181 comprising in situ friction reduction.

(Embodiment 183) The method of embodiment 181 or 182, wherein the dispersion is used for friction reduction without cleaning or isolating the solid carbon material from the dispersion.

(Embodiment 184) The method of any one of embodiments 101-180, further comprising using the solid carbon material or the dispersion to enhance a battery anode and/or battery cathode.

(Embodiment 185) The method of any one of embodiments 101-184, further comprising functionalizing the solid carbon material to provide a functionalized solid carbon material.

(Embodiment 186) The method of any one of embodiments 101-185, wherein the dispersion is a first dispersion, the chemical reaction is a first chemical reaction, the solid carbon material is a precursor material, the gas is a first gas, and the reactor is a first reactor; the method further comprising: delivering the first dispersion into a second reactor; delivering a second gas comprising at least one gaseous organic compound directly into a reaction region of the second reactor; and inducing a second chemical reaction in the reaction region of the second reactor; wherein: the second chemical reaction converts the precursor material into a second solid carbon material; the second carbon material is dispersed in the liquid; and the precursor material and the second carbon material are different.

(Embodiment 187) The method of embodiment 186, wherein the second reactor is a cavitation reactor and the step of inducing comprises forming cavitation bubbles in the first dispersion within the reaction region of the second reactor.

(Embodiment 188) The method of any one of embodiments 186-187, wherein the first reactor and the second reactor are the same.

(Embodiment 189) A method for functionalizing a first solid carbon material dispersed in a liquid, the first solid carbon precursor material dispersed in the liquid being a first dispersion, wherein the method comprises steps of: delivering the first dispersion into a reaction region of a reactor; wherein the liquid comprises at least one liquid organic compound; delivering a gas into the reaction region of the reactor; and inducing a functionalization chemical reaction, wherein: the functionalization chemical reaction forms a second carbon material from the first carbon material; the functionalization chemical reaction occurs in the reaction region of the reactor; and the second solid carbon material is made during the reaction in the form of a second dispersion, the second dispersion comprising the second solid carbon material dispersed in the liquid.

(Embodiment 190) The method of embodiment 189, wherein the functionalization chemical reaction comprises chemically, physically, or both chemically and physically functionalizing the first solid carbon material.

(Embodiment 191) The method of embodiment 189 or embodiment 190 wherein the first solid carbon material comprises graphene oxide, graphite, expanded graphite, a graphite-like material, graphene, a graphene-like material, carbon platelets, carbon nanotubes, carbon onions, other carbon allotrope, a composite comprising graphene, cationic graphene, or any combination thereof.

(Embodiment 192) The method of any one of embodiments 189-191, wherein the second solid carbon material comprises, reduced graphene oxide, graphene oxide, edge-oxidized graphene, graphite, expanded graphite, a graphite-like material, graphene, a graphene-like material, carbon platelets, carbon nanotubes, carbon onions, other carbon allotrope, a composite comprising graphene, cationic graphene, or any combination thereof.

(Embodiment 193) The method of any one of embodiments 189-192, wherein the first solid carbon material comprises graphene oxide and the second solid carbon material comprises reduced graphene oxide.

(Embodiment 194) The method of embodiment 193, wherein an atomic percent of oxygen in the second carbon material is at least 50% less than an atomic percent of oxygen in the first carbon material.

(Embodiment 195) The method of any one of embodiments 189-192, wherein the functionalization chemical reaction comprises oxidizing the first solid carbon material such that the second solid carbon material is soluble in water.

(Embodiment 196) The method of embodiments 195, wherein the liquid comprises water and the second dispersion is an aqueous dispersion of the second carbon material in the water.

(Embodiment 197) The method of any one of embodiments 189-196 wherein the functionalization chemical reaction comprises adding oxygen atoms to the first solid carbon material, removing oxygen atoms from the first solid carbon material, adding carbon atoms to the first solid carbon material, adding nitrogen atoms to the first solid carbon material, adding sulfur atoms to the first solid carbon material, or a combination thereof.

(Embodiment 198) The method of any one of embodiments 189-197, wherein the gas comprises oxygen, water vapor, hydrogen, nitrogen, sulfur dioxide, $CO_2$, ozone, or any combination thereof.

(Embodiment 199) The method of any one of embodiments 189-198, wherein: the reactor is a cavitation reactor and the reaction region is a cavitation region; the method comprises forming cavitation bubbles in the liquid within the cavitation region of the cavitation reactor; and the gas is injected directly into the cavitation region.

(Embodiment 200) The method of any one of embodiments 189-199, wherein the first solid carbon material is not chemically associated with a solid substrate during the functionalization chemical reaction.

(Embodiment 201) The method of any one of embodiments 1-200, wherein the gas comprises at least one gaseous organic compound.

(Embodiment 202) The method of any one of embodiments 189-200, the gaseous organic compound is selected from the group consisting of alkane, alkene, alkyne, cycloalkane, heterocycyloalkane, arene, heteroarene, and a combination thereof, wherein the alkane, alkene, alkyne, cycloalkane, heterocycloalkane, arene, or heteroarene can be optionally substituted with one or more substituents.

(Embodiment 203) The method of any one of embodiments 189-202, wherein the at least one gaseous organic compound is selected from the group consisting of methane, acetylene, ethylene, propane, 1,3-butadiene, butane, and any combination thereof.

(Embodiment 204) A functionalized material prepared by the method of any one of embodiments 189-203.

The following examples further illustrate the invention but, of course, should not be construed as in any way limiting its scope.

Example 1

This example demonstrates methods for making one or more carbon material in a liquid using a hydrodynamic cavitation reactor. More particularly, this example provides a method of synthesizing carbon material in the cavitation cloud of a hydrodynamic cavitation reactor. An exemplary embodiment the method comprises: (a) flowing a high carbon liquid (liquid comprising an organic compound) though a hydrodynamic cavitation reactor and then (b) introducing a high carbon gas (gas comprising an organic compound) at the backside of the cavitation orifice at the inception of cavitation bubbles. Within seconds, graphene like materials begin to form in the cavitation cloud. (c) After a predetermined time, the gas flow is terminated, which retards the continued formation of gas synthesized material. Gas pressure and flow time determines the thickness and size of the initial graphene platelets. (d) As an option, the liquid, containing graphene-like material, can be left to circulate for an additional time (e.g., 15 minutes). During this additional circulation time, as a result of entrained gas, the carbon material continues to build. It was discovered that entrained gas introduced on the backside (e.g., exit) of the orifice plate behaves differently than entrained gas injected before the orifice; specifically, post-orifice gas is not as easily degassed, as pre-orifice injected gas. This is substantiated by the fact that when gas is bubbled, or directly injected, before the orifice, minimal carbon material is formed. If, however, when liquid with post-orifice induced gas is left to circulate (while no gas is being injected) there is an additional buildup of carbon material.

After terminating gas delivery and continuing to circulate the dispersion in the cavitation region, the liquid optionally can be degassed. With degassing, shear forces experienced by the particles of carbon material in the dispersion can lead to reduction in one or more size characteristics of the particles. Without degassing, shear forces experienced by the particles of carbon material in the dispersion can lead to an increase in one or more size characteristics of the carbon material in the dispersion (e.g., larger and/or thicker graphene platelets). For example, increased shear forces may make graphene platelets smaller. Gas entrained in the liquid during the exposure of the dispersion to shear forces, or increased shear forces, may make the smaller platelets thinner. A reduced concentration of entrained gas (e.g., via degassing) may prevent thickening of the platelets in this regime (i.e., retaining dispersion in the cavitation region without delivery of the gas).

Example 2

This example demonstrates methods for functionalizing one or more materials, such as carbon materials, using a hydrodynamic cavitation reactor. For example, methods of this example can be used to functionalize graphene. It is possible to functionalize carbon materials made by the process described herein or on carbon materials produced by other methods. Examples of such functionalization include: 1) healing physical defects, 2) chemical functionalization with various gases, and 3) physical functionalization (e.g., changing the morphology of graphene).

Healing Defects: healing physical defects on graphene platelets has been one of the greater challenges to producing pristine graphene. A conventional approach to "healing" graphene defects is to use CVD (chemical vapor deposition) to imbue graphene platelets with a carbon rich gas, such as ethylene. The carbon in the gas effectively fills-in the defects. The CVD process, though, is not easily scalable.

Figure 2:
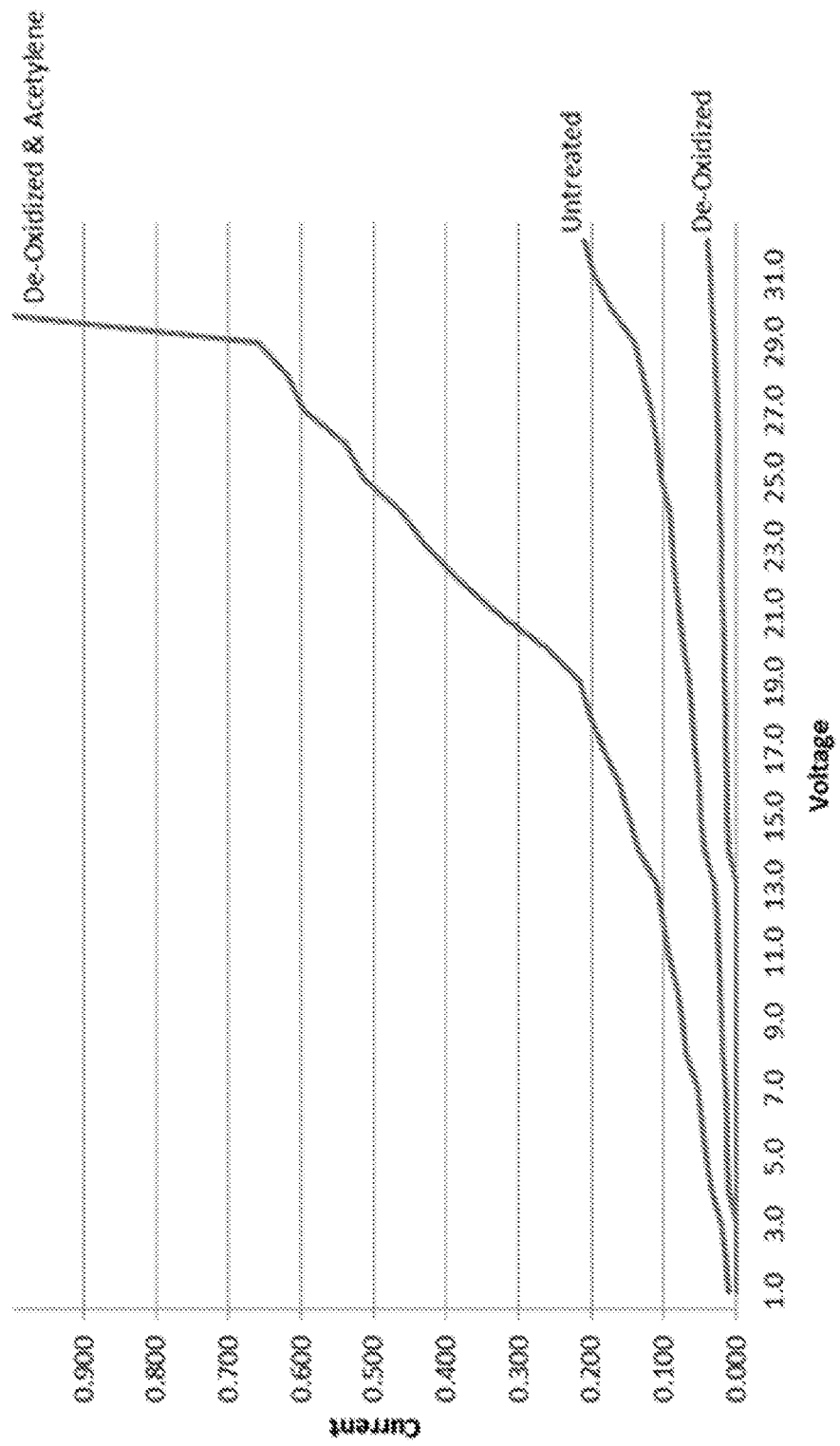
FIG. 2 is a plot of voltage versus current of untreated graphene, deoxidized graphene, and deoxidized graphene treated with acetylene in an embodiment of the invention.

The processes described herein could be used to add carbon to graphene to heal, or patch, graphene defects. This is demonstrated by forming highly defective graphene and then functionalizing it to fix/heal/patch the defects with a high carbon gas. For example, high defect graphene is produced by starting with graphene oxide and then reducing the oxygen on the graphene by subjecting the graphene oxide to harsh chemicals (e.g., sodium borohydride, sulfuric acid) and extremely high temperatures (e.g., 1,100° C.). This creates highly defective reduced graphene oxide (rGO), which is then dispersed in ethanol. The dispersion is then circulated through a hydrodynamic cavitation reactor while acetylene is injected into the cavitation cloud at the backside of the orifice. The acetylene gas "patched" the vacancies in the defective graphene as confirmed by a marked increase in the conductivity of the "patched" graphene on a filter puck. See FIG. 2. For comparison, filter pucks of similar weight were prepared with untreated high oxygen GO and deoxidized, highly reduced GO that had defects. As seen in FIG. 2, there is a noticeable difference in the conductivity between the three filter pucks: 1) untreated, low oxygen graphene, 2) the same graphene after deoxidation (i.e., with defects), and 3) the deoxidized graphene processed with acetylene, i.e., "patched" in an embodiment of the inventive method.

Chemical Functionalization: the methods disclosed herein can also be used to chemically functionalize graphene and other carbon materials by introducing various gases into the cavitation cloud. For example, oxygen can be added to a graphene dispersion to create graphene oxide, argon and/or hydrogen can be added to reduce oxygen on graphene platelets, nitrogen can enhance the lubricity attributes of graphene, and sulfur dioxide can add sulfur to graphene and other carbon materials.

Physical Functionalization: various combinations of gas and back pressure can be employed to create, for example: rippled graphene, crumpled graphene, or graphene with holes. Additionally, various gas and solvent combinations under different pressures and different orifices can be implemented to create carbon nanotubes, carbon onions, or other carbon allotropes.

Example 3

Figure 3:
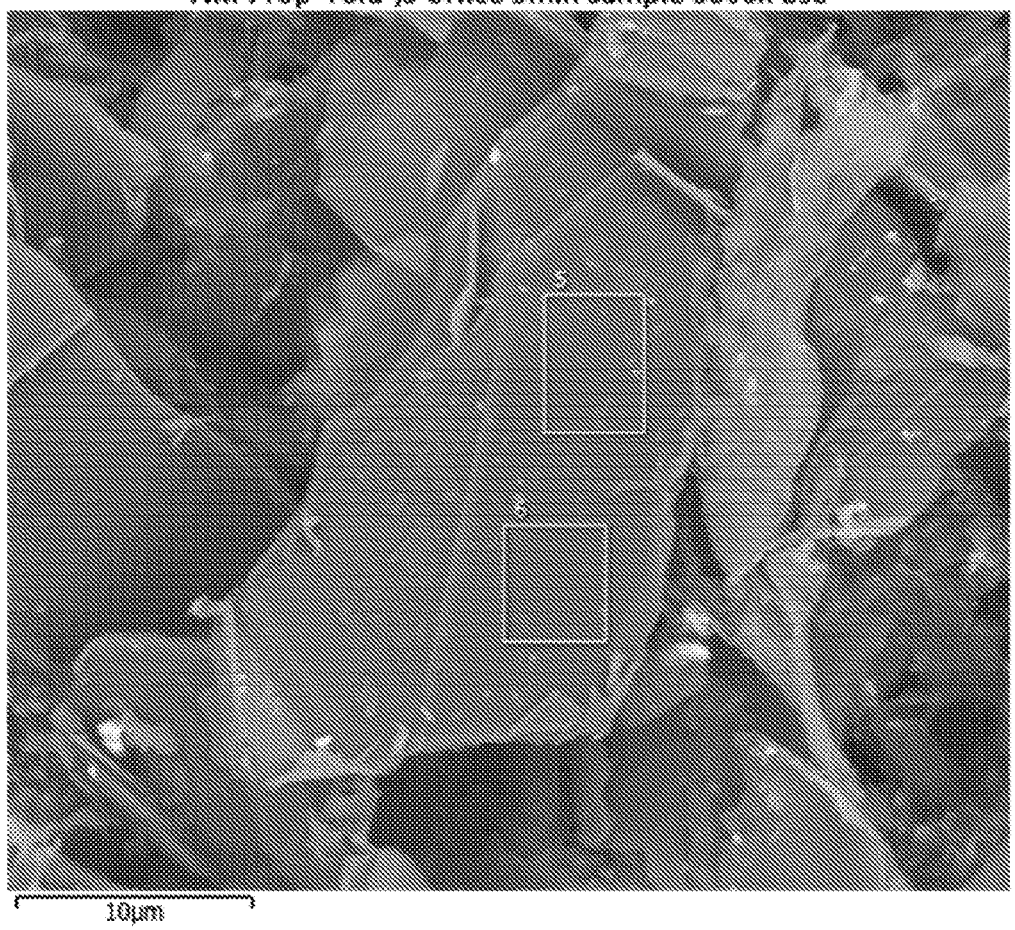
FIG. 3 is a scanning electron microscopy (SEM) image of graphene-like platelets made in accordance with an embodiment of the invention.
Figure 4:
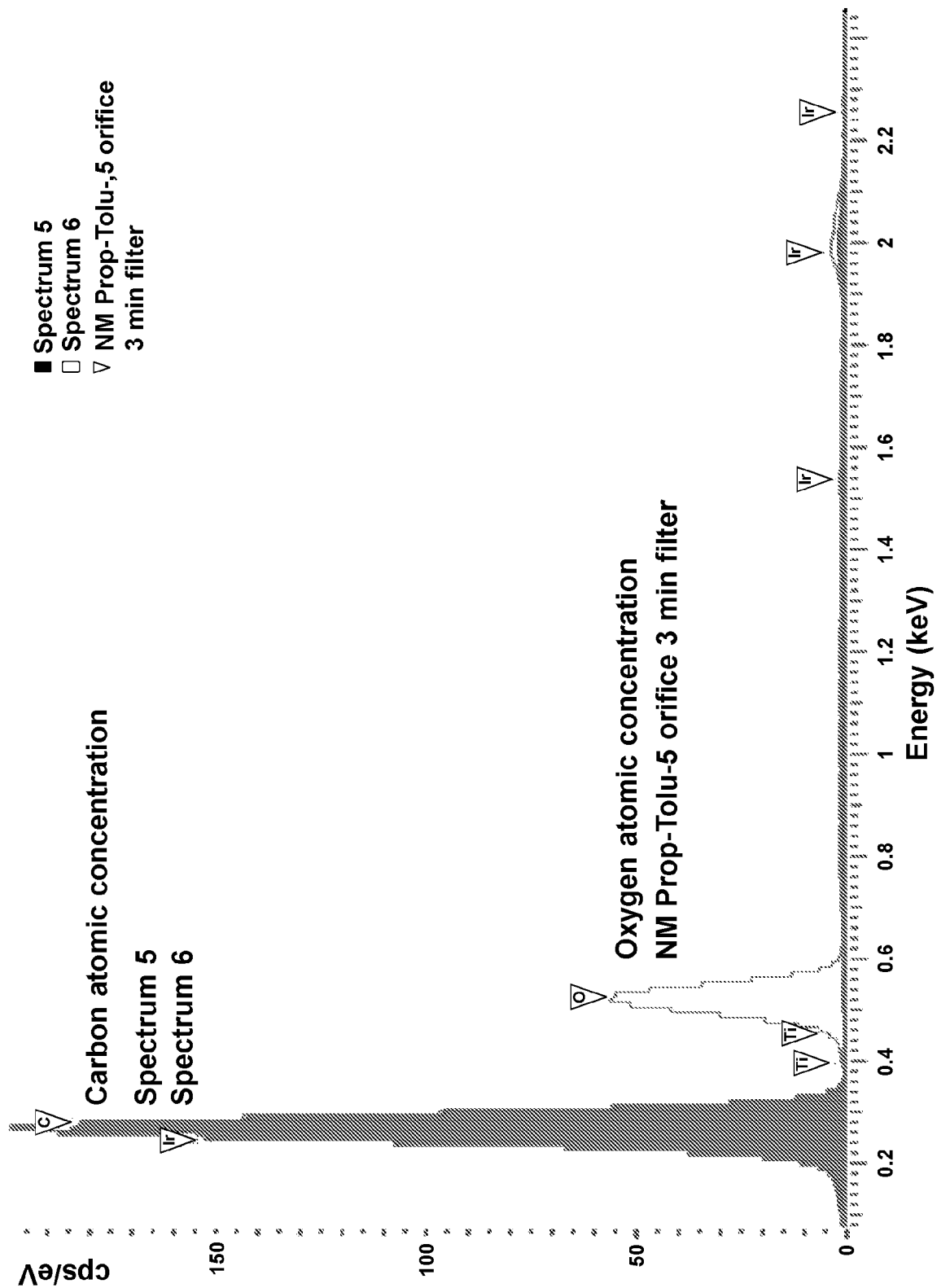
FIG. 4 is a graph of energy (keV) versus intensity using the energy dispersive X-ray spectroscopy (EDS) data measured from two portions of the platelets shown in FIG. 3 (spectrum 5 and spectrum 6 overlap).

In this example, graphene platelets were formed according to certain methods disclosed herein. FIG. 3 shows a scanning electron microscopy (SEM) image of some graphene-like platelets. FIG. 4 shows energy dispersive X-ray spectroscopy (EDS) data measured from two portions of the platelets seen in FIG. 3. The top white square and the bottom white square in the SEM image of FIG. 3 correspond to "Spectrum 5" and "Spectrum 6" data of the EDS graph in FIG. 4. The atomic compositions extracted from the EDS data corresponding to these graphene platelets are summarized in Table 1. In Table 1, "C/O" corresponds to a ratio of carbon to oxygen atomic concentrations.

TABLE 1

| Spectrum Label | Concentration C (at. %) | Concentration O (at. %) | Total Concentration (at. %) | C/O Ratio |
|---|---|---|---|---|
| Spectrum 5 | 99.43 | 0.57 | 100.00 | ~175:1 |
| Spectrum 6 | 99.60 | 0.40 | 100.00 | ~249:1 |

Figure 5A:
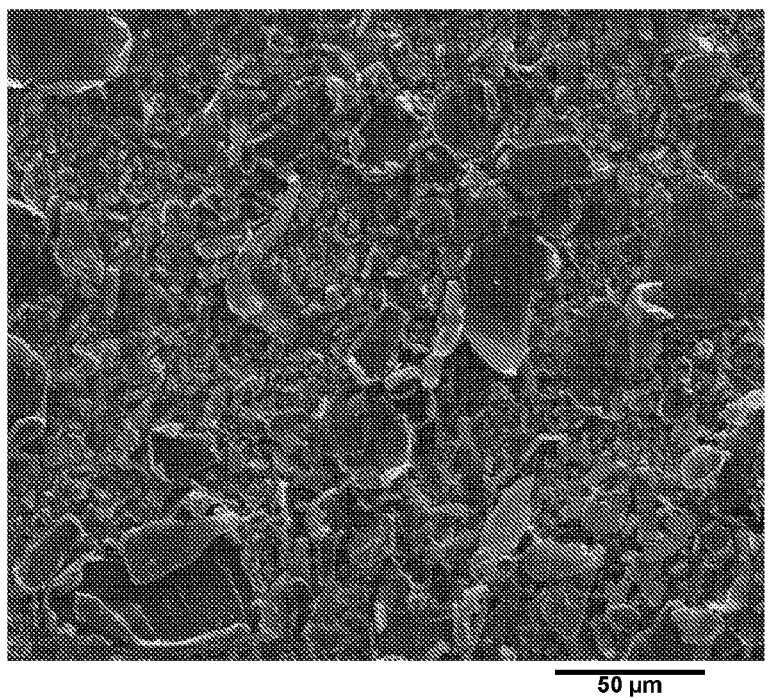
FIG. 5A and FIG. 5B are additional SEM images of exemplary graphene-like platelets produced by embodiments of methods disclosed herein.
Figure 5B:
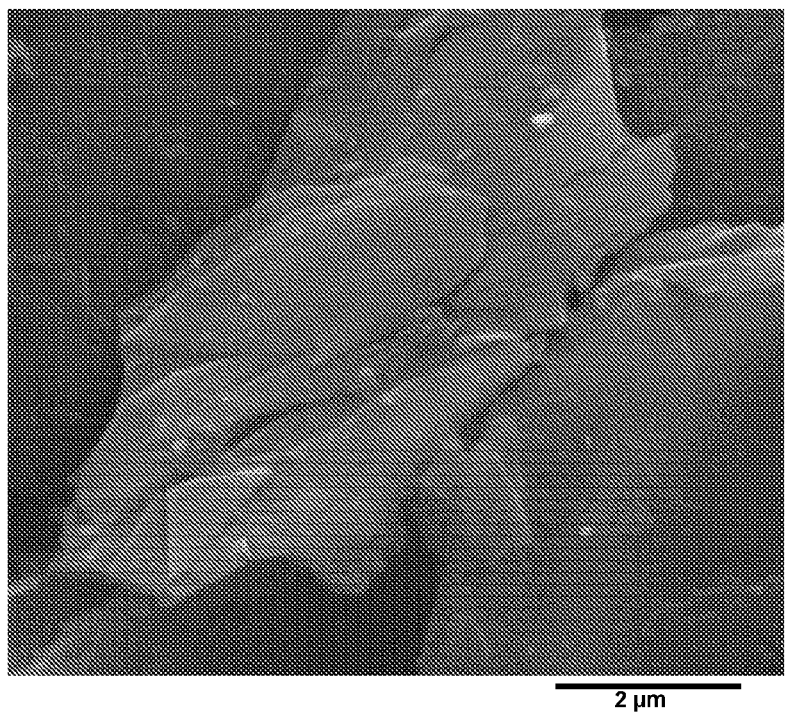

FIGS. 5A and 5B show additional images of exemplary graphene-like platelets made by embodiments of methods disclosed herein.

Example 4A

In this example, carbon material, including graphene-like material, was made using hydrodynamic cavitation, according to embodiments of methods disclosed herein.

Figure 6A:
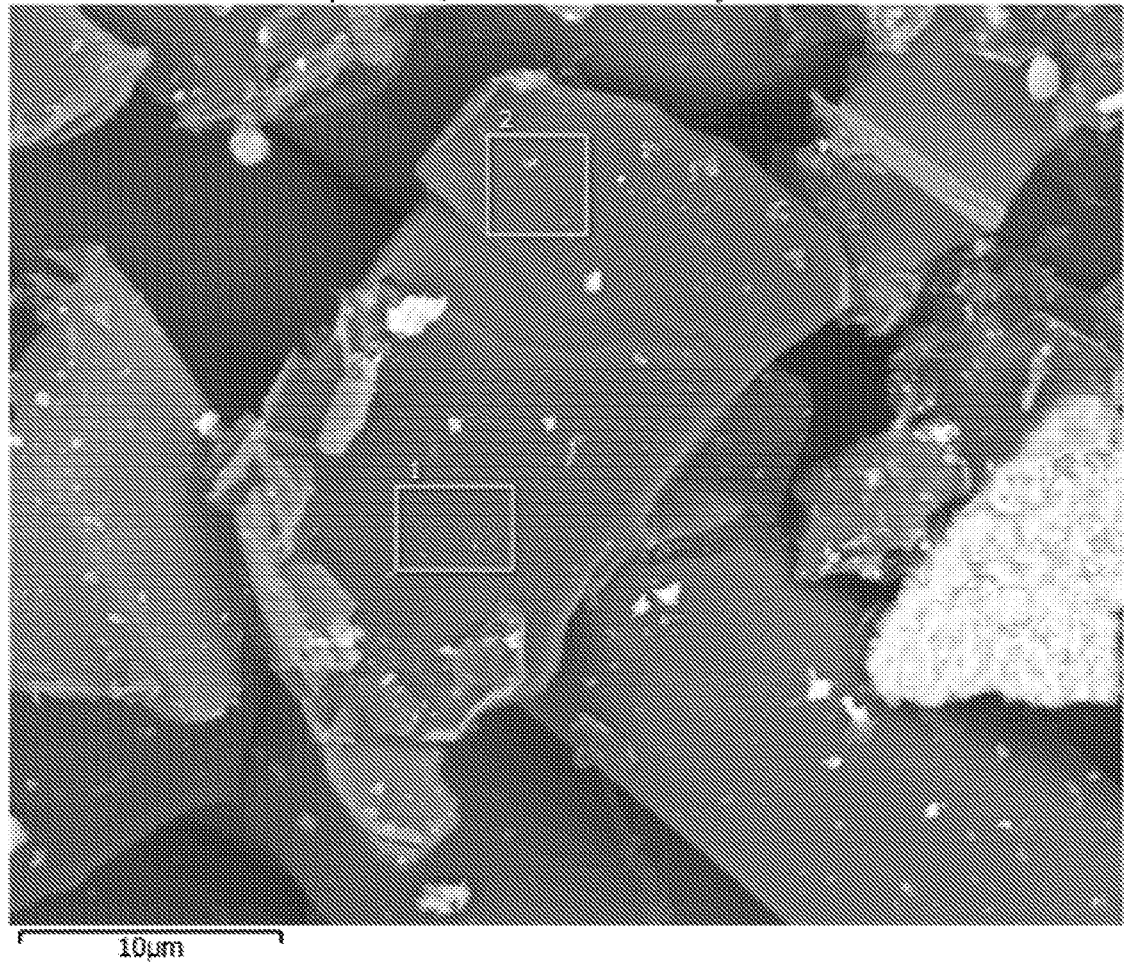
FIGS. 6A-6B.
Figure 6B:
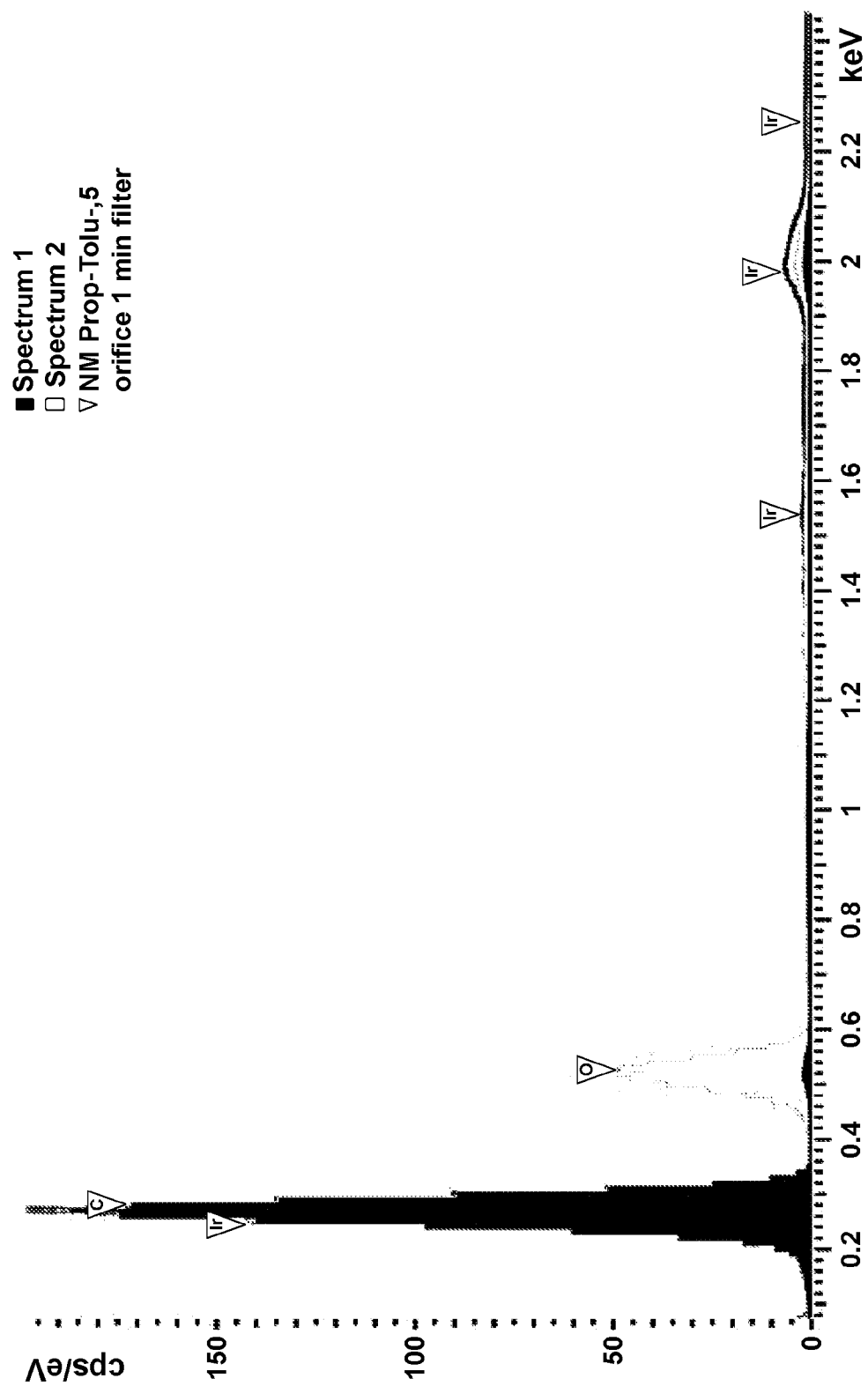

In reference to FIGS. 6A-7B, carbon material was made using propane as the delivered gaseous organic compound and toluene as the liquid organic compound. FIG. 6A shows a SEM image of micron-sized graphene platelets, with squares (labeled as "1" and "2") identifying regions corresponding to the EDS spectra shown in FIG. 6B (square 1 corresponds to "Spectrum 1" and square 2 corresponds to "Spectrum 2"). FIG. 6B shows EDS spectra and Table 2 summarize the atomic concentrations of elements, calculated from the EDS spectra, in the carbon material in the regions identified in FIG. 6A.

TABLE 2

| Spectrum Label | Concentration C (at. %) | Concentration O (at. %) | Total Concentration (at. %) |
|---|---|---|---|
| Spectrum 1 | 99.19 | 0.81 | 100.00 |
| Spectrum 2 | 98.23 | 1.77 | 100.00 |

Figure 7A:
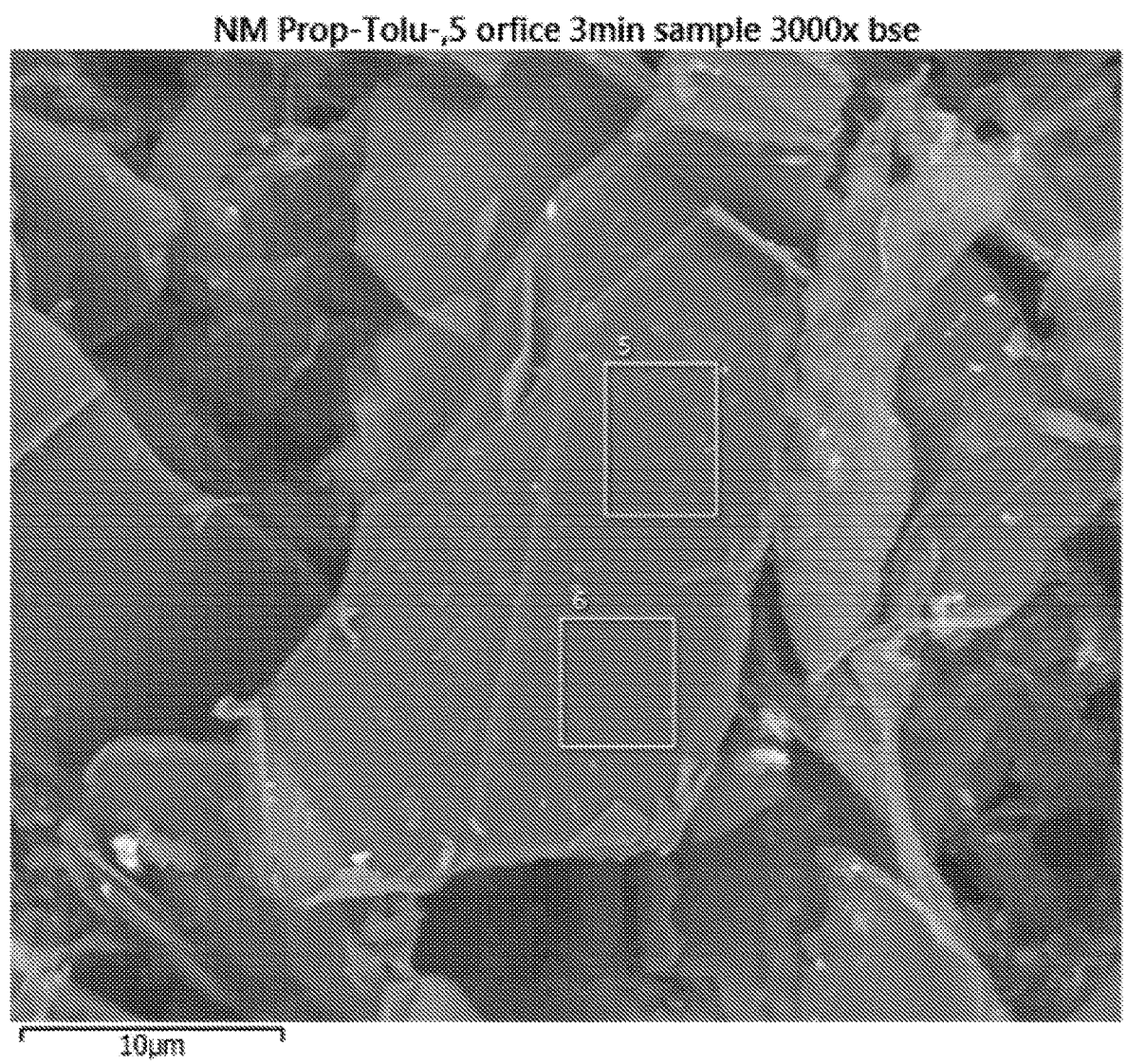
FIGS. 7A-7B.
Figure 7B:
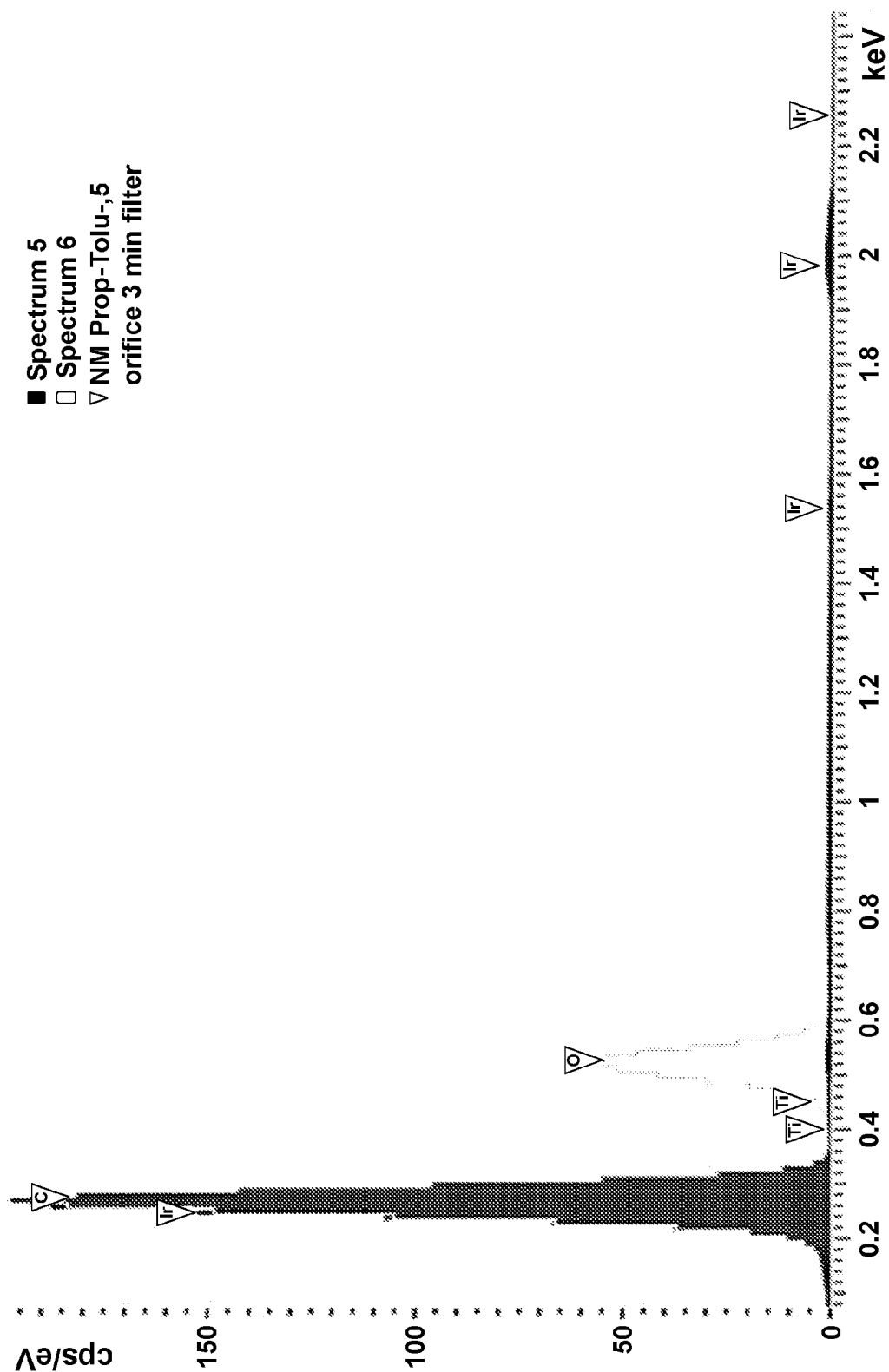

FIG. 7A shows a SEM image of the micron-sized graphene platelets, with squares (labeled as "5" and "6") identifying regions corresponding to the EDS spectra shown in FIG. 7B (square 5 corresponds to "Spectrum 5" and square 6 corresponds to "Spectrum 6"). FIG. 7B shows EDS spectra and a table summarizing the atomic concentrations of elements, calculated from the EDS spectra, in the carbon material in the regions identified in FIG. 7A. The carbon material formed in this example, corresponding to FIGS. 6A-7B, has an oxygen concentration of less than 1.77 at. % or as low as 0.40%.

In this example, a 5 mm orifice was used, with a gas injection pressure of 3,000 psi, and the method was performed for 1 minute.

Example 4B

In this example, carbon material, including graphene, was made using hydrodynamic cavitation, according to embodiments of methods disclosed herein.

Figure 8A:
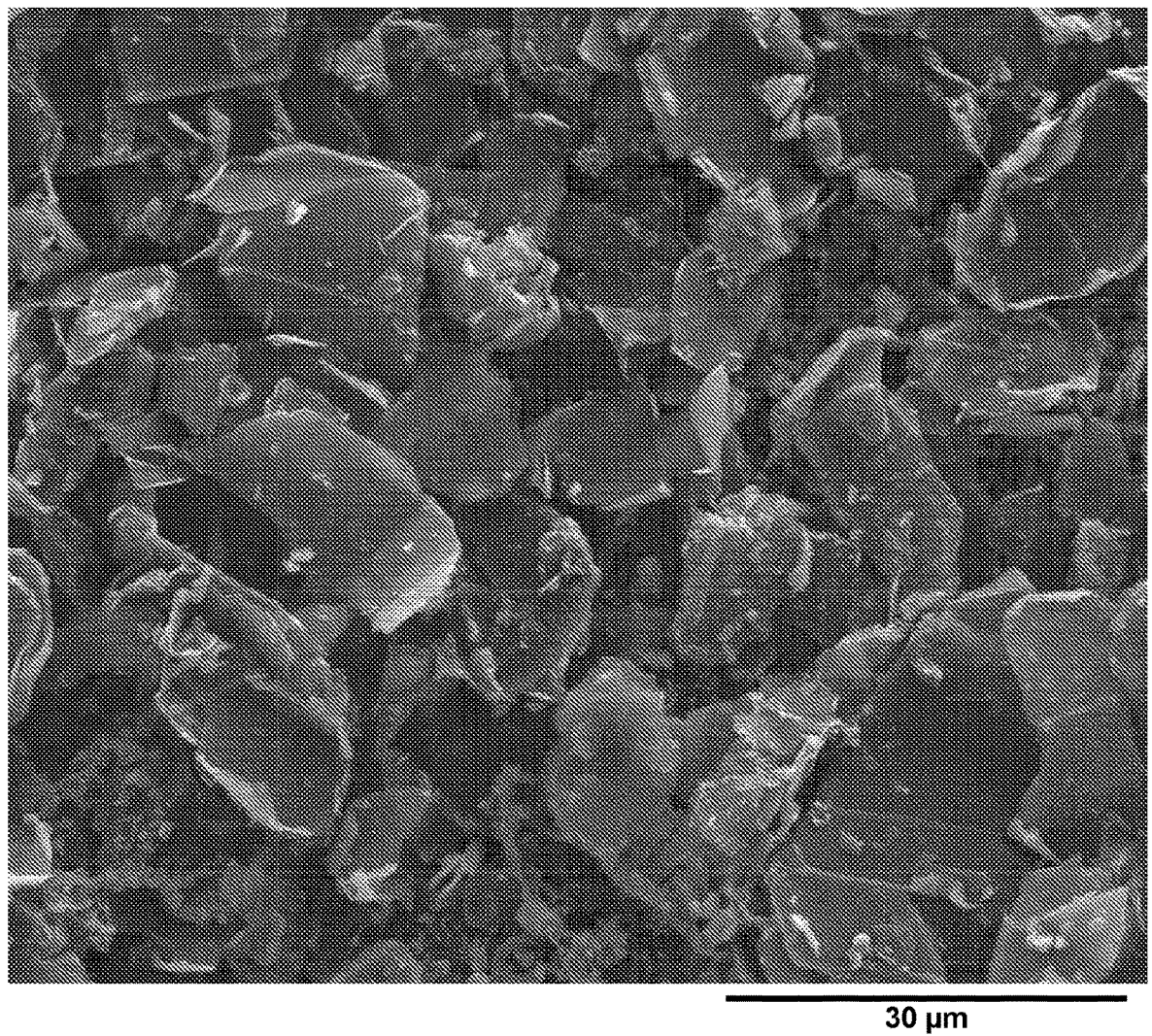
FIGS. 8A-8B are SEM images of carbon material according to Example 4B.
Figure 8B:
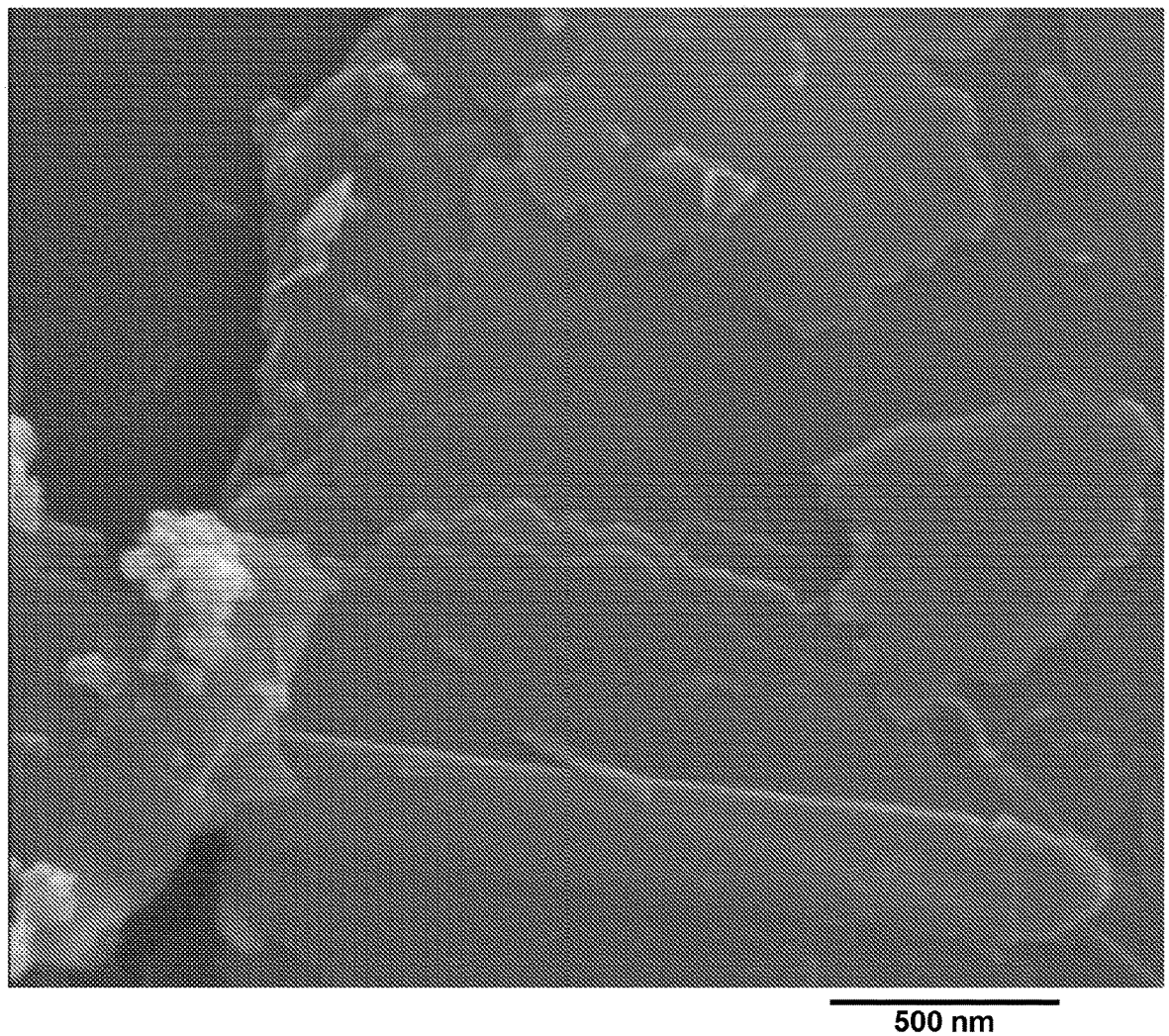

In reference to FIGS. 8A-8B, carbon material was made using acetylene as the delivered gaseous organic compound and liquid ethanol as the organic compound of the liquid. In this example, the liquid was entirely or substantially the organic compound (ethanol). FIGS. 8A-8B show SEM images of the carbon material. In this example, a 0.5 mm orifice was used, with a gas injection pressure of 3,000 psi, and the method was performed for 5 minutes.

Other examples of hydrodynamic reactors would be: 1) a shockwave reactor, such as SHOCKWAVE POWER™ Reactor (SPR) (Hydro Dynamics, Inc., Rome, Ga.). As a liquid passes through the shockwave reactor, it is subjected to "controlled cavitation." The heart of the device is a specially designed rotor that spins. The spinning action generates hydrodynamic cavitation in the rotor cavities away from the metal surfaces. The cavitation is controlled, and therefore, there is no damage. As microscopic cavitation bubbles are produced and collapse, shockwaves are given off into the liquid which can heat and/or mix. 2) Another hydrodynamic reactors is a spinning disk reactor. A shockwave reactor is a device which uses a spinning disc, typically in proximity of a stationary surface, to accelerate flow in a centrifugal manner. The components of which activates the flow (which is typically a liquid), to mix, agitate, shear, produce cavitation (vacuum), and produce a temperature change, under the influence of boundary layer rotation. One of the main mechanisms is sonochemistry (producing ultrasonics by forming acoustical cavitation in liquids—which results in chemical activity). For example, when water is cavitated, there is an energy burst, which includes UV light, heat, and sound, known as a shock wave.

Example 5A

In this example, carbon material, including graphene, was made using shear, according to embodiments of methods disclosed herein. In this example, a bench shear mixer, in particular a FM300 Fuko bench high shear system, was used as the cavitation reactor, propane was used as the delivered gaseous organic compound, MOBILE 1™ motor oil was used as the liquid organic compound of the liquid. In this example, the liquid was entirely or substantially the organic compound (MOBILE 1™). The synthesis method was performed for 2 minutes with a 30 psi gas entrainment pressure. The fluid was entrained with gas in a separate pressure pot where gas was injected at 30 psi. This entrained the gas in the liquid. Under atmospheric pressure, gas will not entrain in a lubrication oil. The gas injection flow rate was 11 mL/min, and a 12,000 rpm of the shear mixer was used.

Figure 9A:
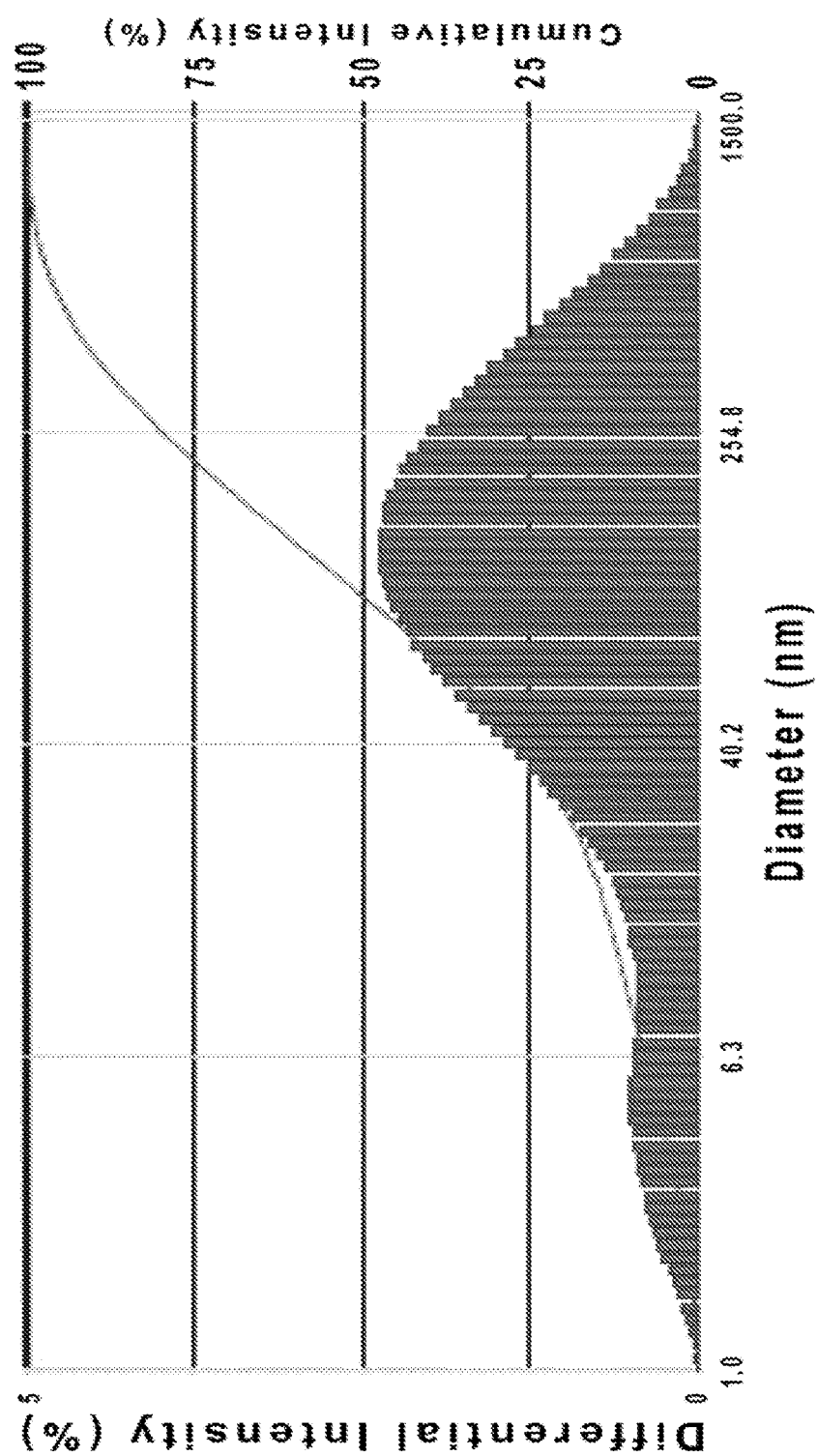
Figure 10A:
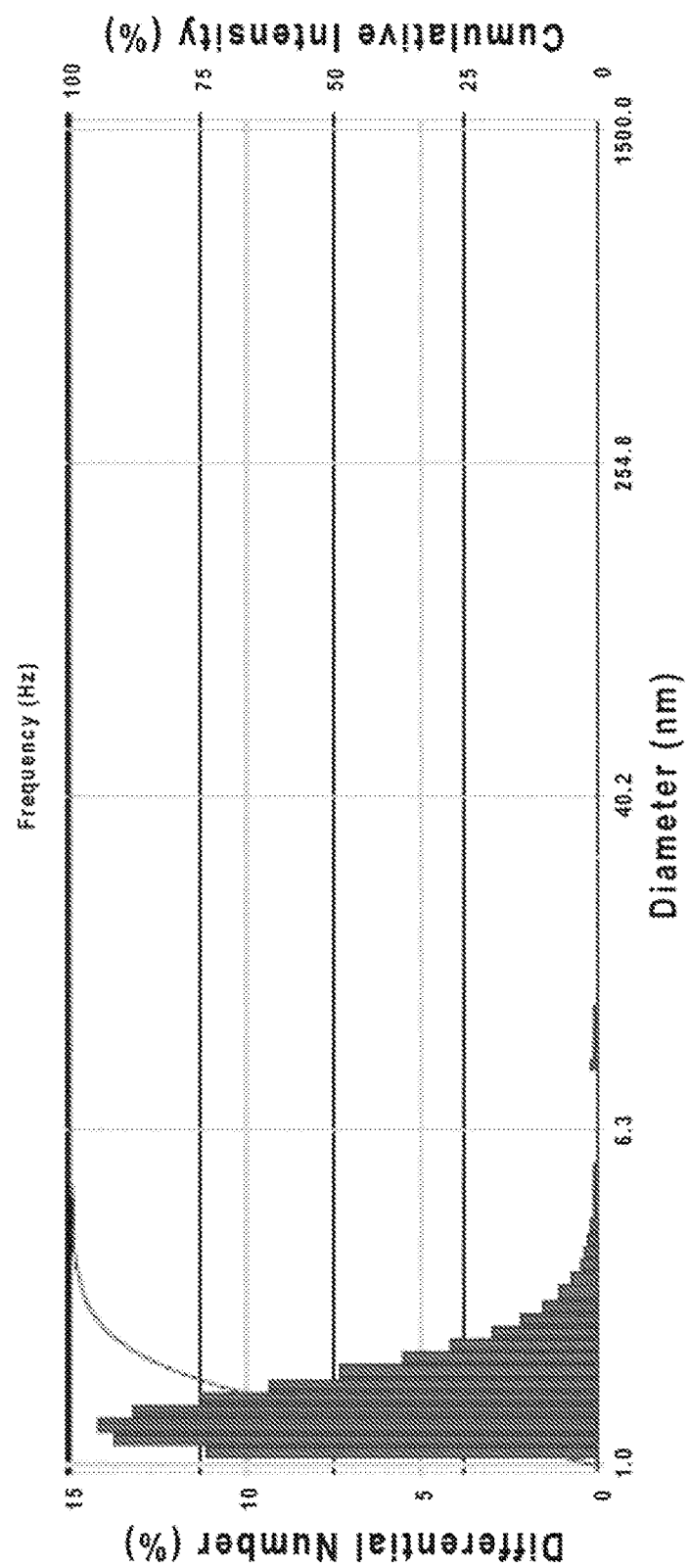

FIG. 9A shows a scattered light intensity vs particle diameter and FIG. 9B shows a corresponding table summarizing the data in FIG. 9A. The data correspond to particles of carbon material in the dispersion formed according to this example. The particle size range was approximately 4.4 nm to 184 nm (hydrodynamic diameter), as measured by dynamic light scattering. FIG. 10A shows a particle size number distribution, and FIG. 10B shows a table summarizing the distribution, corresponding to the carbon material particles made according to this example. The particles were predominately crystalline and 1.5 to 10.8 nm.

The following description of the characterization procedures applies to Examples 5A and 5B:

Particles suspended in liquids are in Brownian motion due to random collisions with solvent molecules. This motion causes the particles to diffuse through the medium. The diffusion coefficient, D, is inversely proportional to the particle size according to the Stokes-Einstein equation:

$D = k_B T 3 \pi \eta_0 d$

Where D is the diffusion constant, $k_B$ the Boltzmann's constant, T the absolute temperature, $\eta_0$ the viscosity, and d the spherical particle diameter:

Photon Correlation Spectroscopy, sometimes also referred as dynamic light scattering, is a technique used to determine the diffusion coefficient of small particles in a liquid. The coefficient is determined by accurately measuring the light scattering intensity of the particles as a function of time. As the particles of interest diffuse through the sample cell due to Brownian motion, an incident beam of laser light illuminates the particles. The particles scatter the light, producing fluctuations in the scattering intensity as a function of time. The scattered light is collected at a chosen angle, and is measured by a highly sensitive detector. Since the diffusion rate of particles is determined by their size, information about their size is contained in the rate of fluctuation of the scattered light. The intensity fluctuations are collected as photon counts and correlated to generate the auto correlation function (ACF). The diffusion coefficient is determined by fitting the ACF using the Cumulants method from which the mean size is obtained using the Stokes-Einstein equation.

Zeta Potential: The process described herein produces crystalline particles with a very high Zeta potential. Thus, the carbon material particles, such as graphene particles, in a lubricant form a very stable dispersion, such as the Zeta potential being −63 mV. It is recognized in the field that colloidal distribution having a Zeta potential greater than +40 mV or less than −40 mV are very stable.

Zeta potential is the measure of the electric potential at the slipping plane in the double layer surrounding a particle suspended in solution. The double layer consists of the Stern layer and the diffuse layer. In the Stern layer, ions with the opposite charge of the particle surface are attracted to the particle. As the distance from the particle surface increases, the oppositely charged ions become more diffuse. The point where the ions start to diffuse into the surrounding medium is called the slipping plane as strongly attracted ions will move with the particle in Brownian motion. It is at the slipping plane where the Zeta potential is measured. Zeta potential can be used as a measure of particle stability in a solution. Particles with a Zeta potential greater than +40 mV or less than −40 mV are considered stable as the charge keeps the particles from agglomerating. Conversely, particles with a Zeta potential closer to 0 mV, the isoelectric point, have a tendency to collide and form large agglomerations.

Figure 11A:
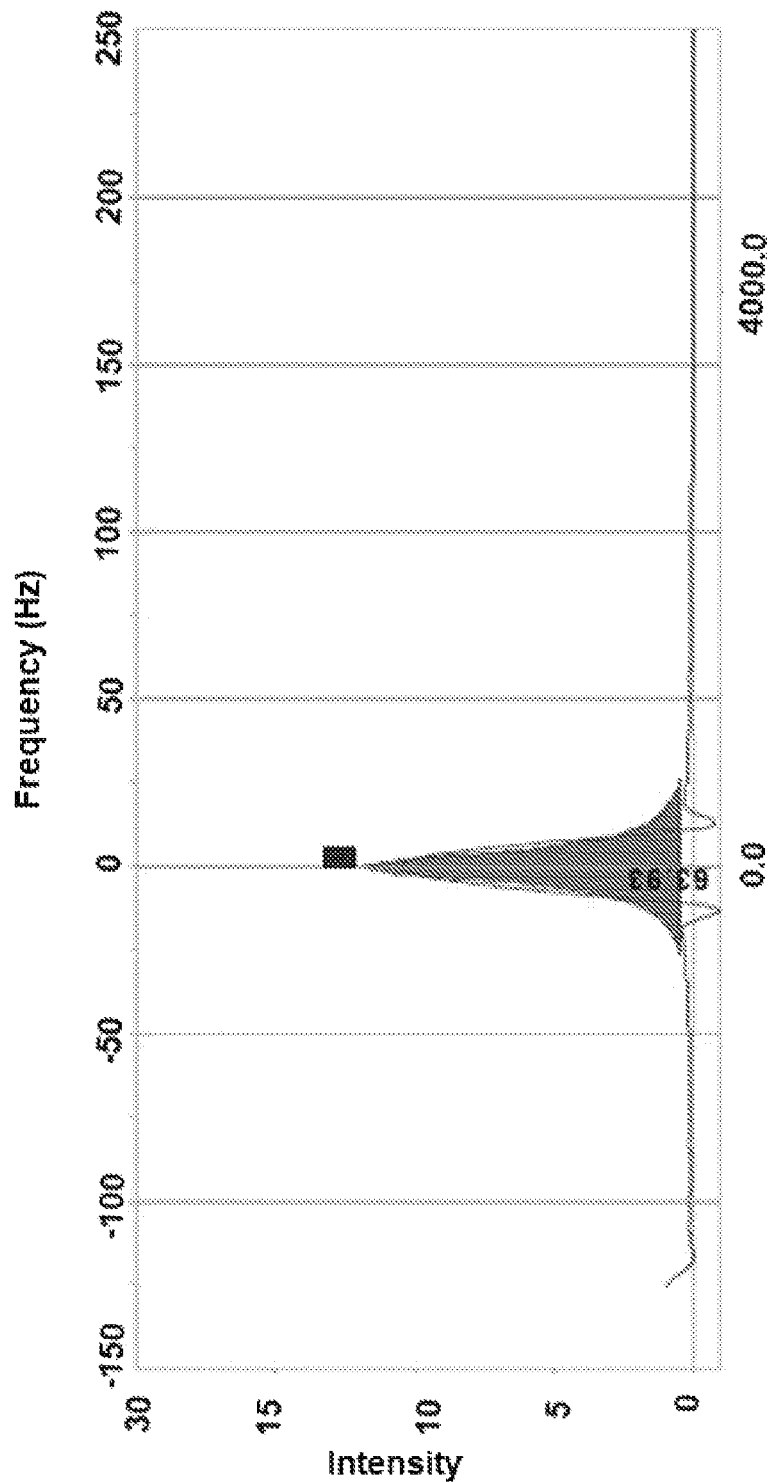

Electrophoretic Light Scattering is the method used to determine the Zeta potential of charged particles in solution. The charge at the slipping plane cannot be measured directly with the DELSA™ Nano C particle analyzer (Beckman Coulter, Brea, Calif.). Instead, the Zeta potential is determined through theoretical models and electrophoretic mobility. An electric field is applied to the particles in solution. The particles will move toward the oppositely charged electrode. The particles are irradiated with laser light and scattered due to the movement of the particles. The detected scattered light creates a frequency shift from the incident laser light. The frequency shift can be related to the mobility of the particles using the following equation: $v_D = Uq2\pi \cos\theta 2 = Un\lambda \sin\theta$ FIG. 11A shows the mobility data for determining Zeta potential for the carbon material dispersion made according to this example, and FIG. 11B shows a table summarizing the data and characterization conditions. The Zeta potential was determined to be −63.93 mV for the dispersion.

Example 5B

In this example, carbon material, including graphene, was made using shear, according to embodiments of methods disclosed herein.

Figure 12A:
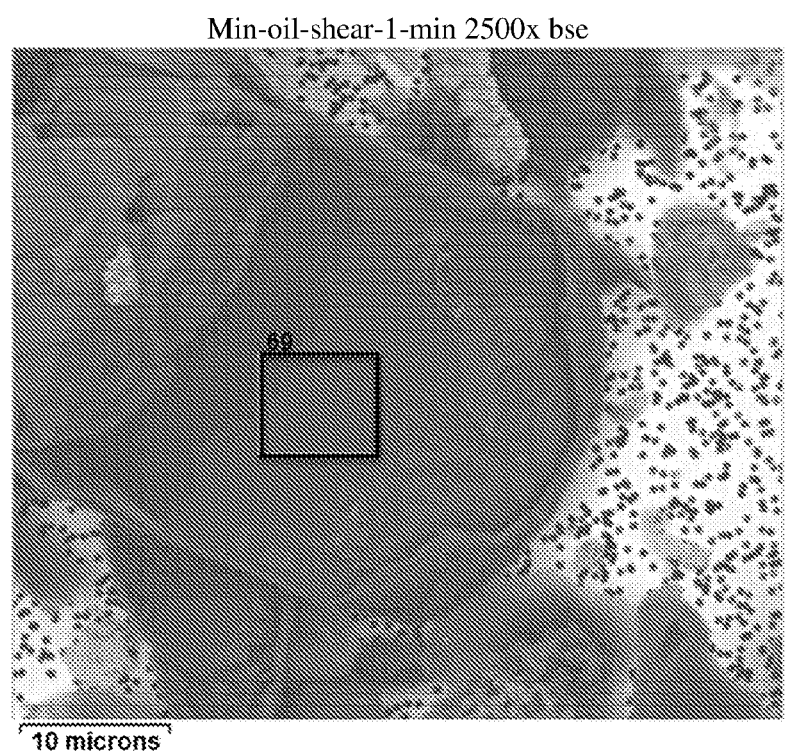
FIGS. 12A-12B are SEM image and EDS data corresponding to the carbon material according to Example 5B.
Figure 12B:
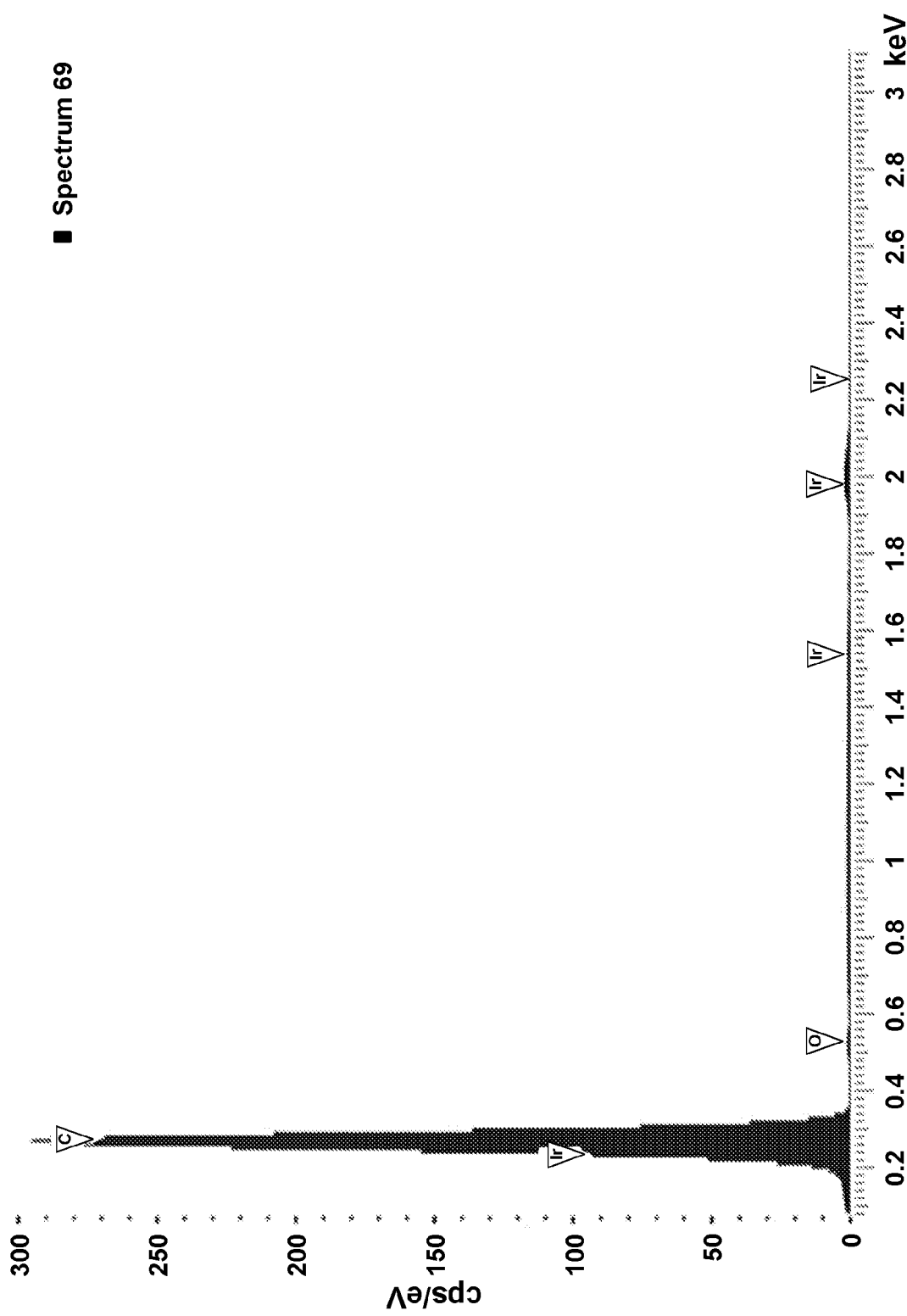

Propane was used as the delivered gaseous organic compound, mineral oil was used as the liquid organic compound, and a bench shear reactor was used. FIG. 12A shows an SEM image of a micron sized graphene platelet made according to this example. The EDS data in FIG. 12B and shown below in Table 3 summarizes the atomic percentages of elements.

TABLE 3

| Spectrum Label | Concentration C (at. %) | Concentration O (at. %) | Total Concentration (at. %) |
|---|---|---|---|
| Spectrum 69 | 99.51 | 0.49 | 100.00 |

The carbon material showed an oxygen concentration of 0.49 at. %.

Example 5C

In this example, carbon material, including graphene, was made using shear, according to embodiments of methods disclosed herein.

A high speed shear reactor was used, such as that of FIG. 19. In this example, a variety of combinations of gaseous organic compound and liquid organic compound were used to make the carbon material: (i) propane and mineral oil, (ii) propane and toluene, and (iii) acetylene and toluene, respectively. Crystalline graphene was formed in case (i) and micro sized graphitic material was formed in the case of (ii) and (iii).

Example 6

In this example, carbon material, including graphene, was made using ultrasonic cavitation, according to embodiments of methods disclosed herein. A probe sonication cavitation reactor was used, using a #8 horn and 90% power. The method was performed for 15 minutes. The gas injection or entrainment flow rate was optionally 14 L/min. The following combinations of gaseous organic compound and liquid organic compound were used: (i) propane and toluene; (ii) propane/E30 and Mobile-1, where the E30 means propane was pre-entrained in Mobil-1 at 30 psi in the pressure pot; (iii) propane/B and toluene, means propane was "bubbled" and (iv) acetylene/B and toluene. "B" is for "bubbled. In the case of (i), (iii), and (iv), a micron-size graphene carbon material was made. In the case of (ii), a crystalline graphene material was made. Because it was done under high shear, the shear breaks the micron sized graphene like platelets into crystalline (less than 10 nm) particles.

Example 7

In this example, carbon material, including graphene, was made using a multifunctional cavitation reactor, according to embodiments of methods disclosed herein, including hydrodynamic cavitation and shear. Propane was used as the gaseous organic compound and mineral oil was used as the liquid organic compound. A crystalline carbon material was formed.

Example 8

In this example, it is demonstrated that carbon material is not formed in the absence of a gaseous organic compound, under otherwise equivalent conditions of the method for making a solid carbon material.

A solid carbon material, such as graphene, was formed using a bench shear reactor using propane as the gaseous organic compound and Syn 530 as the liquid organic compound. Under equivalent conditions, without delivering the gaseous organic compound, the method does not yield a solid carbon material. The dispersion of the formed carbon material in Syn 530 yields a Wear Scar Reduction of 14.6% and a coefficient of friction reduction of 64.5% with respect to Syn 530 free of the carbon material.

A solid carbon material, such as graphene, was formed using a bench shear reactor using propane as the gaseous organic compound and MOBILE 1™ as the liquid organic compound. Under equivalent conditions, without delivering the gaseous organic compound, the method does not yield a solid carbon material. The dispersion of the formed carbon material in MOBILE 1™ yields a Wear Scar Reduction of 8% and a coefficient of friction reduction of 31% with respect to MOBILE 1™ free of the carbon material.

Example 9

In this example, carbon material, including graphene, was made using shear, according to embodiments of methods disclosed herein. Propane was used as the gaseous organic compound. A variety of liquid organic compounds were used in combination with propane: Syn 530, MOBILE 1™, AMSOIL™, NonSyn, QUAKER STATE™ 530, and high carbon oil (HCO)/Base oil.

Figure 14:
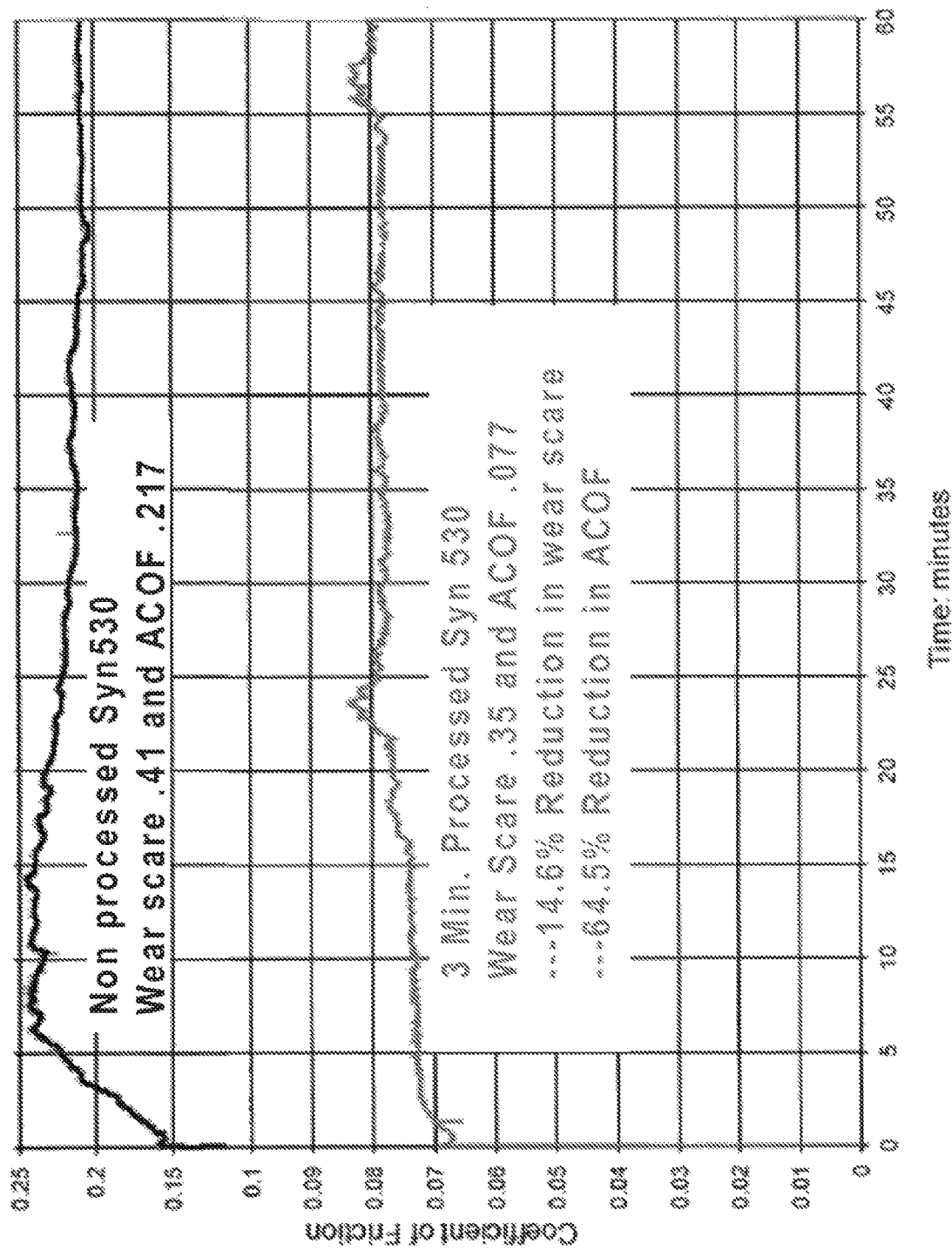
FIG. 14 is a plot of Coefficient of Friction vs Time for unprocessed Syn 530 motor oil (top) and processed Syn 530 motor oil (bottom), where "processed" refers to a method for making carbon materials disclosed herein, according to certain embodiments. The data demonstrate reduced wear scar and coefficient of friction from the presence of nanocrystalline carbon material formed during cavitation in the Syn 530 motor oil comprising entrained propane gas using high shear, according to embodiments disclosed herein.
Figure 15:
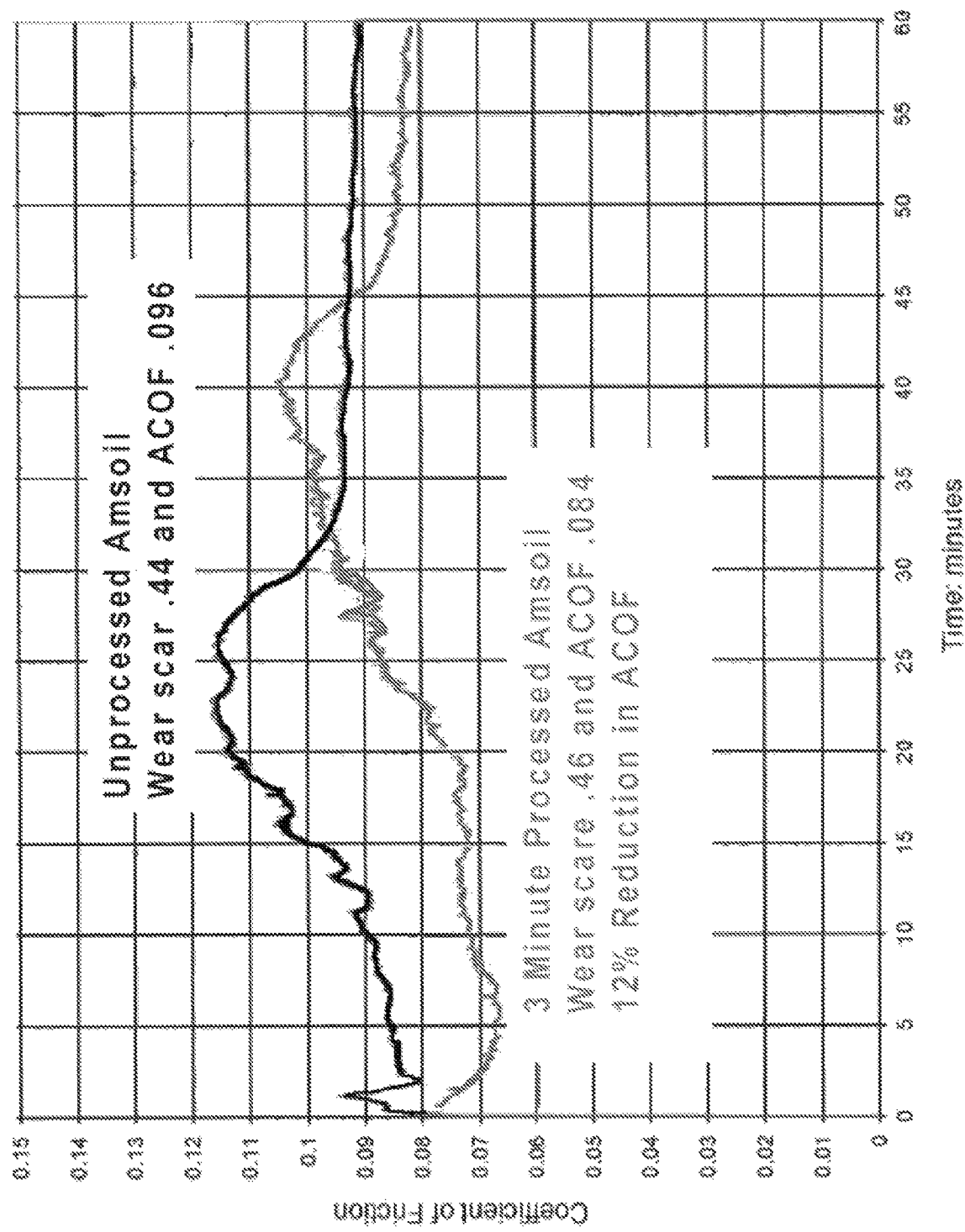
FIG. 15 is a plot of coefficient of Friction vs Time for unprocessed AMSOIL™ oil (top) and processed AMSOIL™ oil (bottom), where "processed" refers to a method for making carbon materials disclosed herein, according to certain embodiments. The data demonstrate reduced wear scar and coefficient of friction from the presence of nanocrystalline carbon material formed during cavitation in the AMSOIL™ motor oil comprising entrained propane gas using high shear, according to embodiments disclosed herein.
Figure 16:
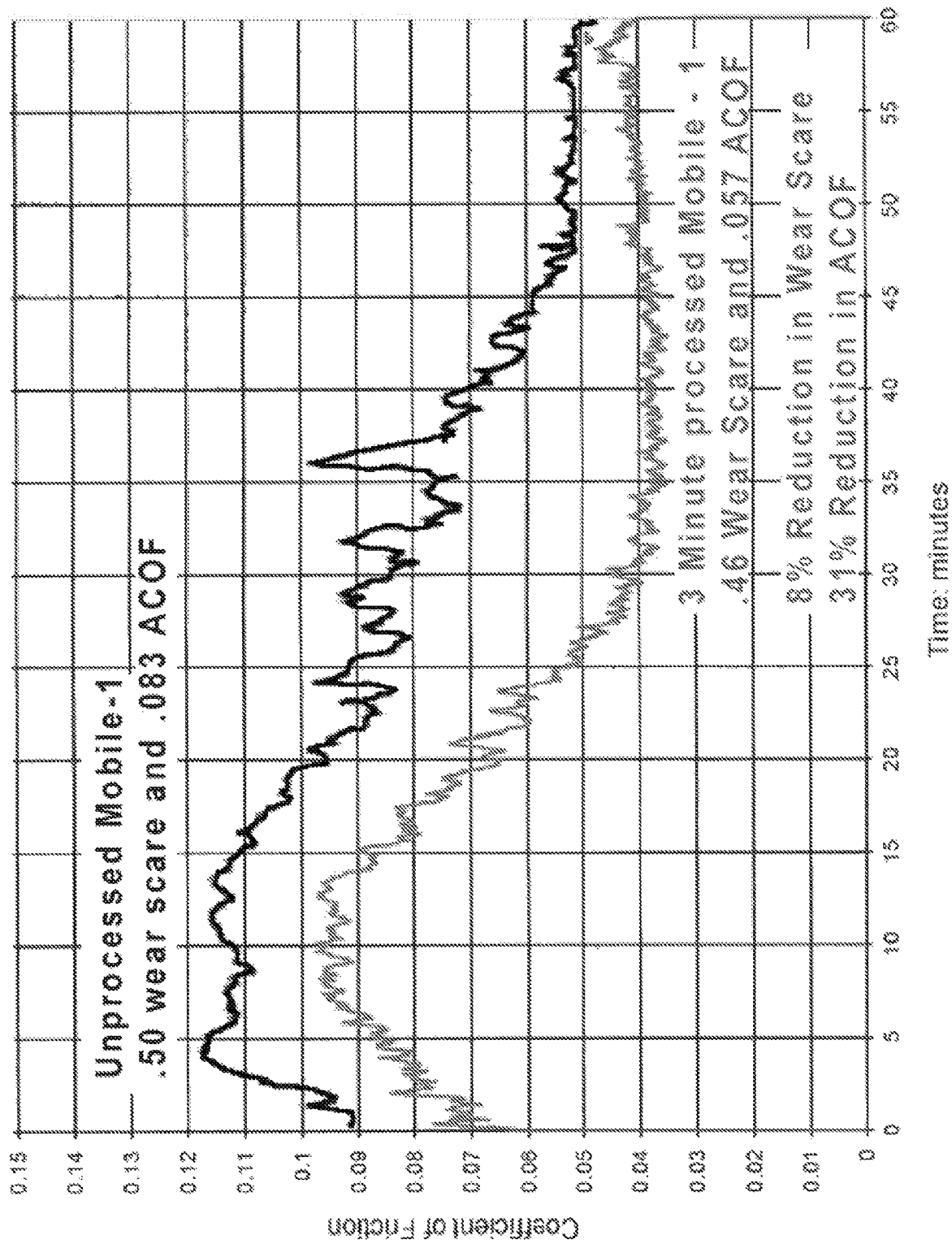
FIG. 16 is a plot of Coefficient of Friction vs Time for unprocessed MOBILE 1™ oil (top) and processed MOBILE 1™ oil (bottom), where "processed" refers to a method for making carbon materials disclosed herein, according to certain embodiments. The data demonstrate reduced wear scar and coefficient of friction from the presence of nanocrystalline carbon material formed during cavitation in the MOBILE 1™ motor oil comprising entrained propane gas using high shear, according to embodiments disclosed herein.

Also in this example, friction reduction is demonstrated using the carbon material dispersions in the organic liquids listed above. In the case of Syn 530 (see FIG. 14), a 14.6% wear scar reduction and a 64.5% coefficient of friction reduction was demonstrated with respect to Syn 530 free of the carbon material (i.e., with respect to Syn 530 not used in the method for making a solid carbon material according to this example). In the case of MOBILE 1™ (see FIG. 16), a 8% wear scar reduction and a 31% coefficient of friction reduction was demonstrated with respect to MOBILE 1™ free of the carbon material (i.e., with respect to MOBILE 1™ not used in the method for making a solid carbon material according to this example). In the case of AMSOIL™ (see FIG. 15), a 0% wear scar reduction and a 12% coefficient of friction reduction was demonstrated with respect to AMSOIL™ free of the solid carbon material (i.e., with respect to AMSOIL™ not used in the method for making a solid carbon material according to this example). In the case of NonSyn, Quaker 530, a 3% wear scar reduction and a 19% coefficient of friction reduction was demonstrated with respect to NonSyn, Quaker free of the carbon material (i.e., with respect to NonSyn, Quaker not used in the method for making a solid carbon material according to this example). In the case of HCO/Base Oil, a 7% wear scar reduction and a 13% coefficient of friction reduction was demonstrated with respect to HCO/Base Oil free of the carbon material (i.e., with respect to HCO/Base Oil not used in the method for making a solid carbon material according to this example).

Example 10

Figure 13A:
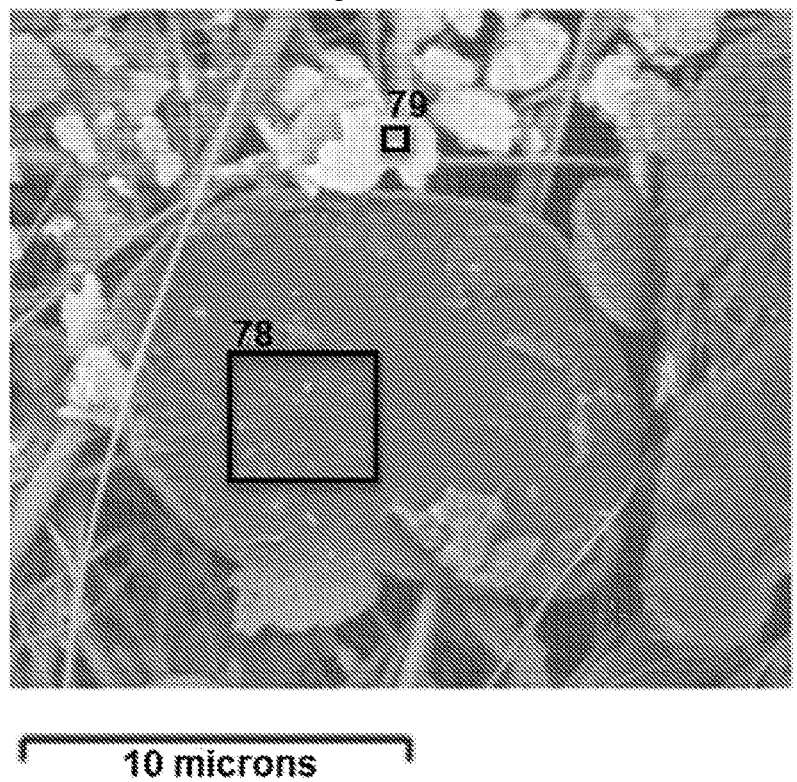
FIGS. 13A-13B are SEM image and EDS data corresponding to the carbon material according to Example 10.
Figure 13B:
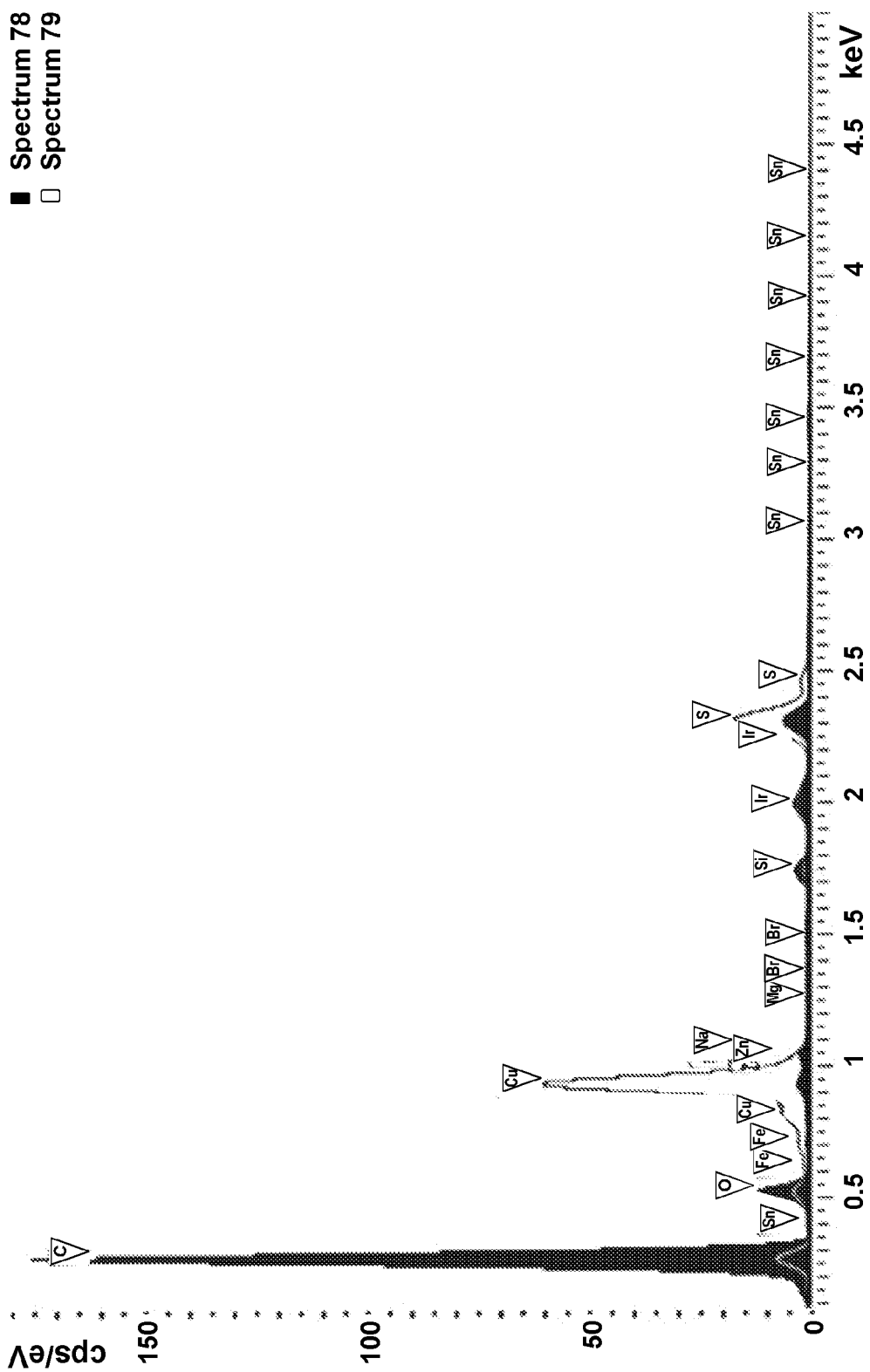

In this example, carbon material, including graphene, was made using shear, according to embodiments of methods disclosed herein. Propane was used as the gaseous organic compound and carbon disulfide was used as the liquid organic compound. FIG. 13A shows an SEM image of carbon material formed according to the method of this example. FIG. 13A is labeled with a square #78 and a square #79. FIG. 13B shows EDS data corresponding to the material in square 78 (Spectrum 78) and square 79 (Spectrum 79). Table 4 summarizes the atomic percentages of elements.

TABLE 4

| Spectrum Label | Concentration (at. %) | | | | | | | | | | | |
| --- | --- | --- | --- | --- | --- | --- | --- | --- | --- | --- | --- | --- |
| | C | O | Na | Mg | Si | S | Fe | Cu | Zn | Br | Sn | Total |
| Spectrum 78 | 90.09 | 7.29 | 0.23 | 0.03 | 0.50 | 1.33 | 0.27 | 0.23 | | 0.03 | | 100.00 |
| Spectrum 79 | 47.67 | 4.42 | | | 0.58 | 15.25 | 1.50 | 27.85 | 2.10 | | 0.63 | 100.00 |

As seen in Table 3, the carbon material formed includes a carbon-sulfur composite material at square 79. The composite has approximately 48% at. % carbon and 15 at. % sulfur.

Example 11A

In this example, carbon material, including graphene, was made using Ultra high shear via a Ross Model HSM-703X-20 Inline High Shear Mixer, according to embodiments of methods disclosed herein, such as the shear reactor of FIG. 18. Propane was used as the gaseous organic compound and mineral oil was used as the liquid organic compound. A gas injection pressure of 50 psi was used, the shear reactor was run at 10,000 rpm, and the synthesis method was performed for 15 minutes.

Figure 17A:
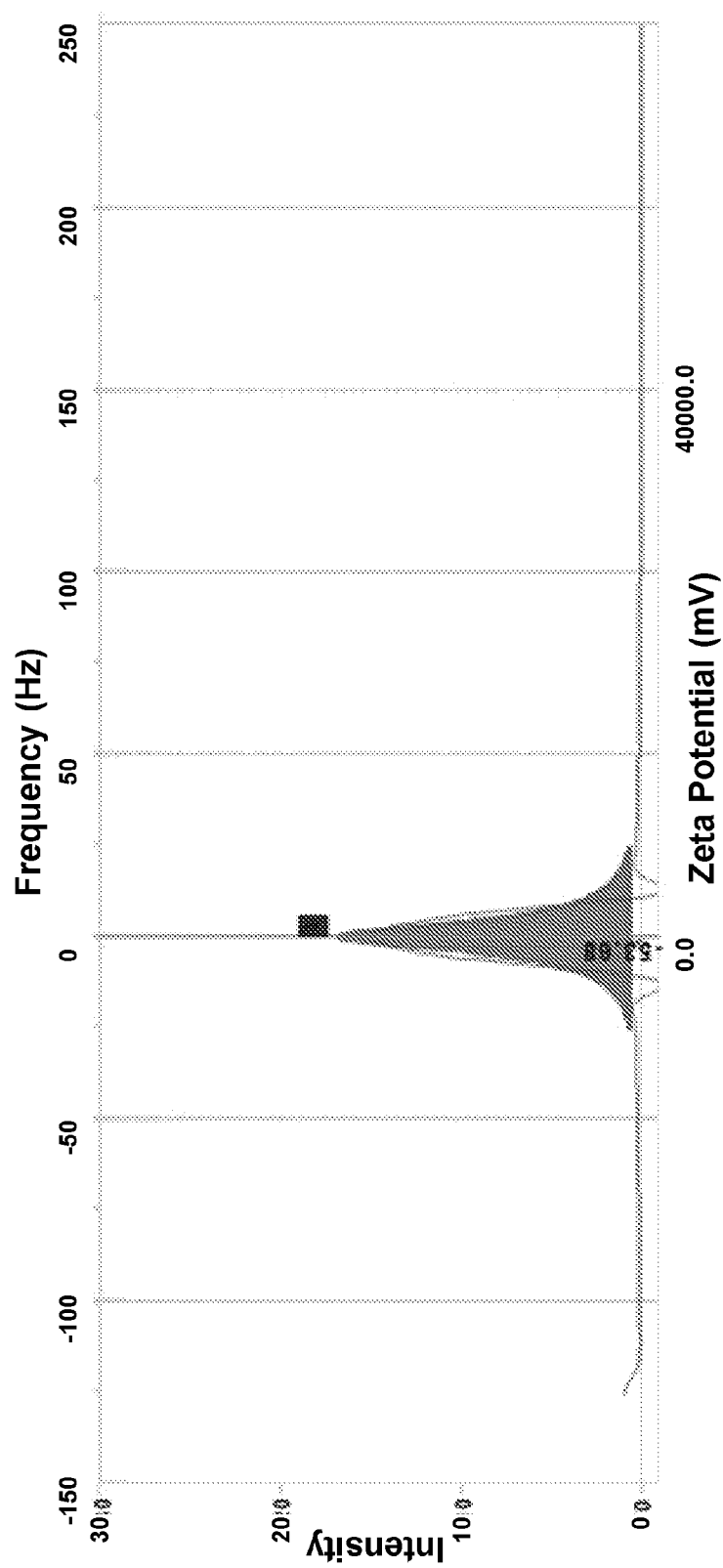

The carbon dispersion in the mineral oil made in this example was characterized by a Zeta potential of −51 mV (e.g., −50.68 mV), as shown in FIGS. 17A-17B.

The following description of the characterization techniques and conditions applies to Example 11A and Example 11B:

Test Equipment: The testing instrument that was used for performing the Zeta potential analysis was a DELSA™ Nano C Nanoparticle Size and Zeta Potential Analyzer (Beckman Coulter, Brea, Calif.). The DELSA™ Nano C utilizes Photon Correlation Spectroscopy (PCS) and Electrophoretic Light Scattering techniques to determine particle size and Zeta potential of materials. Offering an excellent degree of accuracy, resolution and reproducibility, the DELSA™ Nano C has been designed to simplify submicron particle size and Zeta potential analyses. The DELSA™ Nano C provides accurate size measurements in the range from 0.6 nm to 7 μm with sample concentration ranging from 0.001% to 40%. It can perform the analysis of aqueous and non-aqueous samples as well as Zeta potentials of solid surfaces and membranes. It has been serving a wide variety of applications in industries such as nanotechnology, electronics, pharmaceuticals, inks, food & beverage, biomedical, textile.

Particles suspended in liquids are in Brownian motion due to random collisions with solvent molecules. This motion causes the particles to diffuse through the medium. The diffusion coefficient, D, is inversely proportional to the particle size according to the Stokes-Einstein equation: $D=k_BT/3\pi\eta_0 d$, where D is the diffusion constant, $k_B$ the Boltzmann's constant, T the absolute temperature, go the viscosity, and d the spherical particle diameter.

Photon Correlation Spectroscopy, sometimes also referred as dynamic light scattering, is a technique used to determine the diffusion coefficient of small particles in a liquid. The coefficient is determined by accurately measuring the light scattering intensity of the particles as a function of time. As the particles of interest diffuse through the sample cell due to Brownian motion, an incident beam of laser light illuminates the particles. The particles scatter the light, producing fluctuations in the scattering intensity as a function of time. The scattered light is collected at a chosen angle, and is measured by a highly sensitive detector. Since the diffusion rate of particles is determined by their size, information about their size is contained in the rate of fluctuation of the scattered light. The intensity fluctuations are collected as photon counts and correlated to generate the auto correlation function (ACF). The diffusion coefficient is determined by fitting the ACF using the Cumulants method from which the mean size is obtained using the Stokes-Einstein equation.

Zeta potential is the measure of the electric potential at the slipping plane in the double layer surrounding a particle suspended in solution. The double layer consists of the Stern layer and the diffuse layer. In the Stern layer, ions with the opposite charge of the particle surface are attracted to the particle. As the distance from the particle surface increases, the oppositely charged ions become more diffuse. The point where the ions start to diffuse into the surrounding medium is called the slipping plane as strongly attracted ions will move with the particle in Brownian motion. It is at the slipping plane where the Zeta potential is measured. Zeta potential can be used as a measure of particle stability in a solution. Particles with a Zeta potential greater than +/−20 mV are considered stable as the charge keeps the particles from agglomerating. Conversely, particles with a Zeta potential closer to 0 mV have a tendency to collide and form large agglomerations.

Electrophoretic Light Scattering is the method used to determine the Zeta potential of charged particles in solution. The charge at the slipping plane cannot be measured directly with the DELSA™ Nano C particle analyzer. Instead, the Zeta potential is determined through theoretical models and electrophoretic mobility. An electric field is applied to the particles in solution. The particles will move toward the oppositely charged electrode. The particles are irradiated with laser light and scattered due to the movement of the particles. The detected scattered light creates a frequency shift from the incident laser light. The frequency shift can be related to the mobility of the particles using the following equation:

$$v_D = \frac{Uq}{2\pi}\cos\frac{\theta}{2} = \frac{Un}{\lambda}\sin\theta,$$

where $v_D$ is the frequency shift of the particles, U is the mobility of the particles, q is the scattering vector, $\lambda$ is the wavelength of incident light, n is the refractive index of the medium and $\theta$ is the scattering angle. Knowing the mobility, the Smoluchowski equation can be applied to find the Zeta potential.

$$Z = \frac{\eta}{\varepsilon_0 \varepsilon_r} U$$

where $\varepsilon_0$ and $\varepsilon_r$ are the dielectric constants in a vacuum and the medium respectively.

In addition to measuring the Zeta potential of particles in a solution, the Zeta potential of a solid surface can also be determined. The same principles used in measuring the Zeta potential of a particle were used for a flat surface. The specially designed Flat Surface Cell was used to hold solid samples. The procedure for measuring the Zeta potential of a solid surface is similar to a typical Zeta potential measurement for particles. The measurements are carried out through dynamic light scattering of charged probe particles under influences from both electroosmosis and electrophoresis. The true electroosmotic flow due to solid surface Zeta potential is obtained by subtracting the true electrophoretic mobility from the total apparent electroosmotic flow of the charged probe particles.

Test Conditions and Parameters: Prior to Zeta potential analysis, the sample was mixed and approximately 5 mL of sample was centrifuged at 3,000 rpm for 20 min. A ~1 mL aliquot was removed from the top of the centrifuged sample and used for the analysis. To determine the Zeta potential, the specimen was analyzed with the Flow Cell using electrophoretic light scattering. Reference literature values of 1.467 for the diluent oil refractive index [Ref. 1], 19.1 cP for the diluent oil viscosity [Ref. 2], and 2.1 for the oil dielectric constant [Ref. 3] were used to analyze the experimental data and calculate the Zeta potential. Table 5 summarizes the testing conditions and parameters for the test.

TABLE 5

| Zeta Potential Test Conditions and Parameters | |
| --- | --- |
| Specimen | One light mineral oil specimen with graphene |
| Test Instrument | DELSA ™Nano C |
| Technique | Electrophoretic light scattering |
| Measurement Cell | Flow cell |
| Diluent Refractive Index | 1.467 |
| Diluent Viscosity | 19.1 cP |
| Diluent Dielectric Constant | 2.1 |
| Test Temperature | 25° C. |
| Room Temperature | 22.8° C. (73° F.) |
| Humidity | 40% RH |

REFERENCES FOR EXAMPLES 11A AND 11B

1. Millipore Sigma (2019). Liquid Refractive Index-Mineral Oil. Available at top-level domain name www.sigmaaldrich.com (at subdomain catalog/product/sial/nist1922?lang=en&region=US)
2. EFSA Panel on Food Additives and Nutrient Sources added to Food (ANS); Scientific Opinion on the use of high viscosity white mineral oils as a food additive on request from the European Commission. *EFSA Journal*, 2009; 7(11):1387.
3. Honeywell (2019). Dielectric Constant Table. Available at top-level domain name www.honeywellprocess.com Example 11B In this example, carbon material, including graphene, was made using shear, according to embodiments of methods disclosed herein, such as the shear reactor of FIG. 18. Propane was used as the gaseous organic compound and MOBILE 1™ oil was used as the liquid organic compound. A gas injection pressure of 30 psi was used, the shear reactor was run at 12,000 rpm, and the synthesis method was performed for 15 minutes.

The carbon dispersion in MOBILE 1™ made in this example was characterized by a Zeta potential of −64 mV (e.g., −63.93 mV).

Example 12A

Figure 23:
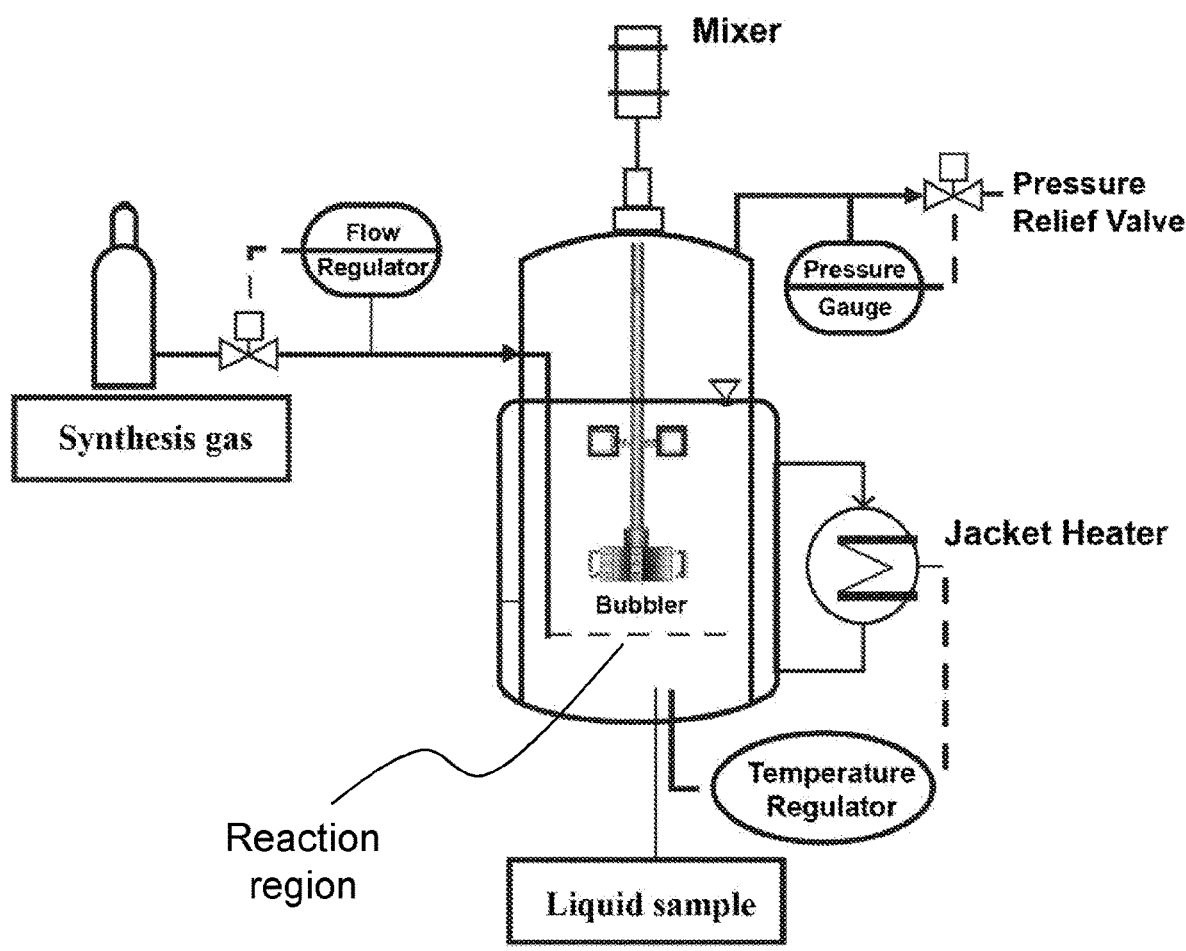
FIG. 23 is an exemplary stir tank reactor, according to certain embodiments.

This example describes stir tank reactors, which can also be described as stirred high temperature, high pressure tank reactors (SHTHPTR). FIG. 23 illustrates an exemplary stir tank reactor that is compatible with methods disclosed herein, according to certain embodiments. The stir tank reactor, or the SHTHPTR, of FIG. 23 facilitates gas-liquid mass transfer between a carbon-based gas and a carbon-based liquid to create a chemical reaction that can produce graphene or a graphene-like material, functionalize a graphene material, or facilitate the creation of a graphene-like composite material. In this reactor, the synthesizing gas is dispersed into fine bubbles in order to be dissolved in a liquid. Smaller bubbles have more surface area and thus facilitate gas-liquid mass transfer.

Stir tank reactors that can be similarly implemented as gas-liquid mass transfer reactors according to embodiments disclosed herein include stir tank reactors that can be categorized as turbine, monolith, or foam tank reactors.

The generally low solubility of organic gas in a carbon liquid can be improved by operating the reactor, such as the stir tank gas-liquid mass transfer reactor of FIG. 23, at increased pressures, such as between 6 bar (about 87 psi) and up to 150 bar (about 2175 psi). The operating temperature of the reactor typically is in the range of 20° C. to 250° C. (e.g., 20° C. to 200° C., 20° C. to 150° C., 20° C. to 100° C., 30° C. to 250° C., 30° C. to 200° C., 30° C. to 150° C., 30° C. to 100° C., 40° C. to 250° C., 40° C. to 200° C., 40° C. to 150° C., 40° C. to 100° C., 50° C. to 250° C., 50° C. to 200° C., 50° C. to 150° C., 50° C. to 100° C., 50° C. to 90° C., or 60° C. to 100° C.).

The stir tank gas-liquid mass transfer reactor, such as that of FIG. 23, comprises an agitator. Without wishing to be bound by any theory, it is believed organic gas-organic liquid reactions are mass-transfer limited. Thus, the agitation system is important in order to: (1) intensify mass/liquid transfer, (2) enhance heat transfer, which accelerates a chemical reaction, and (3) homogenize gas/liquid mixture to avoid uneven temperature and concentration profiles during the reaction process. The agitator is an important component of the stirred, high temperature, high pressure tank reactor and may be of several types, including but not limited to: a Rushton stirrer/turbine, monolithic stirrer, spiral stirrer, plates radial, flat blade impeller, axion propeller, pitched blade, turbine vortex, and multiple stirrers on one shaft.

Figure 24:
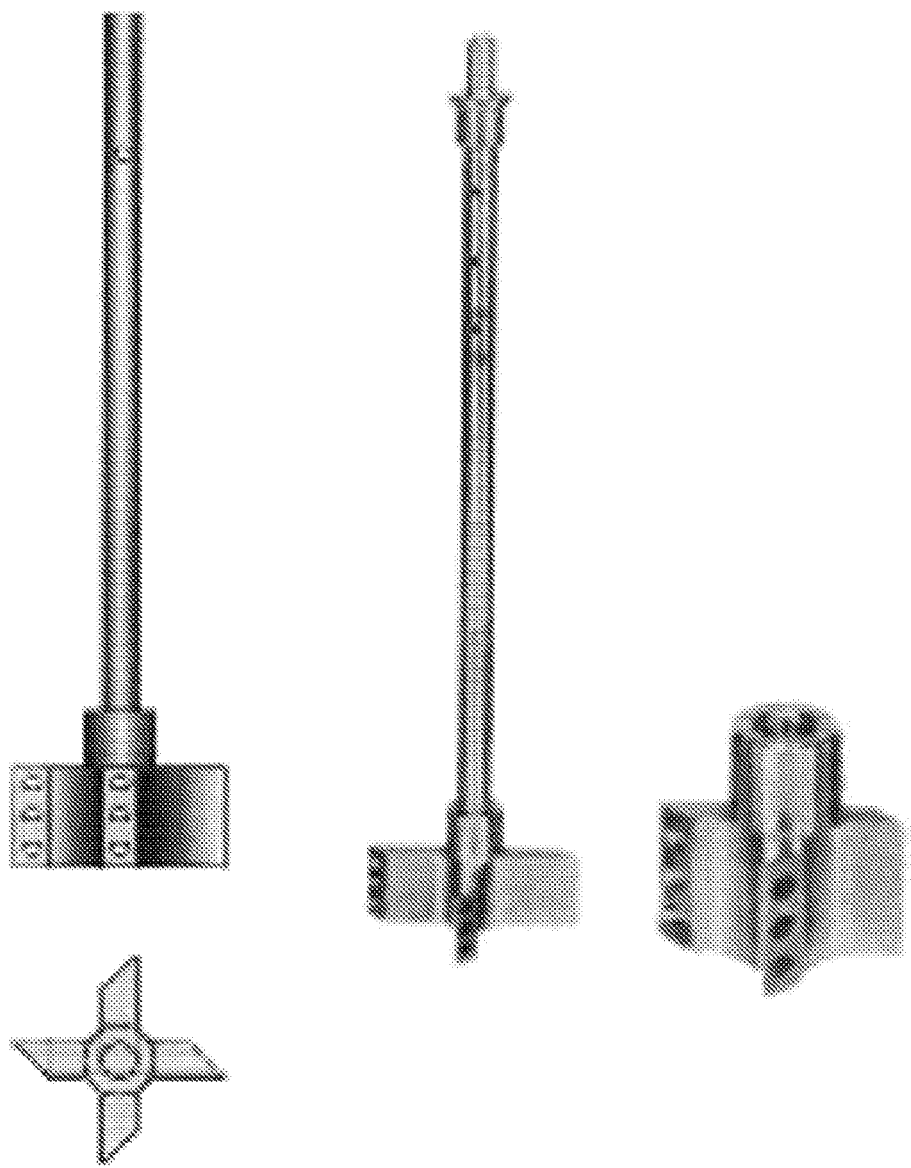
FIG. 24 is illustrations corresponding to a gas inducing impeller for a stir tank reactor.

Preferably, but not necessarily, the agitator used for maximizing gas-liquid mass transfer is a gas-inducing stirrer, such as illustrated in FIG. 24. This high-performance impeller disperses the carbon gas in the head space of the reactor into very fine gas bubbles and thus creates an extremely large interface area between gas and liquid.

The gas-inducing impeller used in this example comprises a stainless steel hollow impeller shaft with small millimeter size gas inlet hole at the top of the impeller shaft in the head space of the mixing vessel. The gas in the headspace is suctioned into the impeller tub and then dispersed into the liquid phase via the gas dispersion (exit) ports in the impellers located at the tip of each of the 4 blades of the impeller. This impeller was fitted into the SHTHPTR (FIG. 23) with electrically or air-driven stirrer to ensure continuous rotation for longer runs. The higher the stirring speed, the higher the vacuum and the higher the driving force. For maximum suction through the gas ports, the impeller can operate generally in the 100 to 3,000 rpm range (e.g., 600 to 2,000 rpm, 1,000 to 1,200 rpm, 100 to 600 rpm). Impellers may be purchased from any suitable supplier, such as Parr Instrument Company (Moline, Ill.).

Example 12B

Figure 25:
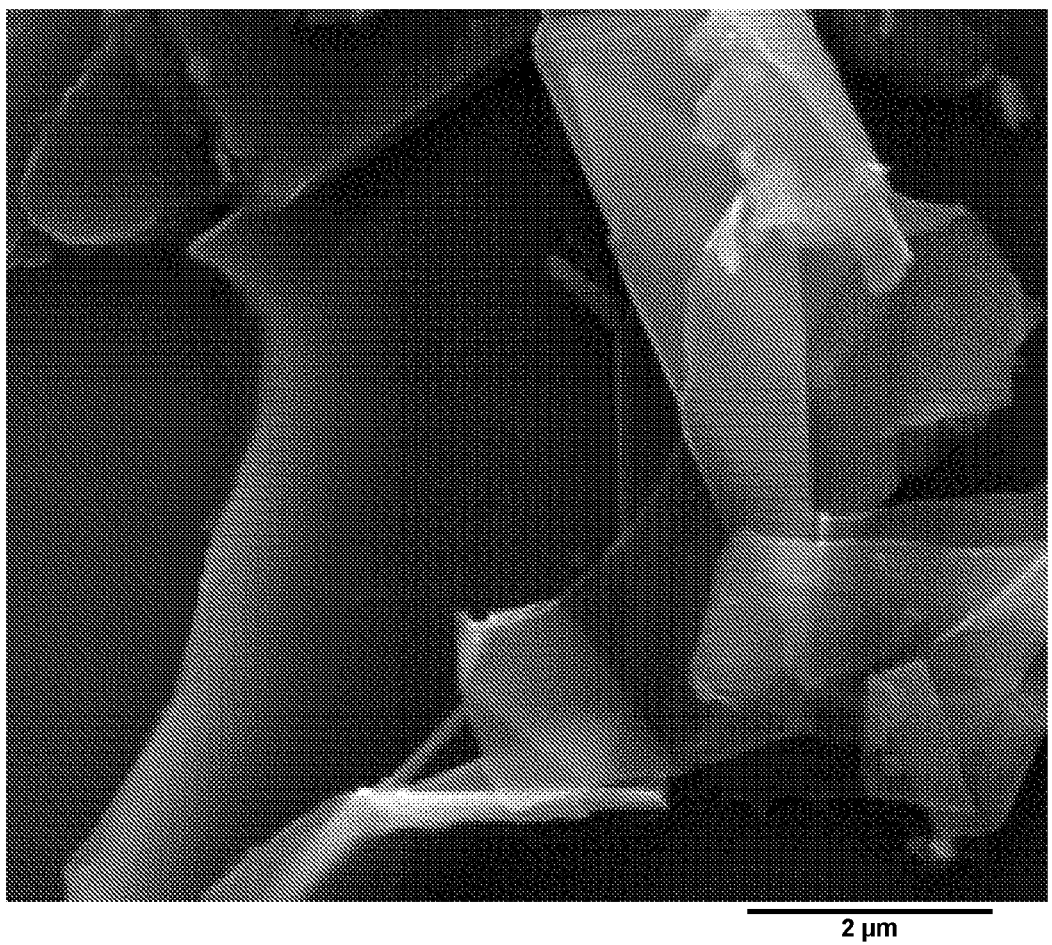
FIG. 25 is an SEM showing, few-layer, graphene-like material produced with a stirred, high temperature, high pressure tank reactor by injecting propane gas into liquid toluene for 30 minutes at a pressure of 80 psi and a temperature of 60° C.

In this example, graphene-like material is made and characterized using a stir tank reactor such as that in FIG. 23. FIG. 25 is an SEM showing, few-layer, graphene-like material produced with a stirred, high temperature, high pressure tank reactor (e.g., FIG. 23) by injecting propane gas into liquid toluene for 30 minutes at a pressure of 80 psi and a temperature of 60° C. The solid carbon material made is graphene-like material (FIG. 25), rather than amorphous carbon.

The process tank parameters for this example included: a tank diameter of 9" (22.86 cm), containing 2 liters of toluene, and an impeller diameter of 4" (10.16 cm) spinning at 3,000 rpm for 30 minutes. The ratio of the impeller diameter to the tank diameter (D/T) was 0.44. The shear created by the impeller in a stirred reactor is largely determined by the ratio of the impeller diameter to the tank diameter (D/T). For the inventive method, the D/T ratio typically is in the range of 0.1 to 0.6, preferably 0.2 to 0.5. Low D/T impellers can produce high shear at lower rpm's, while high D/T configurations typically run at higher rpm's and produce low shear, but greater mixing. In the inventive method, it was discovered that a low D/T ratio is desirable because the objective is not mixing, but rather maximizing gas transfer through high shear.

Example 12C

In this example, a dispersion of graphene-like material in non-additized high carbon oil was made using a stir tank reactor such as that of FIG. 23. In this example, the dispersion was used for lubrication and the lubrication properties were compared to that of the same oil without the graphene-like material. The high carbon oil was processed for 40 minutes with injected propane at 30 psi at a temperature of 60° C. Table 6 shows lubrication enhancement using the dispersion thus made compared to the oil prior to making the graphene-like material.

TABLE 6

|  | Wear Scar | Coefficient of Friction |
|---|---|---|
| Without graphene | 1 | 0.115 |
| With in situ graphene | 0.84 | 0.101 |
| % Improvement | 19% | 14% |

Example 13

This example demonstrates reduction of graphene oxide (GO) to reduced graphene oxide (rGO), according to certain embodiments of methods disclosed herein.

A key topic in the research and applications of graphene oxide (GO) is the reduction of GO to reduced graphene oxide (rGO). The drawback to most of the processes used to transform GO to rGO is the quality of the graphene is reduced. This is because lattice defects and functional groups attached to the surface and edges cannot be completely removed during the oxidation reduction step. Equally problematic is that, strong oxidants, liquid wastes, and organic solvents used in the reduction process raise environmental concerns. In contrast, certain methods disclosed herein are much simpler and do not compromise the quality of the graphene or require environmentally unfriendly chemicals.

Figure 26:
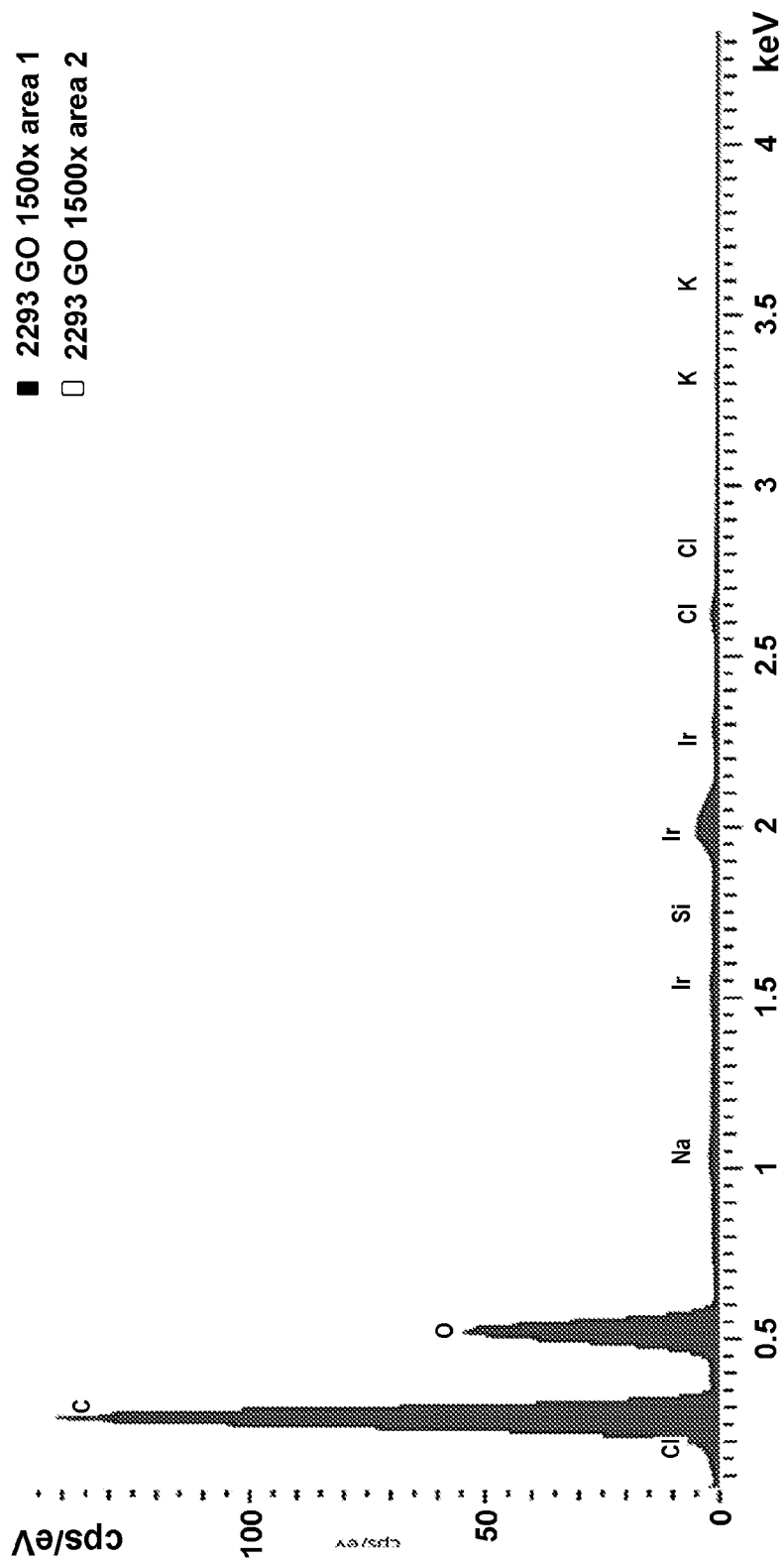
FIG. 26 is an EDS of the atomic percentages of elements in graphene oxide.
Figure 27:
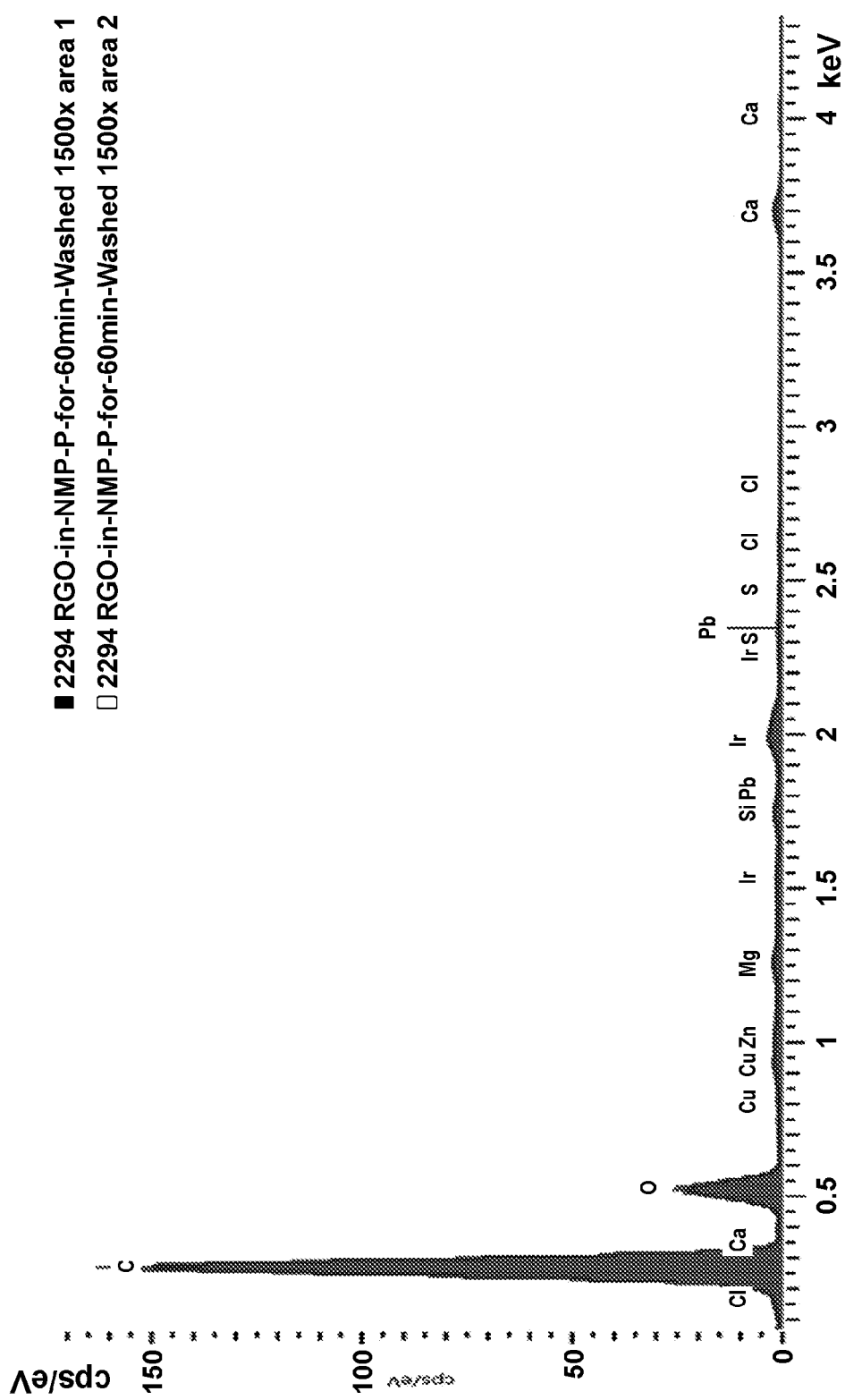
FIG. 27 is an EDS of the atomic percentages of elements in reduced graphene oxide (reduced graphene oxide of FIG. 26).

FIGS. 26-27 shows the reduction of GO to rGO using bench shear to bubble propane into GO dispersed in the polar solvent N-methyl-2-pyrrolidone (NMP). This process resulted in a reduction of atomic oxygen in GO from 34% to 20%, which increased the C/O ratio from 1.76 to 3.81. The carbon added to the GO came from additional carbon generated in the gas-liquid mass transfer process. FIG. 26 and Table 7 summarize the atomic percentages of elements in graphene oxide.

TABLE 7

| | Concentration (at. %) | | | | | | |
|---|---|---|---|---|---|---|---|
| Spectrum Label | C | O | Na | Si | Cl | K | Total |
| 2293 GO 1550x Area 1 | 64.18 | 34.74 | 0.17 | 0.12 | 0.67 | 0.12 | 100.00 |
| 2293 GO 1500x Area 2 | 64.51 | 34.39 | 0.17 | 0.13 | 0.66 | 0.13 | 100.00 |

FIG. 27 and Table 8 summarize the atomic percentages of elements in reduced graphene oxide (reduced graphene oxide of FIG. 26).

TABLE 8

| | Concentration (at. %) | | | | | | | | | | |
|---|---|---|---|---|---|---|---|---|---|---|---|
| Spectrum Label | C | O | Mg | Si | S | Cl | Ca | Cu | Zn | Pb | Total |
| Area 1 | 74.05 | 20.78 | 0.32 | 0.33 | 0.15 | 0.19 | 2.61 | 0.61 | 0.40 | 0.56 | 100.00 |
| Area 2 | 74.83 | 19.59 | 0.35 | 0.41 | 0.11 | 0.21 | 2.81 | 0.67 | 0.35 | 0.66 | 100.00 |

Example 14A

In this example, graphene was edge oxidized, an example of in situ functionalization of graphene, according to certain embodiments disclosed herein.

Edge oxidizing graphene is the antithesis of graphene reduction. Instead of oxygen being removed, it is judicially added. A major reason for adding oxygen to pristine graphene is to make the graphene water dispersible. This is no small task, because high quality graphene has very few defects which make the graphene hydrophobic. The dilemma is that for graphene to disperse in water it needs defect sites. Currently, the most common method of obtaining aqueous low oxygen aqueous graphene dispersions is to graft several chemical groups to the limited defect sites on pristine graphene.

This example demonstrates an environmentally friendly process for mildly oxidizing high quality graphene. Gas-liquid mass transfer reactors can be used to create "weak" oxidation of the graphene in a way to avoid significant damage to the lattice of the graphene platelets. Minimal damage results in graphene that is soluble in water without any surfactants or additives. Bubbling oxygen with sonication also lowers the surface tension of the water to about 42, which is close to matching the surface tension of graphite. Those skilled in the art know that liquid exfoliation is facilitated when the surface tension of the liquid is close to the surface tension of graphite. However, using bubbled oxygen to lower the surface tension of water for the purpose of liquid exfoliation has not been reported. This process does not require the use of surfactants, water/alcohol mixtures, or expensive environmentally hazardous solvents. The idea of oxygen saturation lowering surface tension of water is supported by a recent molecular dynamics simulation (see, e.g., Jain, et al., *AIP Advances*, 2017, 7, 045001).

Figure 28:
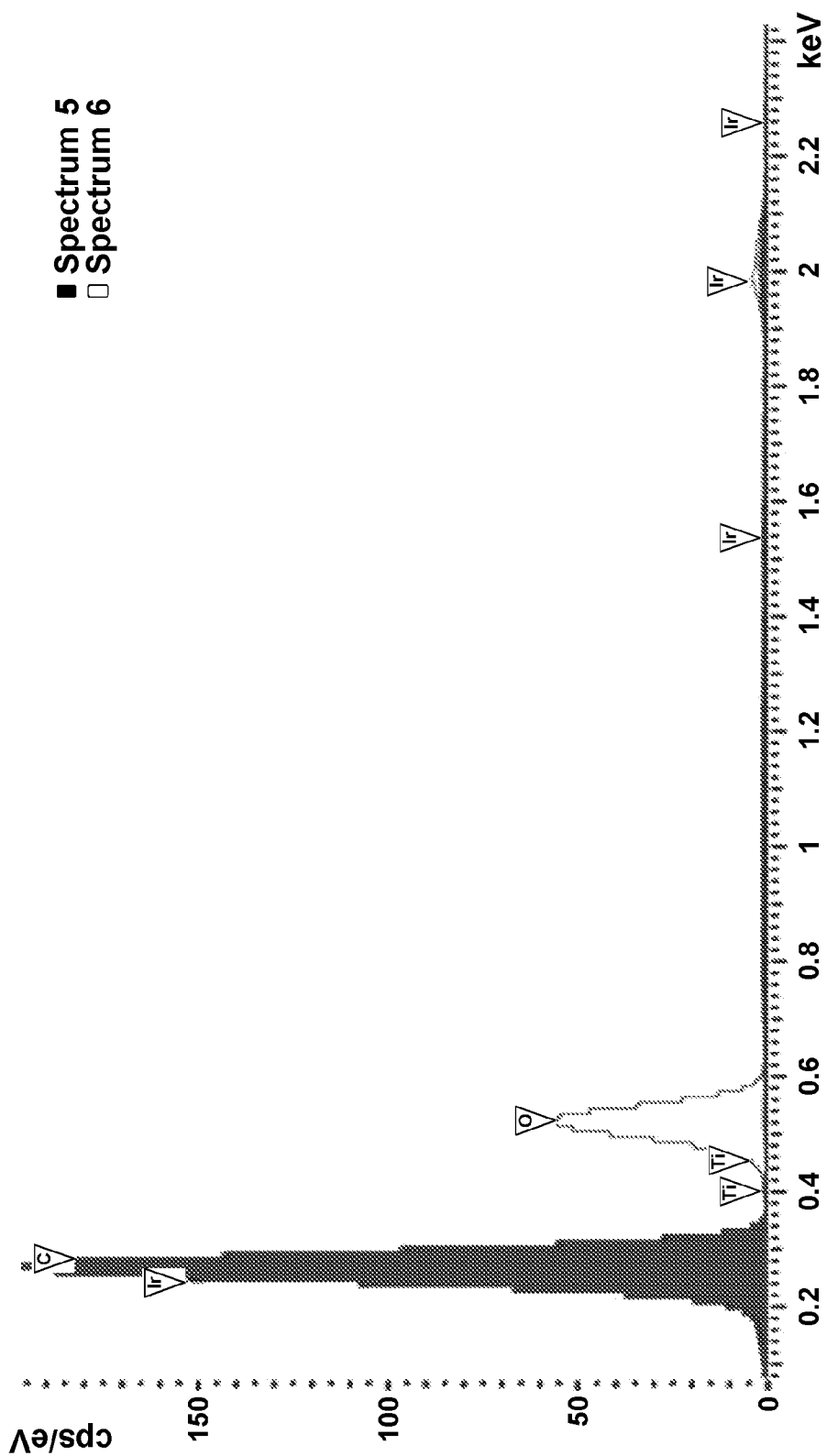
FIG. 28 is an EDS of the atomic percentages of elements in pristine graphene.
Figure 29:
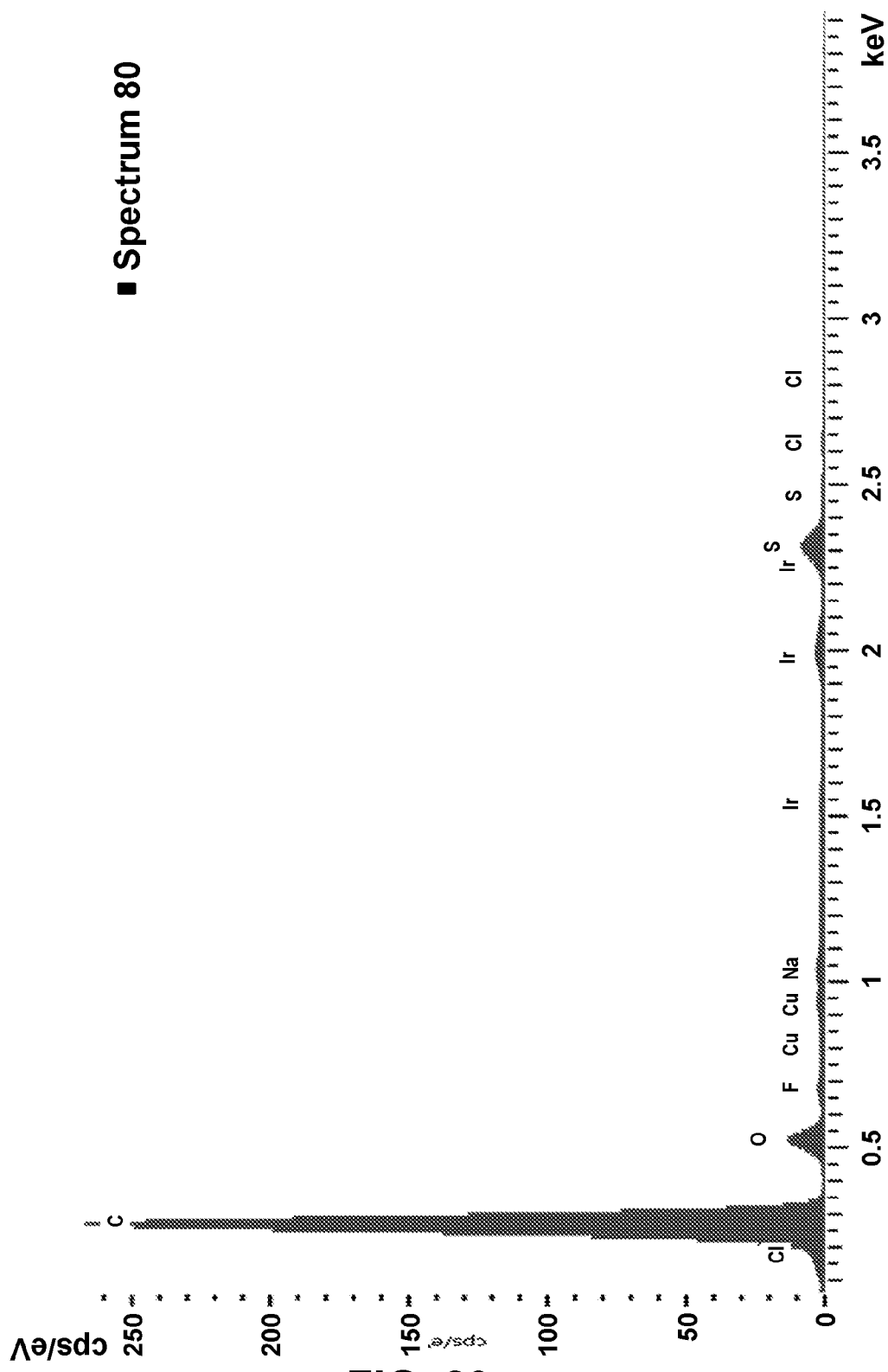
FIG. 29 is an EDS of the atomic percentages of elements in partially oxidized (edge oxidized) graphene (oxidized graphene of FIG. 28).

The EDS analysis in FIGS. 28-29 shows that after 1 hour of processing of pristine graphene with oxygen injected in a hydrodynamic cavitation reactor, the oxygen on the graphene increased from ~0.5% to ~6%, and the graphene was made water soluble. FIG. 28 and Table 9 summarize atomic percentages of elements in pristine graphene.

TABLE 9

| Spectrum Label | Concentration (at. %) | | |
|---|---|---|---|
| | C | O | Total |
| Spectrum 5 | 99.43 | 0.57 | 100.00 |
| Spectrum 6 | 99.60 | 0.40 | 100.00 |

FIG. 29 and Table 10 summarize the atomic percentages of elements in partially oxidized (edge oxidized) graphene (oxidized graphene of FIG. 28).

TABLE 10

| Spectrum Label | Concentration (at. %) | | | | | | | |
|---|---|---|---|---|---|---|---|---|
| | C | O | F | Na | S | Cl | Cu | Total |
| Spectrum 80 | 92.14 | 5.96 | 0.39 | 0.14 | 1.24 | 0.06 | 0.08 | 100.00 |

Example 14B

Figure 30A:
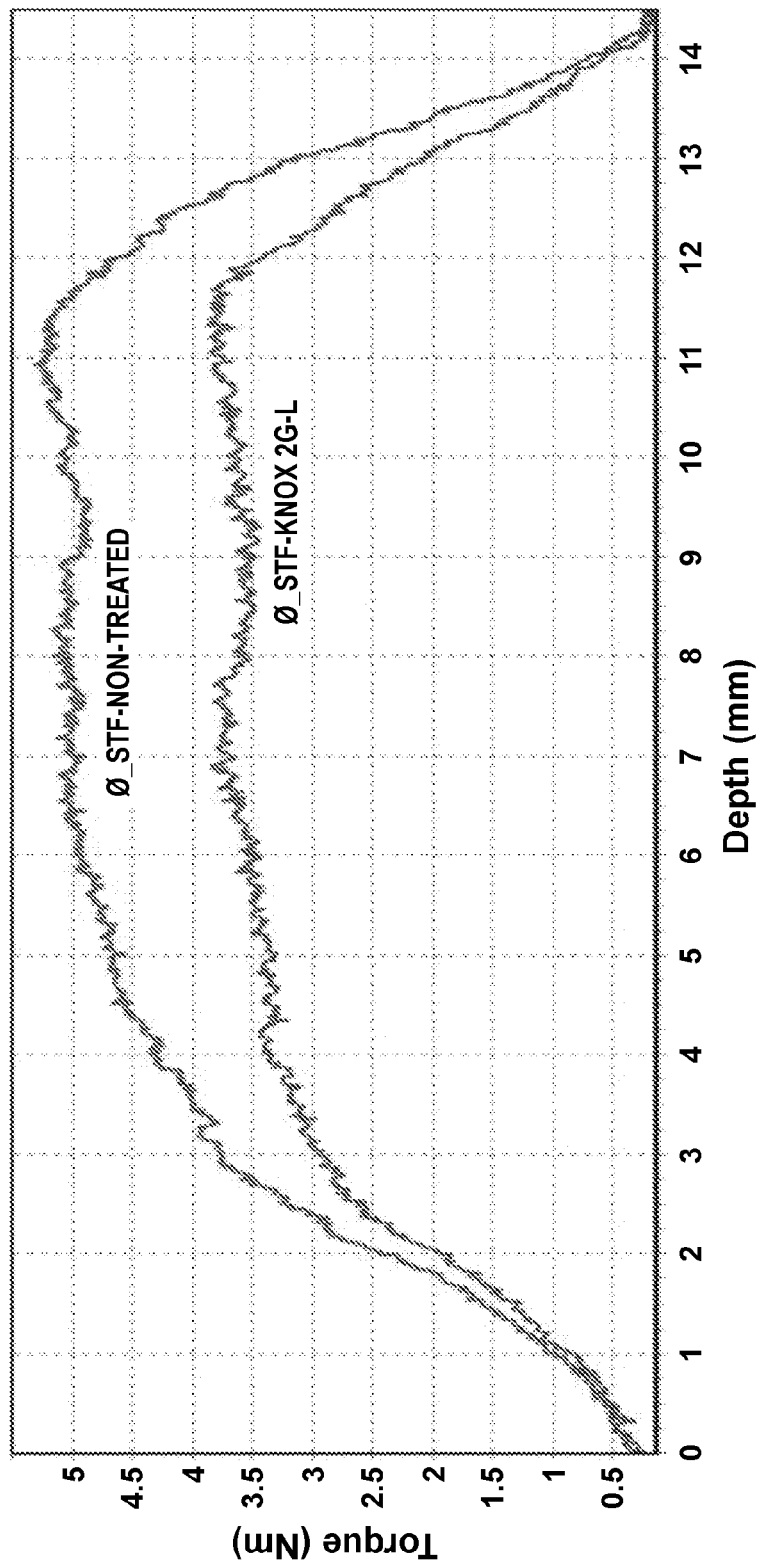
FIG. 30 illustrates data showing that when water-dispersed edge oxidized graphene is added to the water portion of Master Chemical 685, there is a 26% reduction in the torque required to form threads in steel.
Figures 30B, 30C:
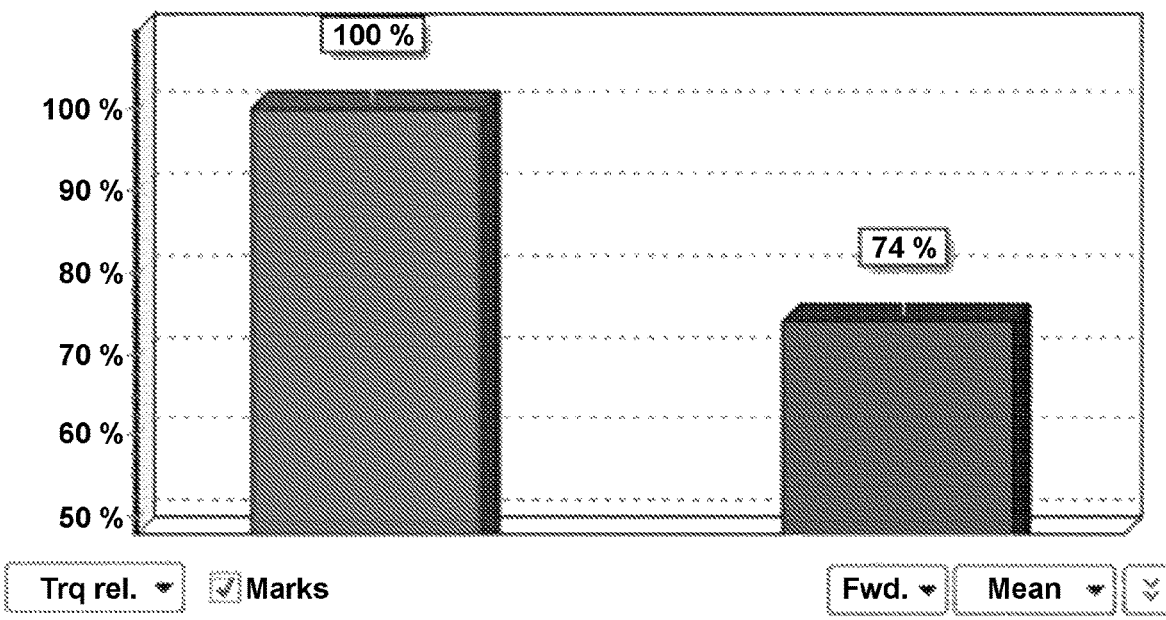

In this example, the edge oxidized graphene of Example 14A was used to enhance the lubricity of water-based lubricants. Specifically, FIG. 30 shows that when water dispersed graphene was added to the water portion of Master Chemical 685, there was a 26% reduction in the torque required to form threads in steel. The top graph is the coolant without the graphene, while the bottom graph is with 0.01% edge oxidized graphene. Lower torque reflects higher lubricity.

Example 15

In this example, cationic graphene (CGN) was made according to certain embodiments disclosed herein. Tailoring electrical properties of graphene by creating cationic graphene is of great significance in a broad area of advanced electronic applications. Chemical doping is an important approach to tailoring the electronic property of graphene. Typically, there are two methods of chemically doping graphene: (1) the adsorption of metal, or organic molecules on the graphene surface, or (2) substitutional doping, which introduces heteroatoms, such as nitrogen atoms and boron atoms into the carbon lattice of the graphene. Both of these methods can change the electronic properties of graphene.

Figure 31:
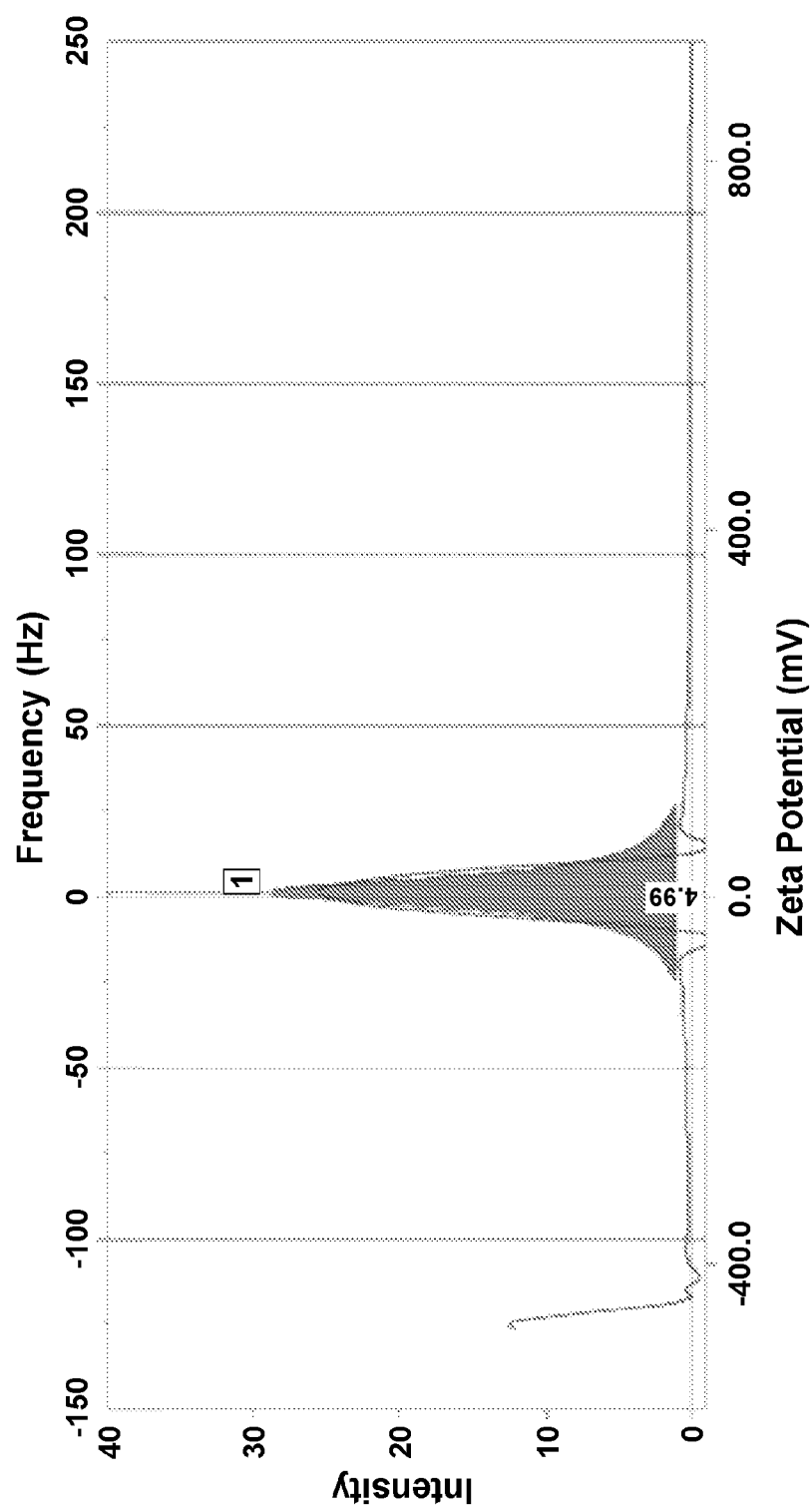
FIG. 31 includes Zeta potential data for cationic graphene made according to certain embodiments disclosed herein.

This example introduces a different method of changing the electronic nature of graphene. While graphene is normally anionic, a gas-liquid mass transfer process can be used to produce in situ cationic graphene. The process includes, for example, bubbling propane into 1,2-dichlorobenzene under high shear. Under these conditions the gas-liquid mass transfer reaction transforms the carbon in the high shear gas/liquid system to in situ graphene. The cationic graphene produced from 1,2-dichlorobenzene with the gas-liquid mass transfer described herein has a Zeta potential of +4.99 mV as seen in FIG. 31. This is in contrast to a Zeta potential of −33 mV when graphene was dispersed in N-methyl-2-pyrrolidone (NMP).

STATEMENTS REGARDING INCORPORATION BY REFERENCE AND VARIATIONS

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups (groups from which a proton can be removed (e.g., —COOH) or added (e.g., amines) or which can be quaternized (e.g., amines)). All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every method and system described or exemplified herein can be used to practice the invention, unless otherwise stated.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for making a solid carbon material comprising:
    delivering a liquid comprising at least one liquid organic compound into a reaction region of a reactor;
    delivering a gas comprising at least one gaseous organic compound into the reaction region of the reactor; and
    inducing a chemical reaction between the at least one liquid organic compound and the at least one gaseous organic compound, wherein:
    the chemical reaction occurs in the reaction region of the reactor;
    the solid carbon material is made via the reaction;
    the solid carbon material is made during the reaction in the form of a dispersion comprising the solid carbon material dispersed in the liquid; and
    the chemical reaction is a homogeneous reaction comprising homogeneous nucleation of the solid carbon material in the reaction region of the reactor.

2. The method of claim 1, wherein the chemical reaction comprises gas-liquid mass transfer.

3. The method of claim 1, wherein a composition of the gas is different from a composition of the liquid.

4. The method of claim 1, wherein a composition of the at least one gaseous compound is different from a composition of the at least one liquid organic compound.

5. The method of claim 1, wherein the step of delivering the liquid is performed via a first input stream into the reaction region and the step of delivering the gas is performed via a second input stream into the reaction region; wherein the first stream path and the second input stream are different and physically separate.

6. The method of claim 1, wherein the step of delivering the liquid and the step of delivering the gas are performed concurrently or the step of delivering the gas is performed after the liquid is delivered to the reaction region.

7. The method of claim 1, wherein delivering the gas comprises entraining the gas in the liquid, injecting the gas into the liquid, bubbling the gas into the liquid, or a combination of these.

8. The method of claim 1, wherein the gas is delivered directly into the reaction region during the step of delivering the gas.

9. The method of claim 1, wherein the step of inducing the chemical reaction comprises inducing a shear force in the liquid.

10. The method of claim 1, wherein the gaseous organic compound is selected from the group consisting of alkane, alkene, alkyne, cycloalkane, heterocycyloalkane, arene, heteroarene, and a combination thereof, wherein the alkane, alkene, alkyne, cycloalkane, heterocycloalkane, arene, or heteroarene can be optionally substituted with one or more substituents.

11. The method of claim 1, wherein the at least one gaseous organic compound is selected from the group consisting of methane, acetylene, ethylene, propane, 1,3-butadiene, butane, and any combination thereof.

12. The method of claim 1, the at least one liquid organic compound being selected from the group consisting of methanol, ethanol, isopropyl alcohol, methylpyrrolidone, d-cyclopentadiene, hexane, benzene, toluene, heptane, xylene, dimethyl sulfoxide, mineral oil, motor oil, base oil, hydrogenated castor oil, transmission oil, gear oil, vegetable oil, hydrocarbon base oil, additized oil, non-additized oil, kerosene, diesel fuel, ethylene glycol, propylene glycol, diethylene glycol, triethylamine, trimethylamine, pentane, cyclopentane, cyclohexane, 1,4-dioxane, chloroform, diethyl ether, dichloromethane, tetrahydrofuran, ethyl acetate, acetone, dimethylformamide, acetonitrile, nitromethane, propylene carbonate, formic acid, butanol, propanol, acetic acid, octadecene, oleic acid, oleylamine, octane, diethylene glycol ether, 1,2-dicholorobenze, methyl acetate, tetrachloroethylene, diphenylthiourea, hexafluro-2-propanol, cinnamic acid, trimethylamine, benzenthiol, ethanethiol, ethanedithiol, 4-aminobenzenethiol, acrylic acid, carbon disulfide, 1,2-dichlorobenzene, N-methyl-2-pyrrolidone, and any combination thereof.

13. The method of claim 1, wherein the liquid comprises water.

14. The method of claim 1, wherein the solid carbon material comprises graphite, expanded graphite, a graphite-like material, graphene, a graphene-like material, carbon platelets, carbon nanotubes, carbon onions, other carbon allotrope, a composite comprising graphene, cationic graphene, or any combination thereof.

15. The method of claim 1, the carbon material comprising graphene or a graphene-like material.

16. The method of claim 1, further comprising functionalizing the solid carbon material to provide a functionalized solid carbon material.

17. The method of claim 1, wherein:
the reactor is a cavitation reactor;
the reaction zone is a cavitation zone of the cavitation reactor; and
the method comprises forming cavitation bubbles in the liquid within the cavitation region of the cavitation reactor.

18. The method of claim 17, wherein during the step of delivering the gas, the gas is delivered directly into or within 1 mm of a cavitation bubble-nucleation region, the cavitation bubble-nucleation region corresponding to nucleation of the cavitation bubbles in the hydrodynamic cavitation reaction during the step of forming.

19. The method of claim 17, the forming step comprising forming a cavitation cloud comprising the cavitation bubbles in the cavitation region of the reactor, wherein the gas is delivered directly inside or within 1 mm of the cavitation cloud.

20. The method of claim 17, the forming step comprising forming a cavitation cloud comprising the cavitation bubbles; wherein the carbon material is formed within the cavitation cloud.

21. The method of claim 1, wherein the dispersion is a first dispersion, the chemical reaction is a first chemical reaction, the solid carbon material is a precursor material, the gas is a first gas, and the reactor is a first reactor; the method further comprising:
delivering the first dispersion into a second reactor;
delivering a second gas comprising at least one gaseous organic compound directly into a reaction region of the second reactor; and
inducing a second chemical reaction in the reaction region of the second reactor; wherein:
the second chemical reaction converts the precursor material into a second solid carbon material;
the second carbon material is dispersed in the liquid; and
the precursor material and the second carbon material are different.

22. The method of claim 21, wherein the second reactor is a cavitation reactor and the step of inducing comprises forming cavitation bubbles in the first dispersion within the reaction region of the second reactor.

23. The method of claim 21, wherein the first reactor and the second reactor are the same.

\* \* \* \* \*